US012739138B2

(12) United States Patent
Ren et al.

(10) Patent No.: US 12,739,138 B2
(45) Date of Patent: Sep. 15, 2026

(54) OIL AND GAS PRODUCTION AND DISTRIBUTION BLOCKCHAIN SYSTEMS AND METHODS IMPLEMENTING SAME

(71) Applicants: FIRST GENESIS, INC., Sugar Land, TX (US); REN DATASIM LLC, Houston, TX (US)

(72) Inventors: Henry H. Ren, Richmond, TX (US); Ronald Watty, Sugar Land, TX (US)

(73) Assignee: First Genesis, Inc., Houston, TX (US)

( * ) Notice: Subject to any disclaimer, the term of this patent is extended or adjusted under 35 U.S.C. 154(b) by 11 days.

(21) Appl. No.: 18/647,769

(22) Filed: Apr. 26, 2024

(65) Prior Publication Data

US 2025/0088376 A1 Mar. 13, 2025

Related U.S. Application Data

(60) Provisional application No. 63/462,112, filed on Apr. 26, 2023.

(51) Int. Cl.

| | |
|---|---|
| ***H04L 9/00*** | (2022.01) |
| ***G06F 30/20*** | (2020.01) |
| *G06F 113/00* | (2020.01) |

(52) U.S. Cl.

CPC ................ *H04L 9/50* (2022.05); *G06F 30/20* (2020.01); *G06F 2113/00* (2020.01)

(58) Field of Classification Search

None

See application file for complete search history.

(56) References Cited

U.S. PATENT DOCUMENTS

| | | | | |
|---|---|---|---|---|
| 11,687,493 | B1 * | 6/2023 | Maturana | G06Q 50/04 709/201 |
| 2021/0143980 | A1 * | 5/2021 | Harris | H04L 9/0643 |
| 2024/0103504 | A1 * | 3/2024 | Batcher | G05B 19/41885 |
| 2024/0104087 | A1 * | 3/2024 | Batcher | G06F 16/2379 |

FOREIGN PATENT DOCUMENTS

| | | | | |
|---|---|---|---|---|
| KR | 20240074516 A | * | 5/2024 | G06T 19/003 |

OTHER PUBLICATIONS

Niavis et al. Trusted DBL: A Blockchain-based Digital Twin for Sustainable and Interoperable Building Performance Evaluation. 2022 7th International Conference on Smart and Sustainable Technologies. Jul. 2022. IEEE Press. 6 pages (Year: 2022).*

Suhail et al. Trustworthy Digital Twins in the Industrial Internet of Things With Blockchain. IEEE Internet Computing, vol. 26, Issue 3. pp. 58-67. Feb. 18, 2021 (Year: 2021).*

* cited by examiner

*Primary Examiner* — Jeffrey R Swearingen

(74) *Attorney, Agent, or Firm* — Robert W. Strozier

(57) ABSTRACT

Apparatuses and systems and interfaces and methods implementing them including a virtual actor architecture that receives real-time, near real-time, and/or periodic data and information concerning oil/gas upstream, midstream, and downstream facilities via virtual actors, stores the real-time, near real-time, and/or periodic data and information in block of one or more blockchains, create virtual digital twins of the facility or a facility component, runs user requested or system requested simulations using either the real-time, near real-time, and/or periodic facility data directly or runs the user requested or system requested simulations on a virtual digital twin of the facility or facility component, and stores the results in blocks of the one or more blockchains.

20 Claims, 44 Drawing Sheets

Average Throughput
97.5
Hits/s

Avg. Response Time
55
Millisecond

90% Response Time
54
Millisecond

Error Rate
0
%

Average Throughput
791.4
Hits/s

Avg. Response Time
66
Millisecond

90% Response Time
95
Millisecond

Error Rate
0
%

TIMELINE GRAPHS
Concurrent Users and Response Time

| Throughput | Avg. of Responses < 1 ms | Min. Response Time < 1ms | Max. Response Time < 1 ms | Error Rate |
|---|---|---|---|---|
| 1,000 Requests/s | 75.70% | 0.0000207 ms | 0.0009990 ms | 0% |

FIG. 9

| Throughput | Avg. of Responses > 1 ms | Min. Response Time > 1ms | Max. Response Time > 1 ms | Error Rate |
|---|---|---|---|---|
| 1,000 Requests/s | 24.30% | 0.0010017 ms | 0.0647042 ms | 0% |

FIG. 10

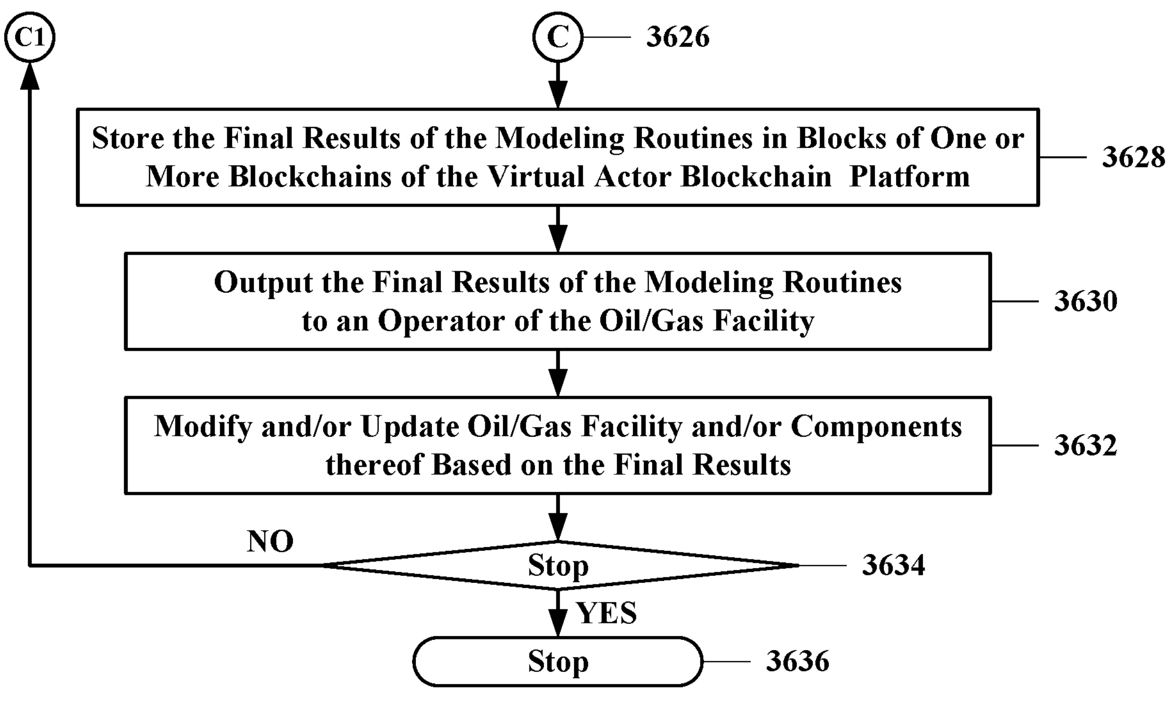
FIG. 36 -- Continued

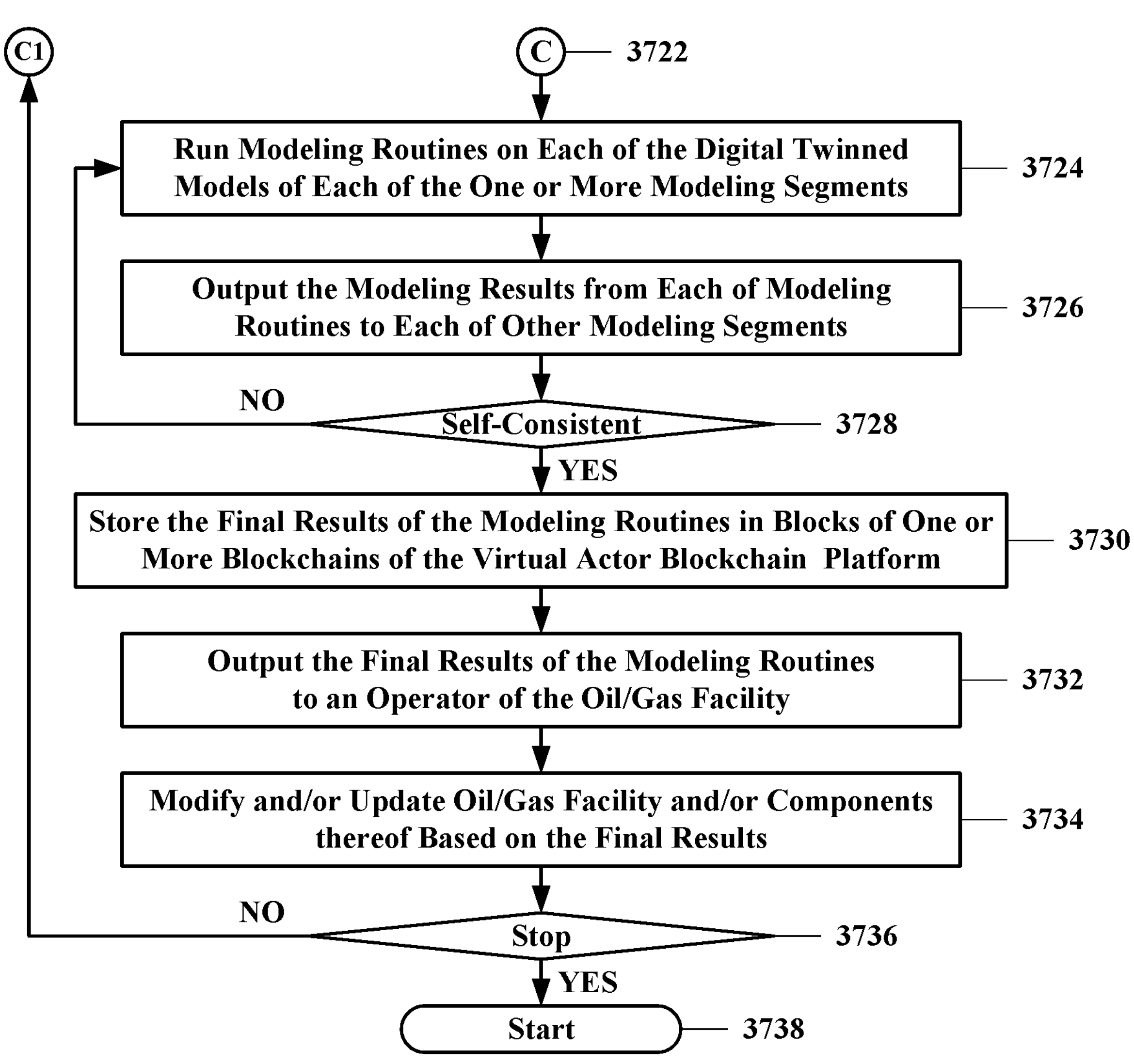
FIG. 37 -- Continued

OIL AND GAS PRODUCTION AND DISTRIBUTION BLOCKCHAIN SYSTEMS AND METHODS IMPLEMENTING SAME

RELATED APPLICATIONS

This application claims the benefit and priority to U.S. Provisional Patent Application No. 63/462,112 filed Apr. 26, 2023 (26 Apr. 2023).

U.S. Pat. No. 11,082,207 issued Aug. 3, 2021 (3 Aug. 2021) and U.S. Pat. No. 11,082,207 issued Aug. 3, 2021 are incorporated by reference by operation of the Closing Paragraph.

FIELD OF THE DISCLOSURE

Embodiments of this disclosure relate to apparatuses or systems, and interfaces and methods implementing them configured to digitally or virtually twin one or more oil and/or gas facilities and/or any component thereof.

More specifically, embodiments of this disclosure relate to apparatuses or systems, and interfaces and methods implementing them configured to digitally or virtually twin one or more oil and/or gas facilities and/or any component thereof, the apparatuses or systems including real-time, near real-time, and/or periodic facility and/or component data acquisition assembly or subsystem, real-time, near real-time, and/or periodic facility and/or component data processing assembly or subsystem, real-time, near real-time, and/or periodic facility and/or component data storage assembly or subsystem, real-time, near real-time, and/or periodic facility and/or component data analysis assembly or subsystem, real-time, near real-time, and/or periodic data communication assembly or subsystem, a virtual actor blockchain assembly or subsystem, and a real-time, near real-time, and/or periodic data twining assembly or subsystem configured to model facility or component functions, real-time, near real-time, and/or periodic facility and/or component data modeling assembly or subsystem, real-time, near real-time, and/or periodic facility and/or component management assembly or subsystem, historical data processing, predictive processing for oil and/or gas facility and/or component maintenance, upgrading, replacement, or periodic shutdowns assembly or subsystem, and other features or processes that may be twinning in a virtual twinned environment.

BACKGROUND INFORMATION OF THE DISCLOSURE

A blockchain is a continuously growing list of records, called blocks, which are linked and secured using cryptography. Each block typically contains a cryptographic hash linking it to a previous block and transaction data. For use as a distributed ledger, a blockchain typically is managed by a peer-to-peer network collectively adhering to a protocol for validating new blocks. Once recorded, the data in any given block cannot be altered retroactively without the alteration of all subsequent blocks, which requires collusion or agreement of a network majority or super majority.

In a typical blockchain, blocks hold batches of valid transactions that are hashed and encoded into a data structure. In this structure, each block includes the cryptographic hash linking it to the prior block in the blockchain. The linked blocks form a chain. This iterative process confirms the integrity of the previous block, all the way back to the original genesis (or first) block.

One common component of blockchain technology is a Merkle Tree. A Merkle Tree is a way of hashing numerous transactions into a single hash key through a process called mining. The process of mining requires a repetitive process to continually generate hashes in order to update a Merkle Tree. As the blocks hold batches of numerous transactions that are hashed into a Merkle Tree, mining is seen as an architectural design flaw of blockchains limiting blockchain scalability. While not being bound by theory, it is possible to create a vast block that contains every transaction in a ledger; however, doing so imposes additional scalability challenges that put the use of blockchain technology out of the realm of practical utility.

Another component of blockchain technology is the ability to reliably and independently verify the legitimacy of hashed transaction data within a blockchain. Generating a proof allows hashed data to be anchored to a blockchain, thereby proving whether it belongs to a blockchain or not. As with mining, the process of generating proofs is an intense effort and relies upon a trusted third party accessed by way of, for example, remote emote Remote Procedure Call (RPC) or WebAPI requests.

Blockchain technology started as the innovation that powered Bitcoin® (a registered trademark of Mano's Inc.) cryptocurrency. However, cryptocurrency represents only one vertical for the use of blockchain. In recent years, blockchain has seen wider applications in numerous industries such as finance, supply chain management, medical records management, and ransom ware. The use of mining and anchoring (although necessary) are highly inefficient processes. On a limited application the impact of not being scalable is negligible. However, blockchain technology in its current state is not suitable for widespread use.

While blockchain technology involving financial interactions was matured over the past decade or so, the use of blockchain technology, especially blockchain technology using virtual actor methodologies, have not been applied to data collection/acquisition from oil and gas facilities for modeling, analyzing, and monitoring of facility activities, processes, and procedures. The present disclosure present presents a coherent methodology for applying blockchain technology to effectively and efficiently manage facility data collection/acquisition, facility component modeling, facility and facility component analyses, and facility activities, processes, and procedures monitoring.

SUMMARY OF THE DISCLOSURE

Embodiments of this disclosure provide apparatuses and/or system including an oil and/or gas facility data communication assembly/subsystem and a virtual actor blockchain assembly or subsystem configured for data acquisition, data storage, data analysis, data mining, data tracking, facility, facility component modeling, virtual facility and virtual facility component or digital twinned facility or digital twinned facility component generation, and virtual facility and virtual facility component or digital twinned facility or digital twinned facility component modeling, wherein the data communication and analyses may be performed in real-time, near-real time, or periodically as permitted, and interfaces and methods implementing them.

The facility data communication assembly/subsystem includes communication pathways from all data output sources within an oil and/or gas facility including, without limitation, sensors, databases, analytic software, operational and management protocols and/or reports, operational protocols and/or reports, and facility configurations and/or component configurations, research and development operational and management reports, engineering operational and management reports, and any other information or data output source.

The virtual actor blockchain assembly/subsystem includes a data acquisition assembly/subsystem software for receiving the data from the facility data output sources and assigning one or more facility data virtual actors to the facility data output sources based on the type of facility data source. The one or more virtual actors are assigned to each of the facility data output source pathways and the virtual actor blockchain assembly/subsystem may be configured to specific facility components, sub-components, processes, and/or sub-processes. The virtual actor blockchain assembly/subsystem also includes computer models for each facility sensor, each facility component, each facility sub-component, each facility process, and each facility sub-process associated with one, some, or all virtual facility data actors to produce a virtual facility for modeling facility operation and management. The virtual facility modeling may be used to predict future facility behavior, to optimized facility performance, to identify facility problems before they occur, to minimize facility downtime, and/or to improve facility operation and management. The virtual actor blockchain assembly/subsystem also includes virtual actor network comprising supervisor, manager, facility personnel, data analysis personnel, data modeling personnel, and/or other personnel needing access to the virtual actor network computers and/or servers. The personnel virtual actors will have different access and/or different ability to invoke processes with the virtual modeling facility.

More specifically, embodiments of this disclosure relate to real-time, near real-time and or periodic facility data acquisition, data analysis, and management apparatuses or systems, the apparatuses or systems including a facility assembly or subsystem and a virtual actor blockchain data acquisition, storage, analysis, and tracking assembly or subsystem and interfaces and methods implementing them.

BRIEF DESCRIPTION OF THE DRAWINGS OF THE DISCLOSURE

The disclosure may be better understood with reference to the following detailed description together with the appended illustrative drawings in which like elements are numbered the same:

FIG. 9 shows a summary of persisted connection client performance at <1 millisecond. 1,000 hits/second. Fastest response times of 0 filtered out. <2% CPU utilization.

FIG. 10 shows a summary of persisted connection client performance>1 millisecond. 1,000 hits/second. Fastest response times of 0 filtered out. <2% CPU utilization.

Figure 12A:
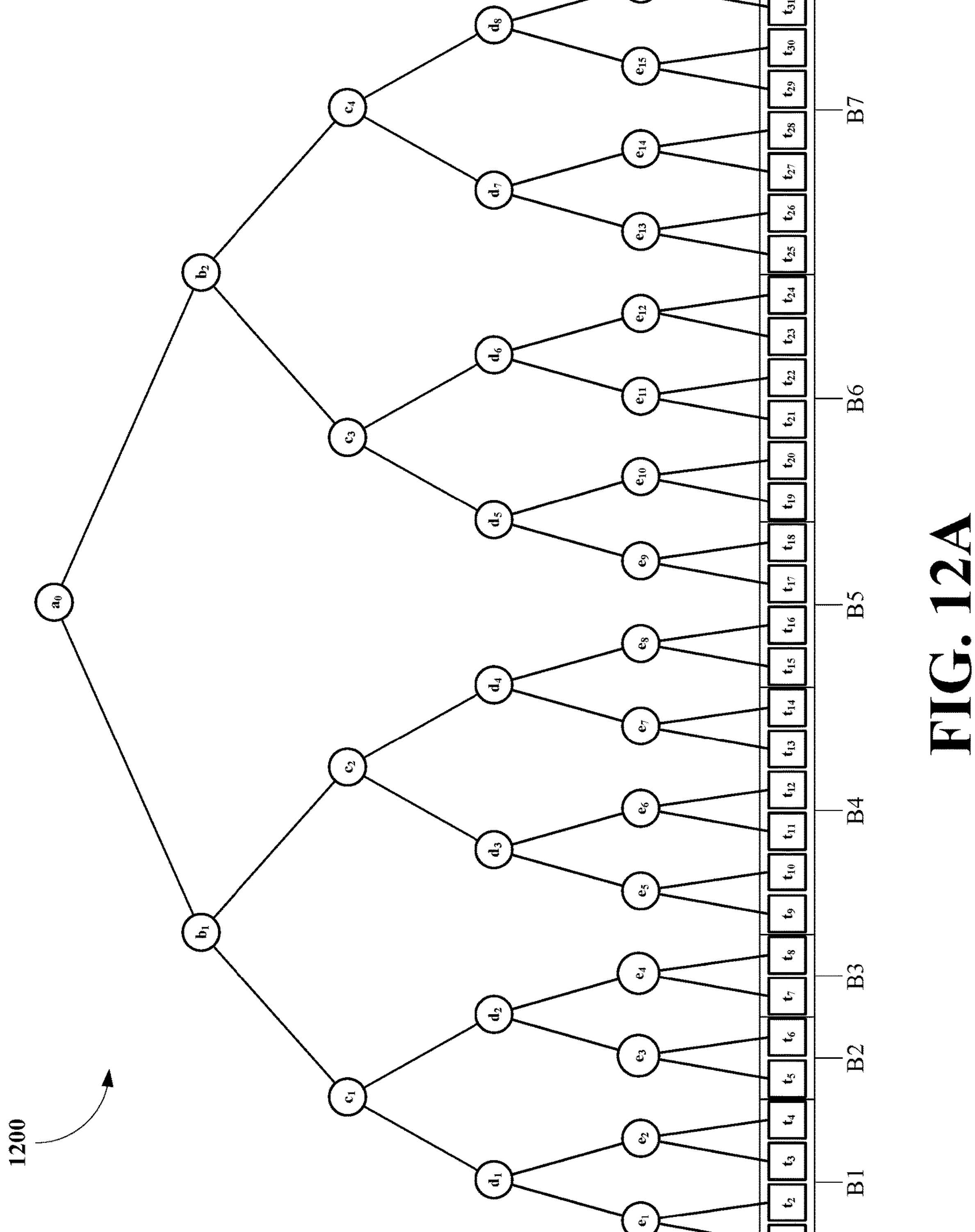
Figure 12B:
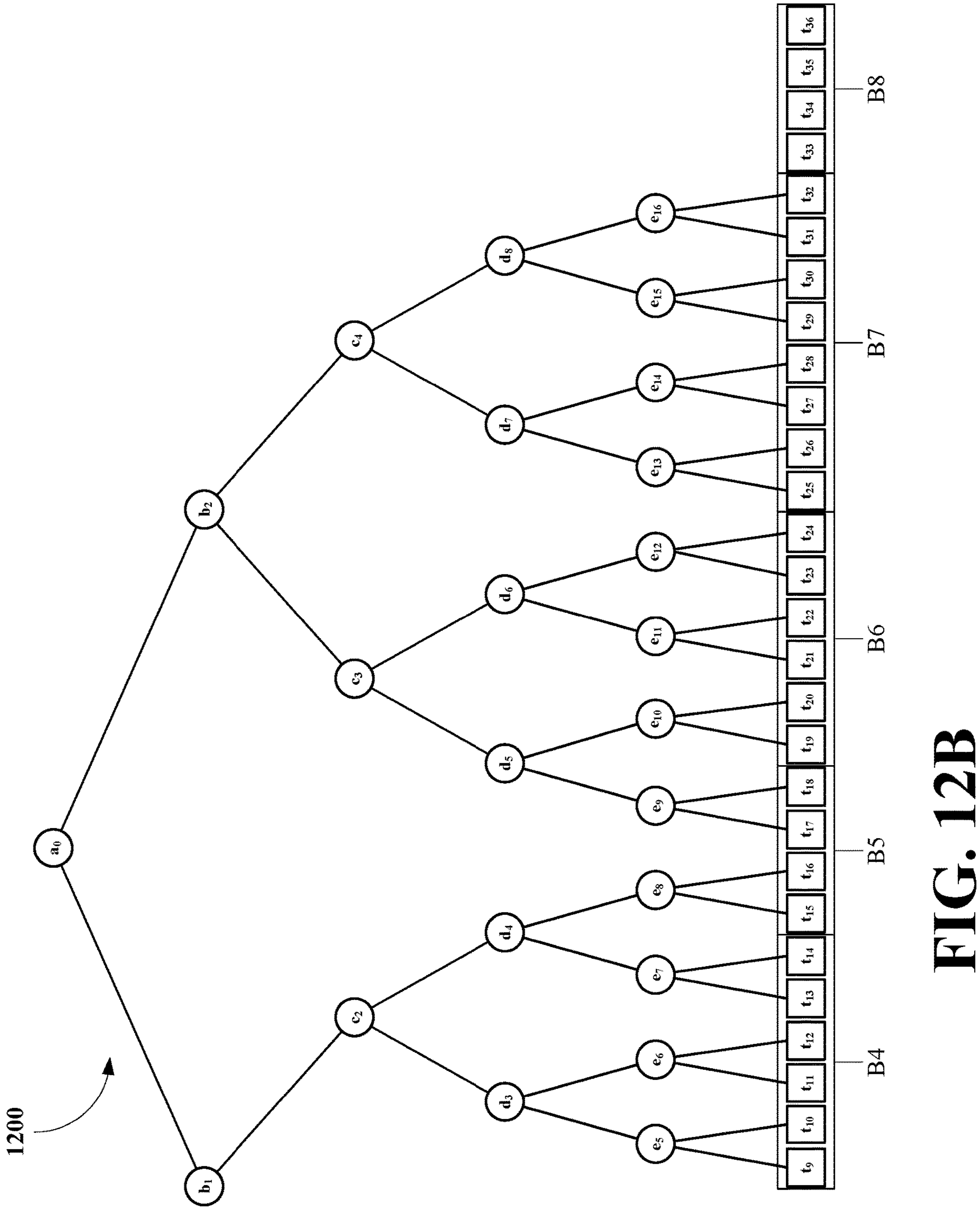
Figure 12C:
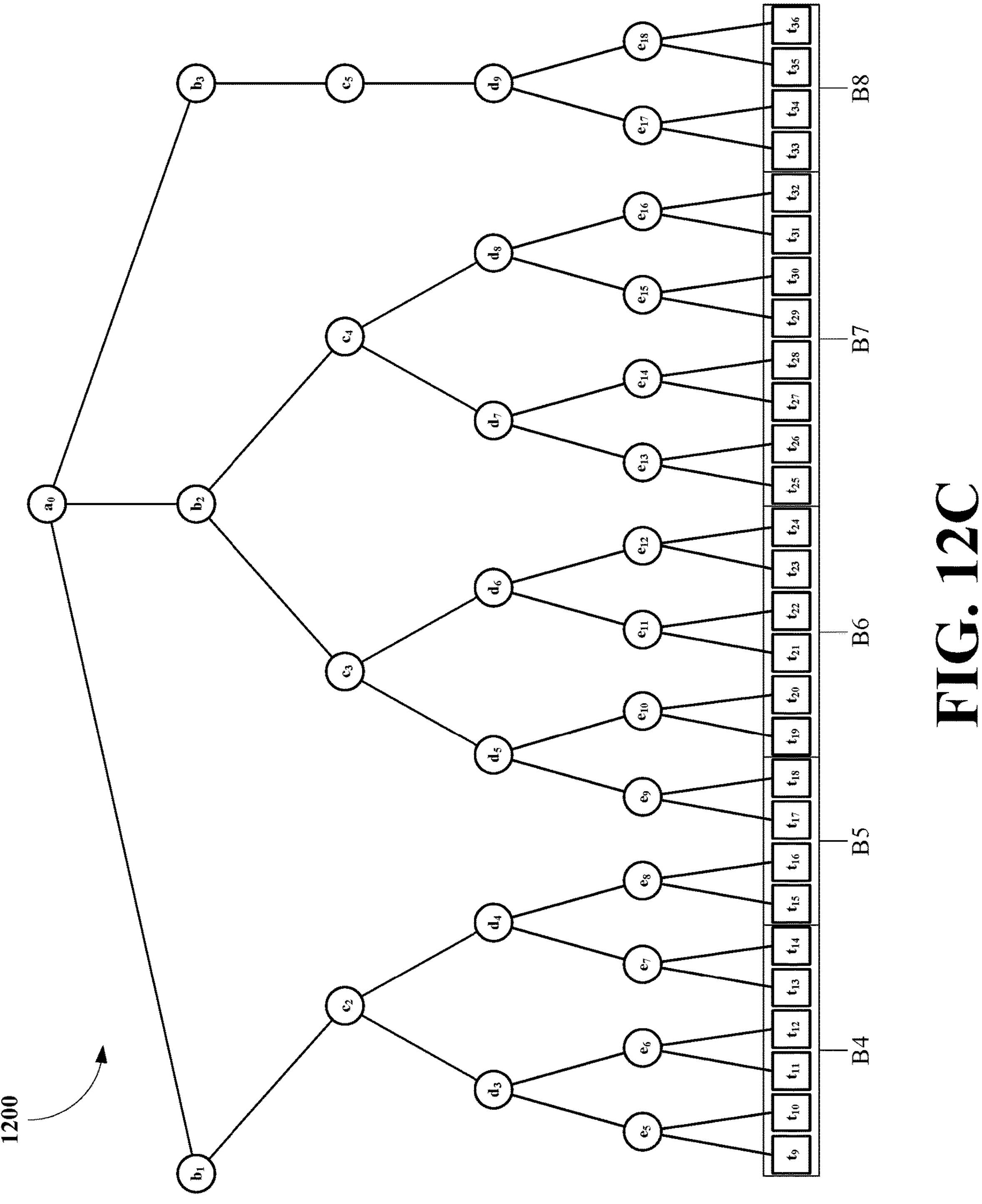

FIGS. 12A-C illustrate the creation of the graphical ledger to transactions within the block of an accessed blockchain.

FIGS. 13A-D illustrated the creation of a consensus tokens used for processing consensus polling on adding new blocks and/or new transactions, proofing, verifying, and/or authenticating existing blocks and/or transactions, or modifying and/or updating existing blocks and/or transactions.

Figure 14A:
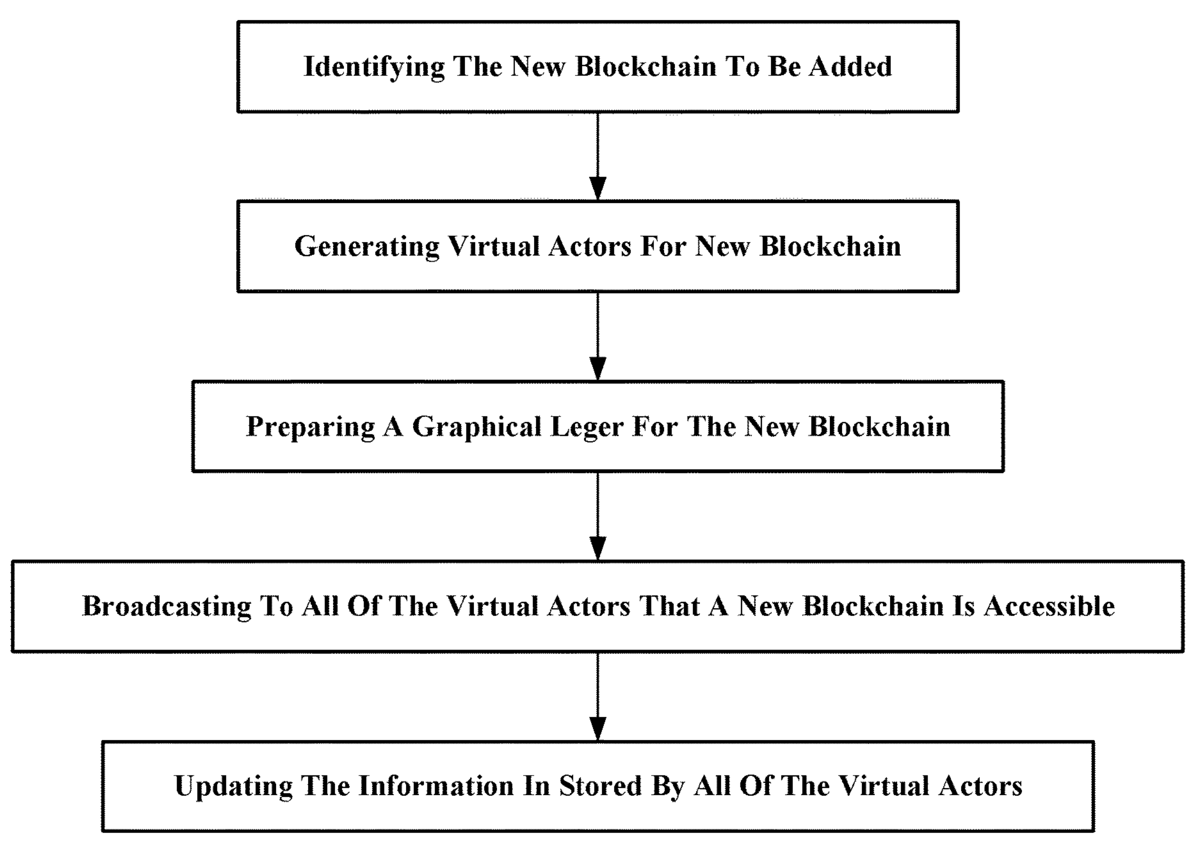

FIG. 14A depicts a conceptual flow chart for pre-processing a new blockchain and producing a graphical ledger for the blockchain.

Figure 14B:
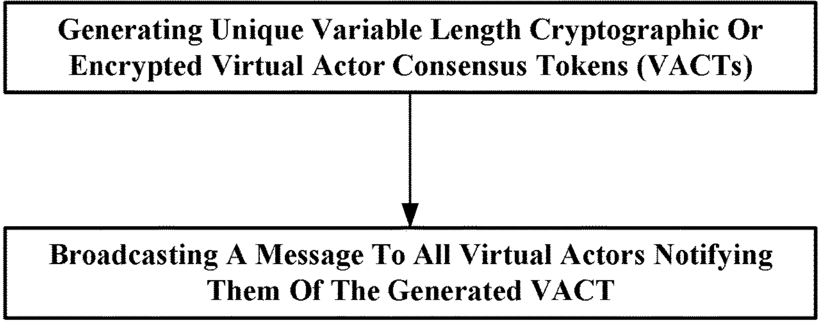

FIG. 14B depicts a conceptual flow chart for creating consensus tokens for all virtual actors for consensus polling.

Figure 15:
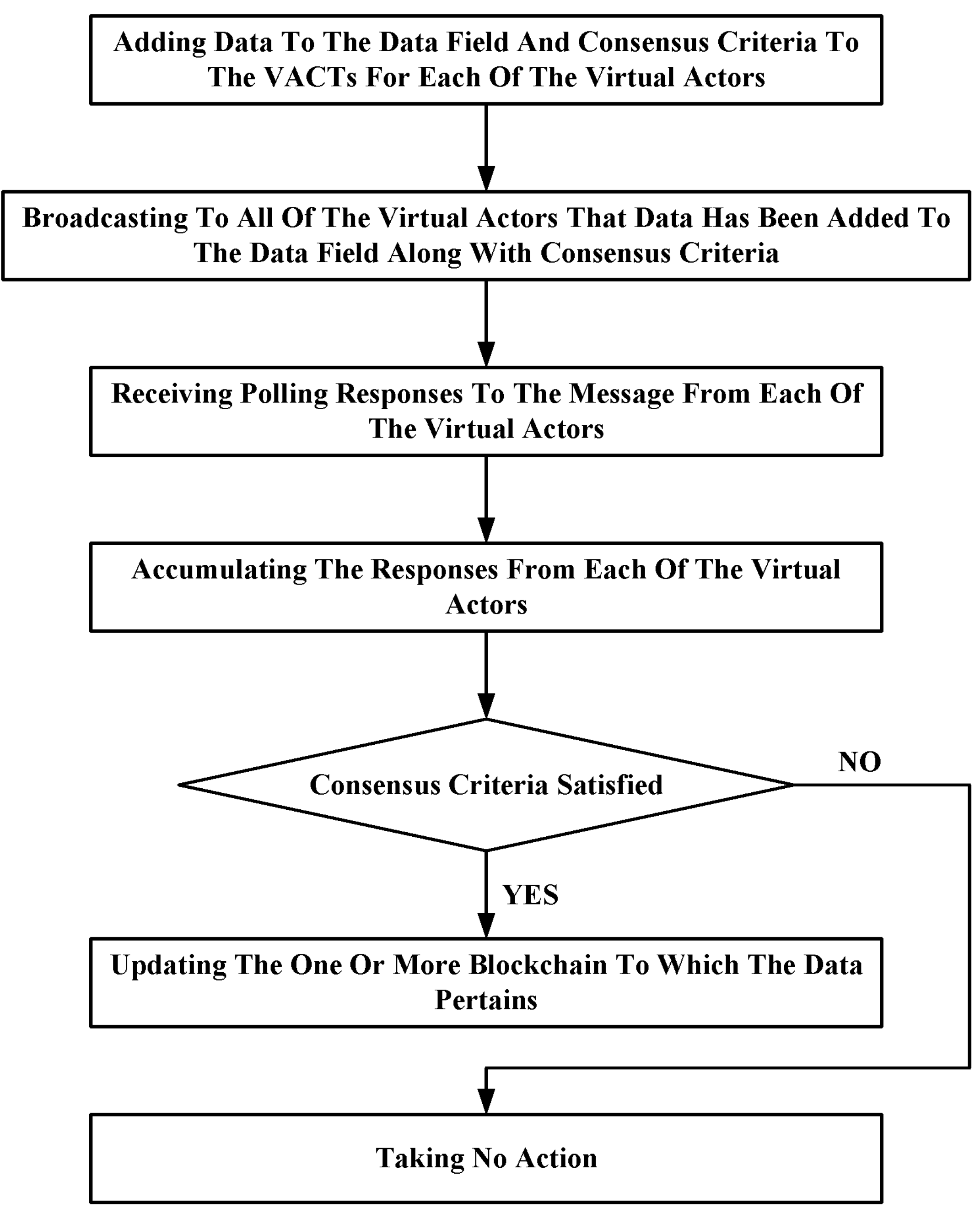

FIG. 15 depicts a conceptual flow chart for performing consensus polling.

Figure 16:
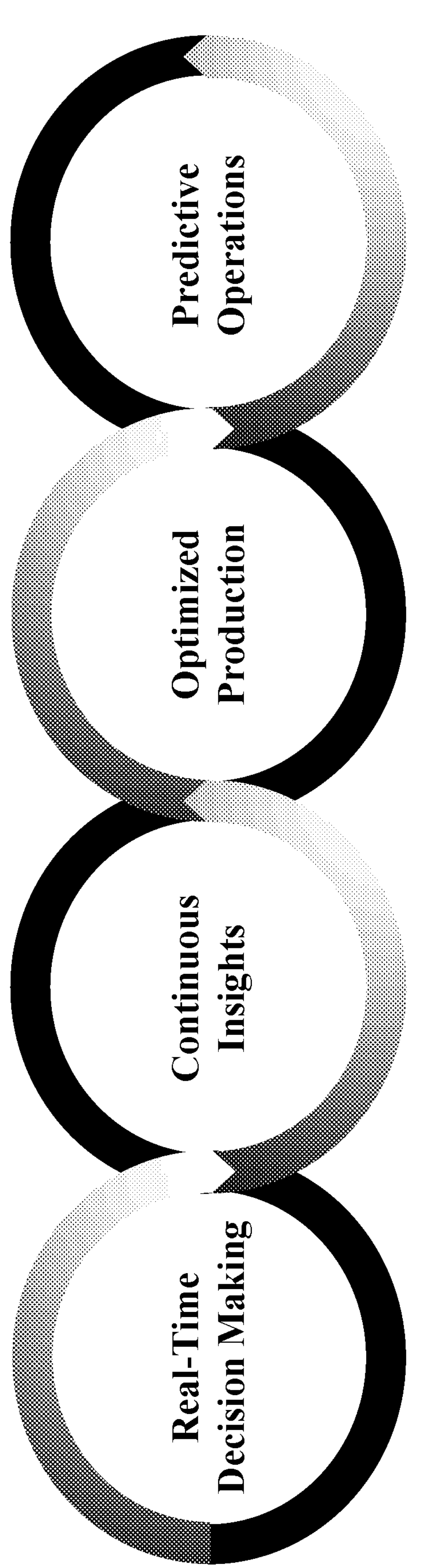

FIG. 16 depicts a chart to rethink oil and/or gas production.

Figure 17:
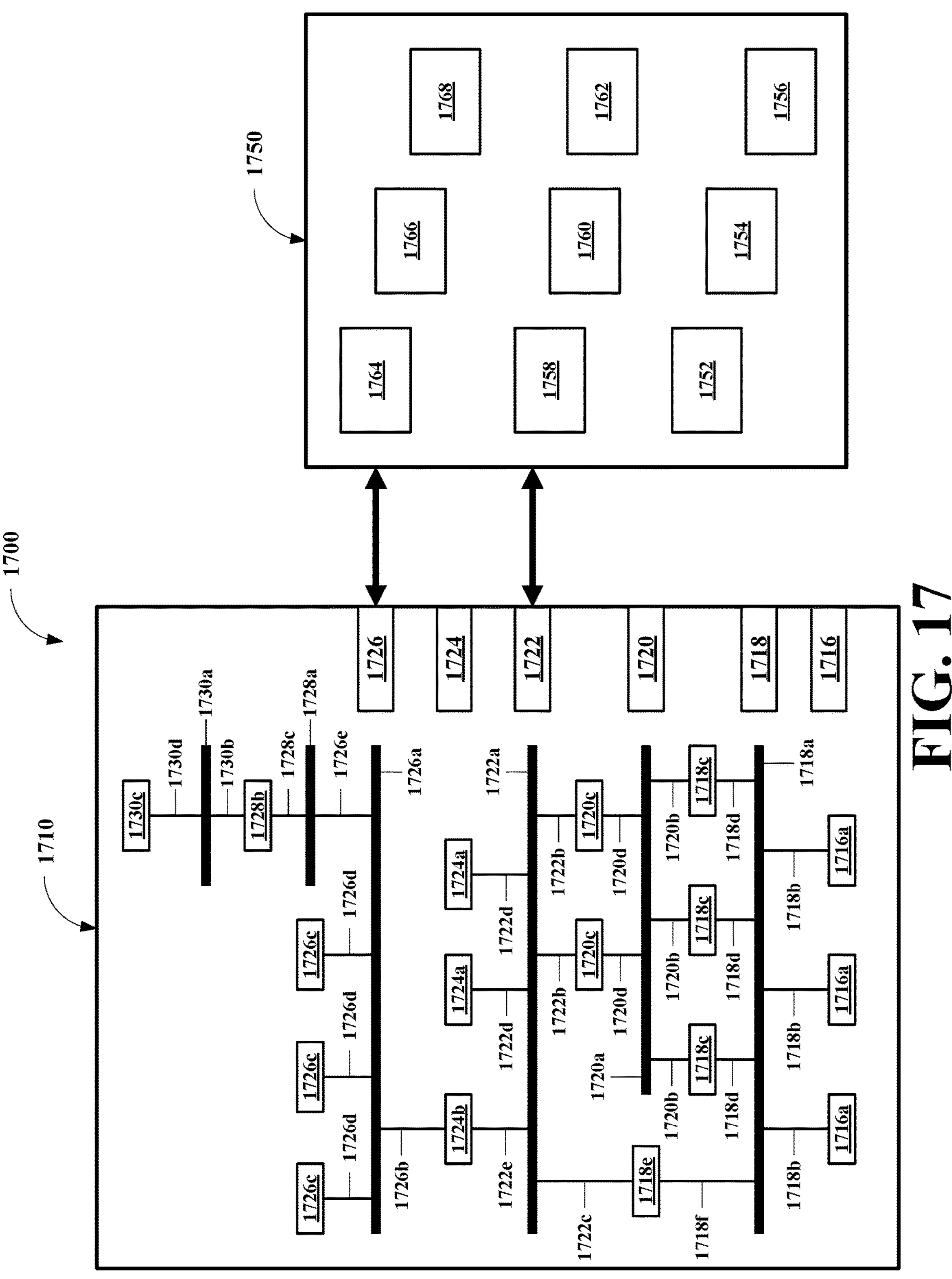

FIG. 17 depicts a prior art or existing digital online facility data management solution layout.

Figure 18:
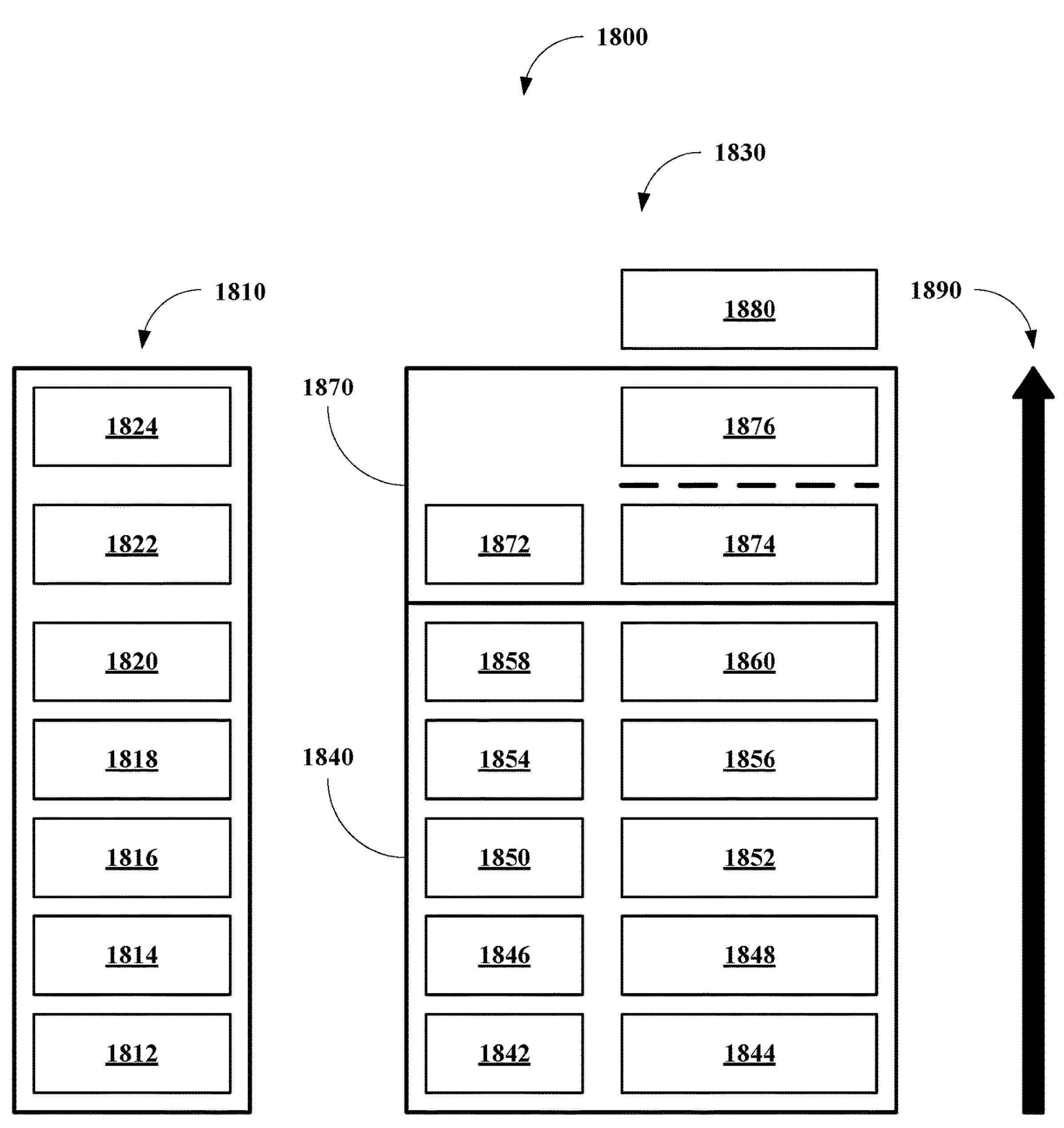

FIG. 18 depicts a prior art or existing facility data and information collection system.

Figure 19A:
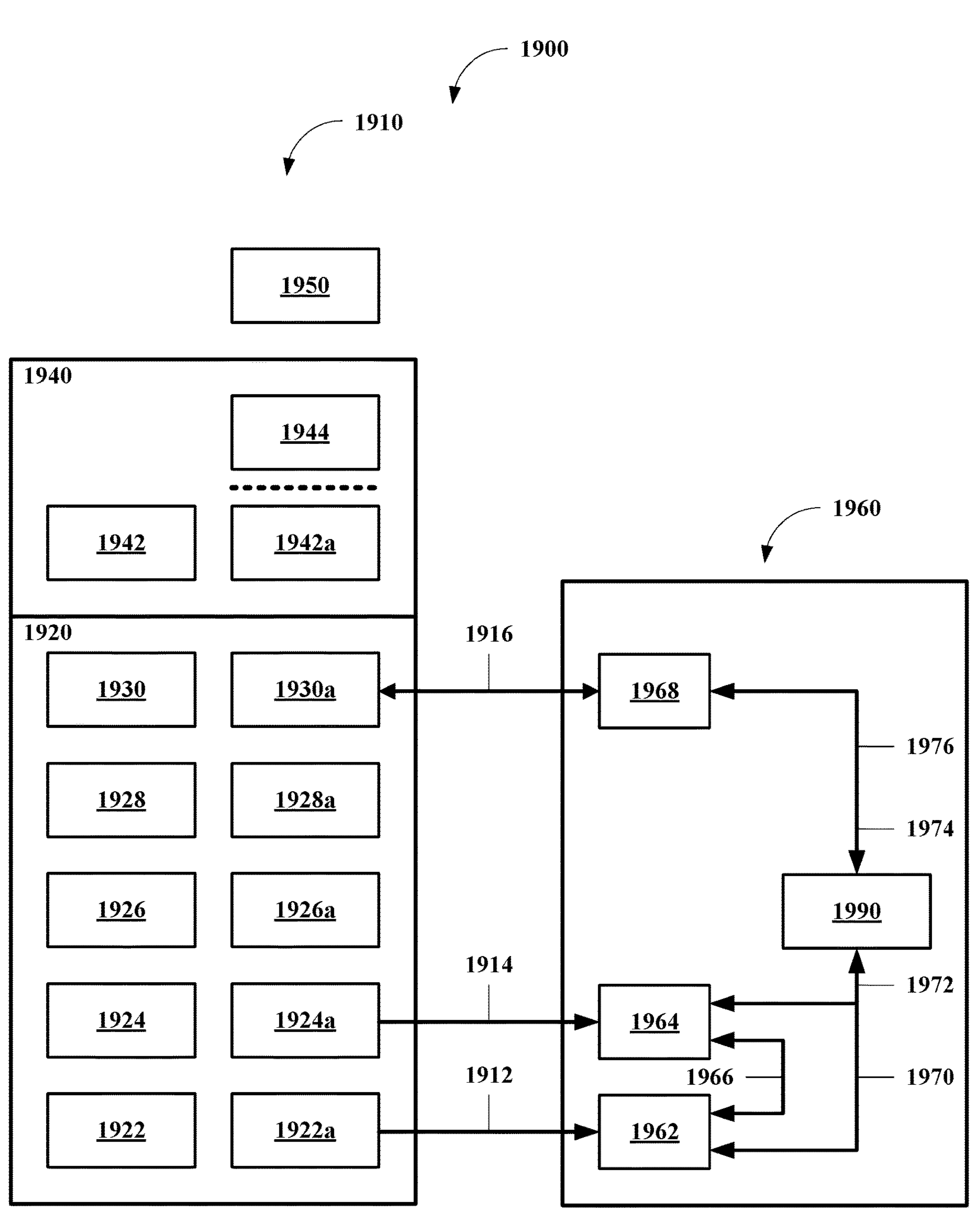

FIGS. 19A&B depicts two embodiments of a facility information data and information virtual actor blockchain collection system.

Figure 20:
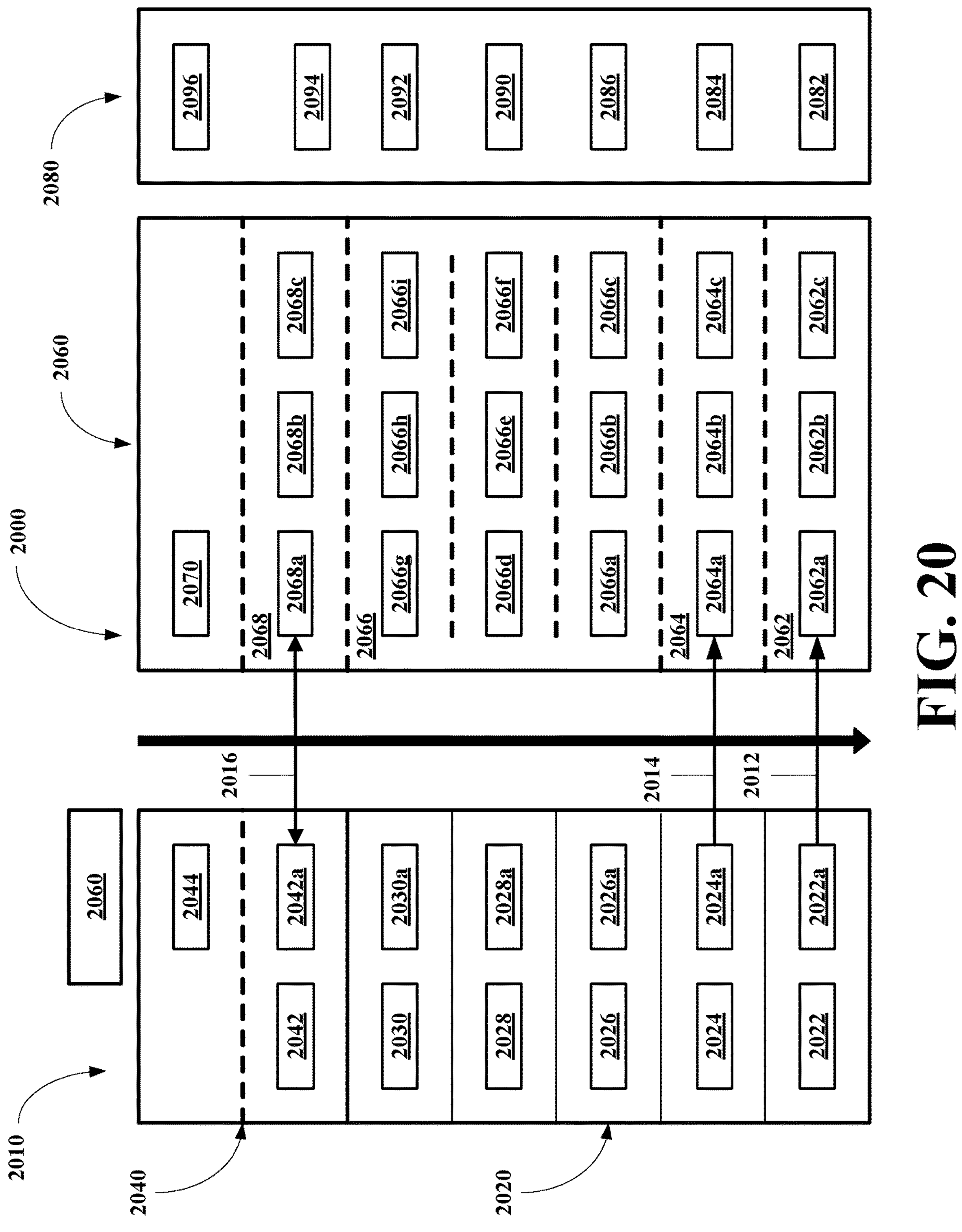

FIG. 20 depicts an embodiment of an integrated online digital twinning or generation of virtual facility or facility component generation using a virtual actor blockchain modeling subsystem.

Figure 21:
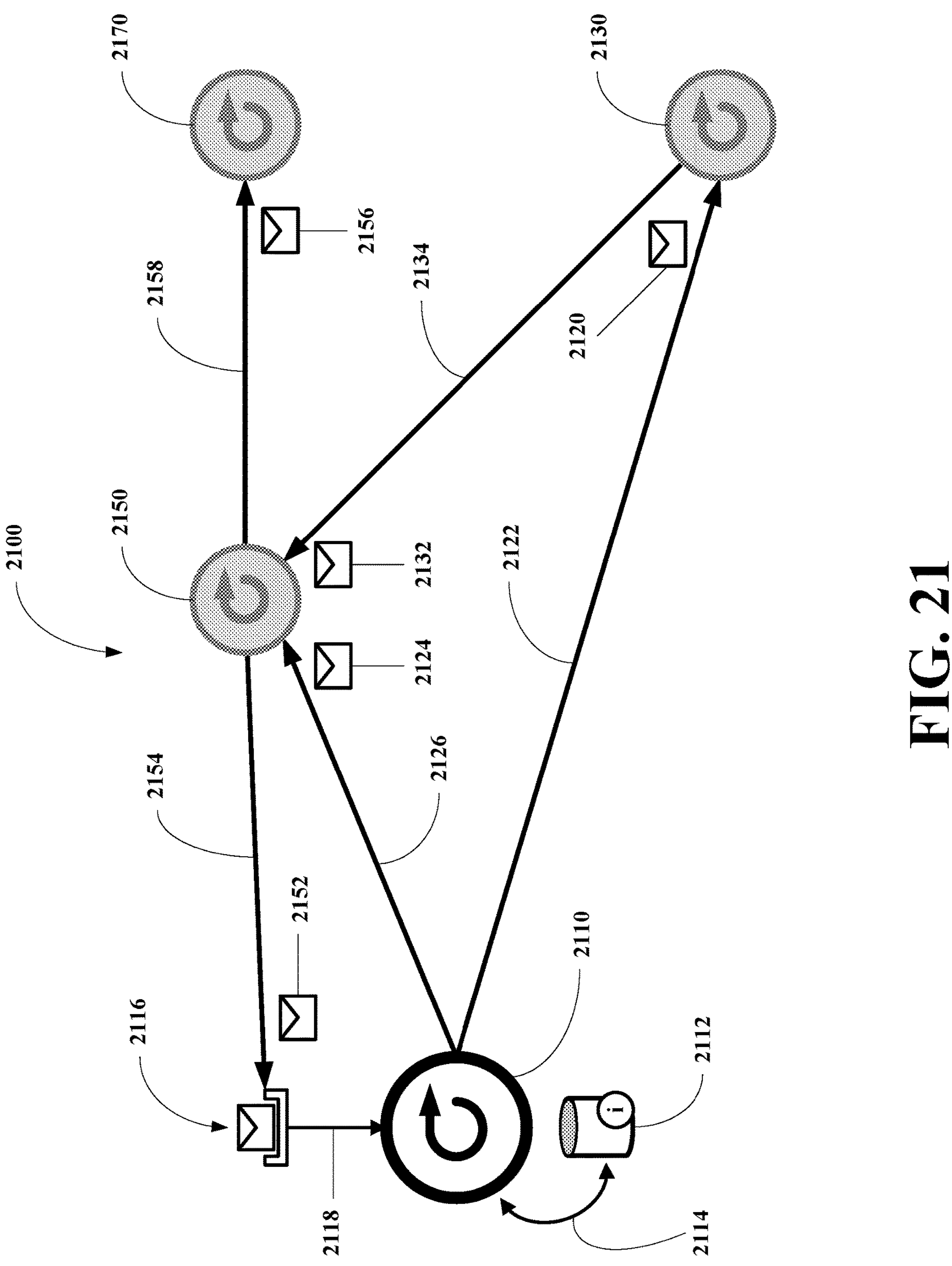

FIG. 21 depicts a graphical illustration of an embodiment of a virtual actor architecture implemented in a virtual actor blockchain modeling subsystem.

Figure 22:
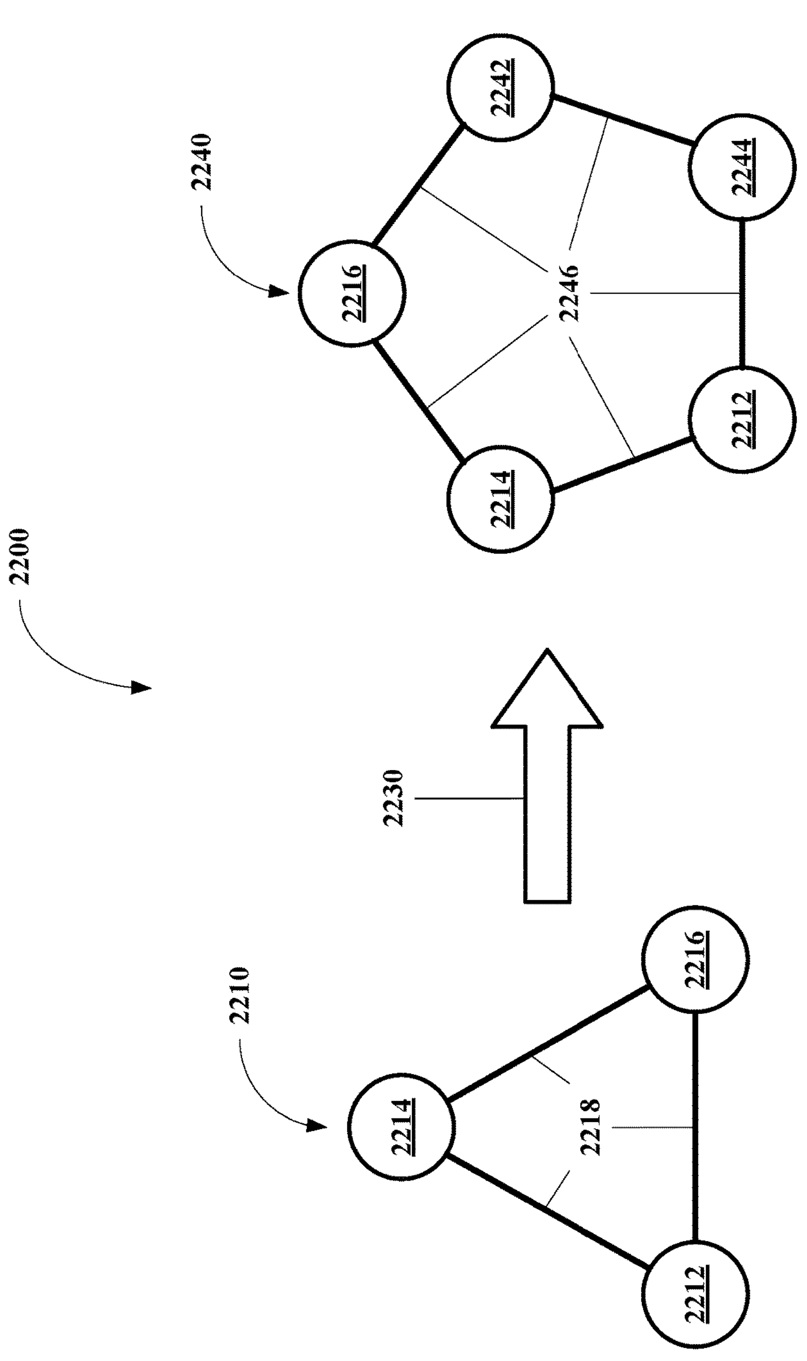
Figure 22:

FIG. 22 depicts a graphical illustration of an embodiment of virtual actor clusters and a process for dynamically scaling the virtual actor clusters.

Figure 23:
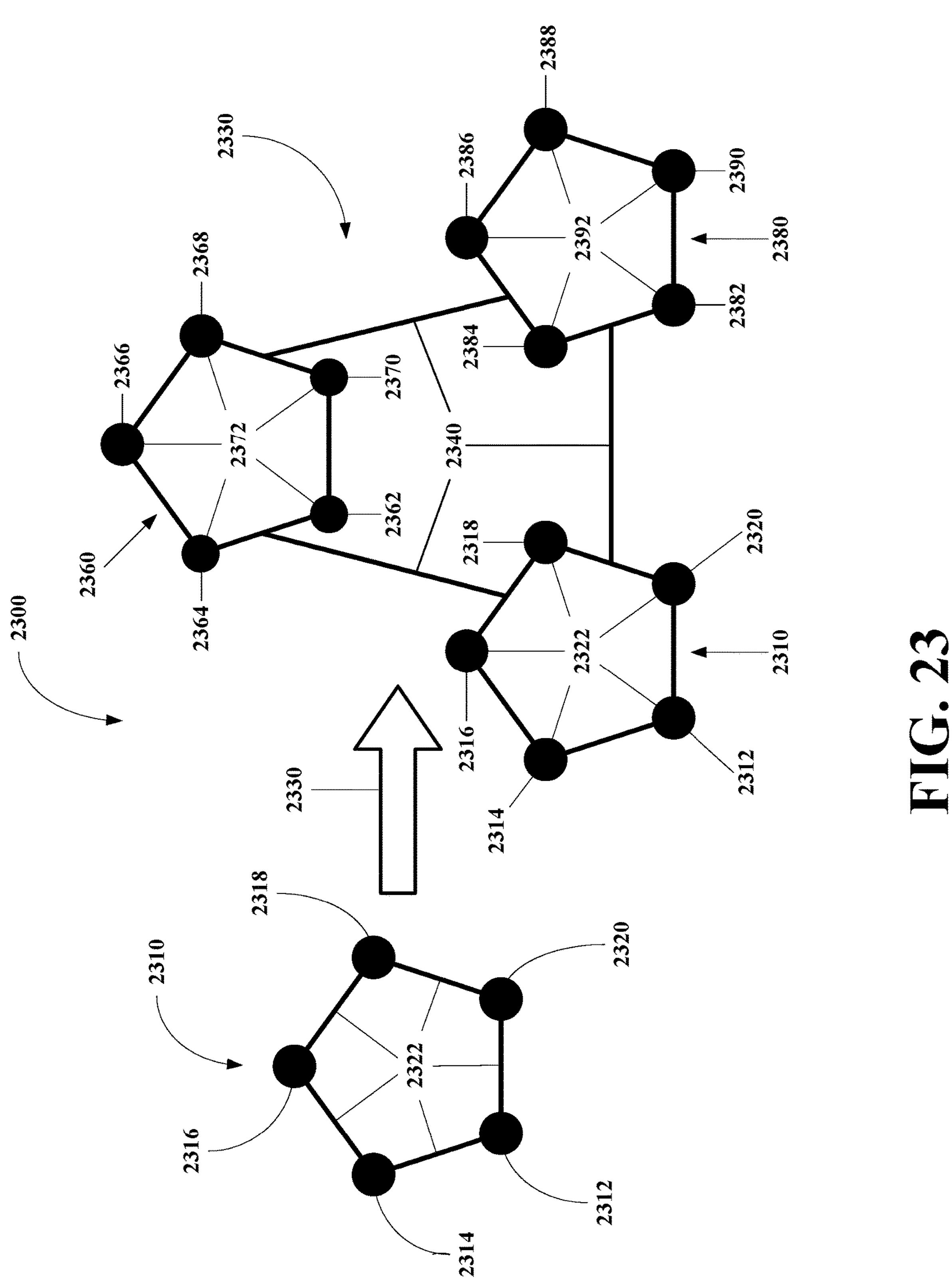

FIG. 23 depicts a graphical illustration of an embodiment of virtual actor cluster federated virtual actor cluster scaling.

Figure 24:
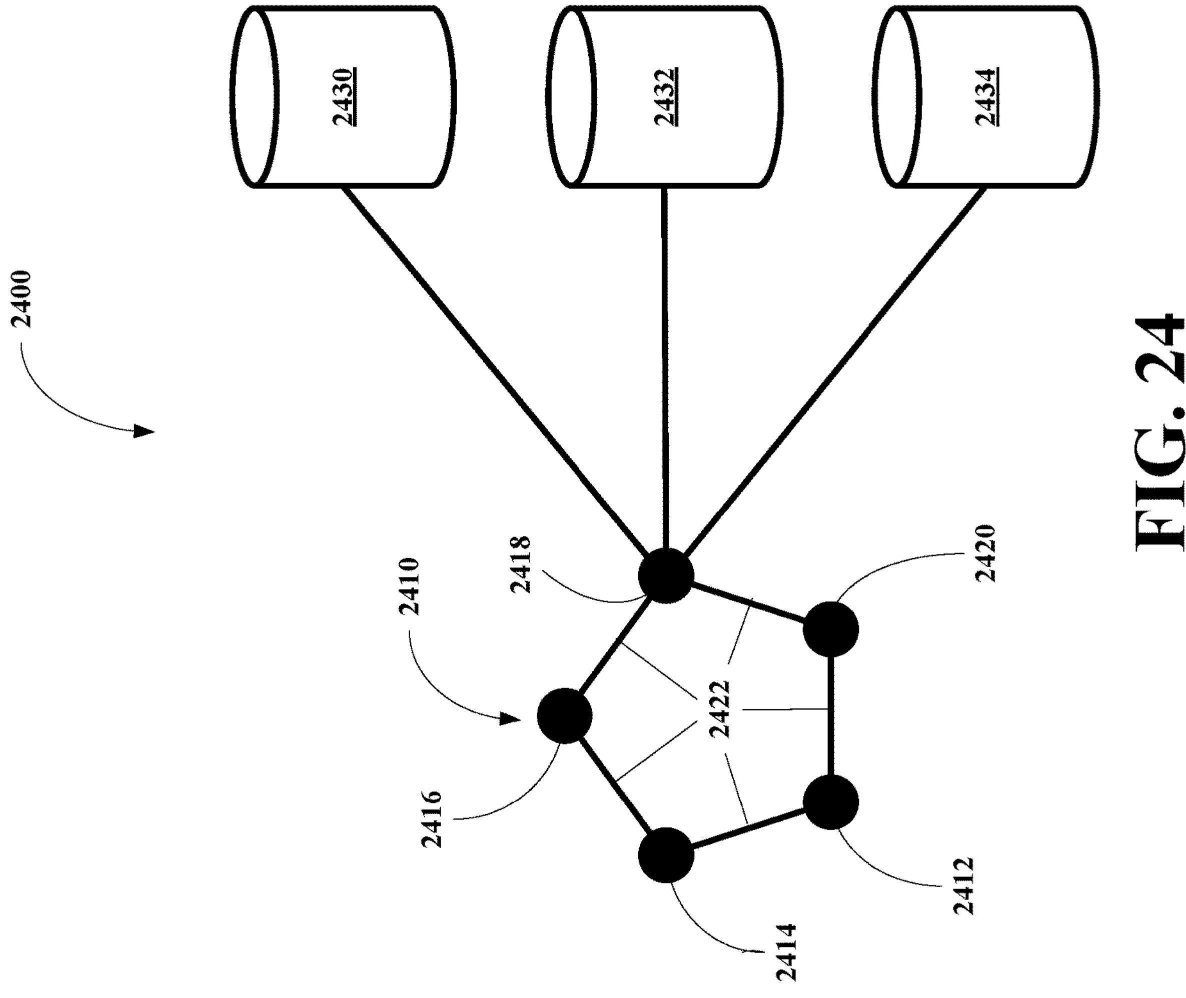

FIG. 24 depicts a graphical illustration of an embodiment of virtual actor cluster off-chain scaling using a cloud storage subsystem.

Figure 25:
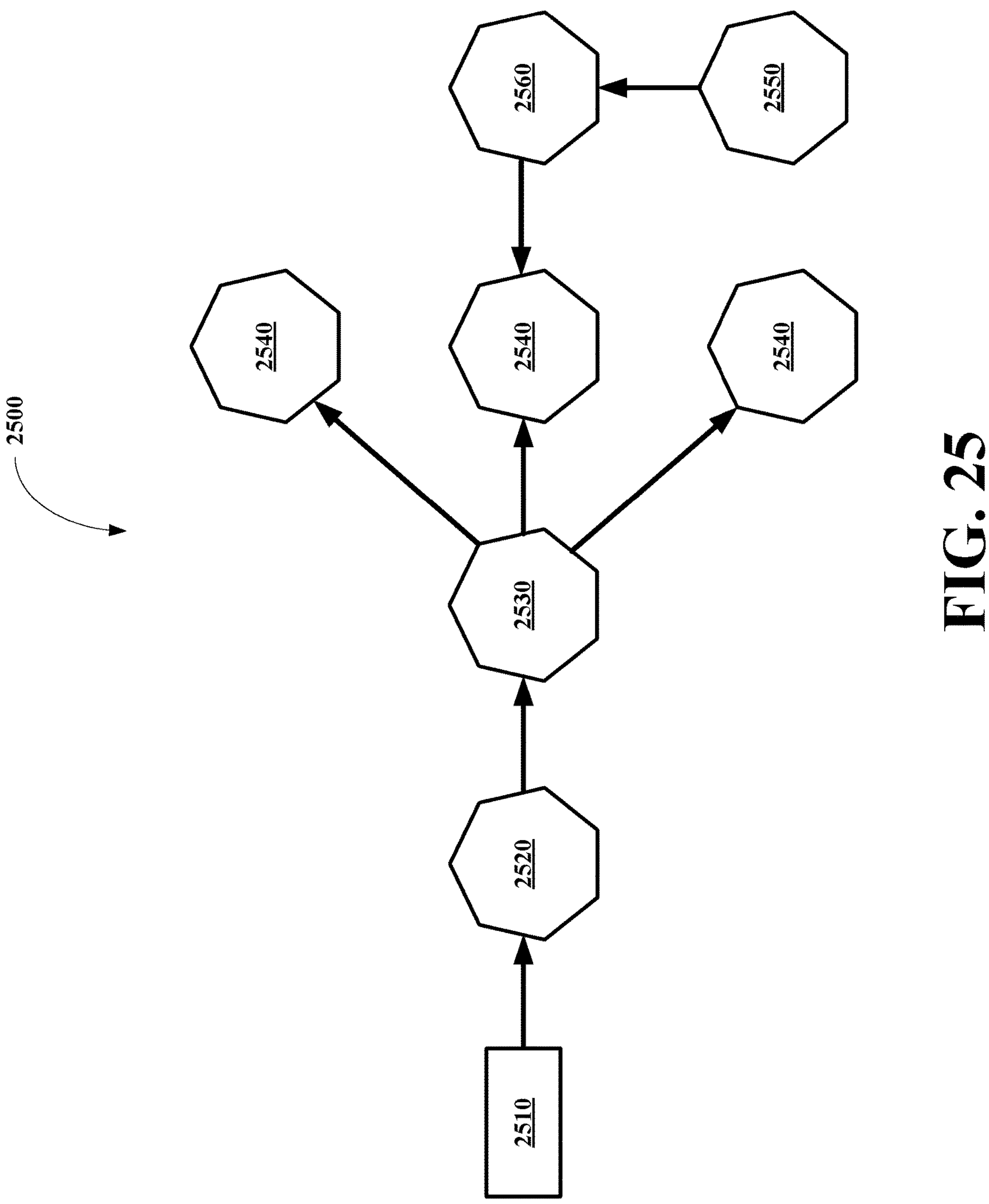

FIG. 25 depicts a graphical illustration of an embodiment of horizontal Pod autoscaling (HPA).

Figure 26:
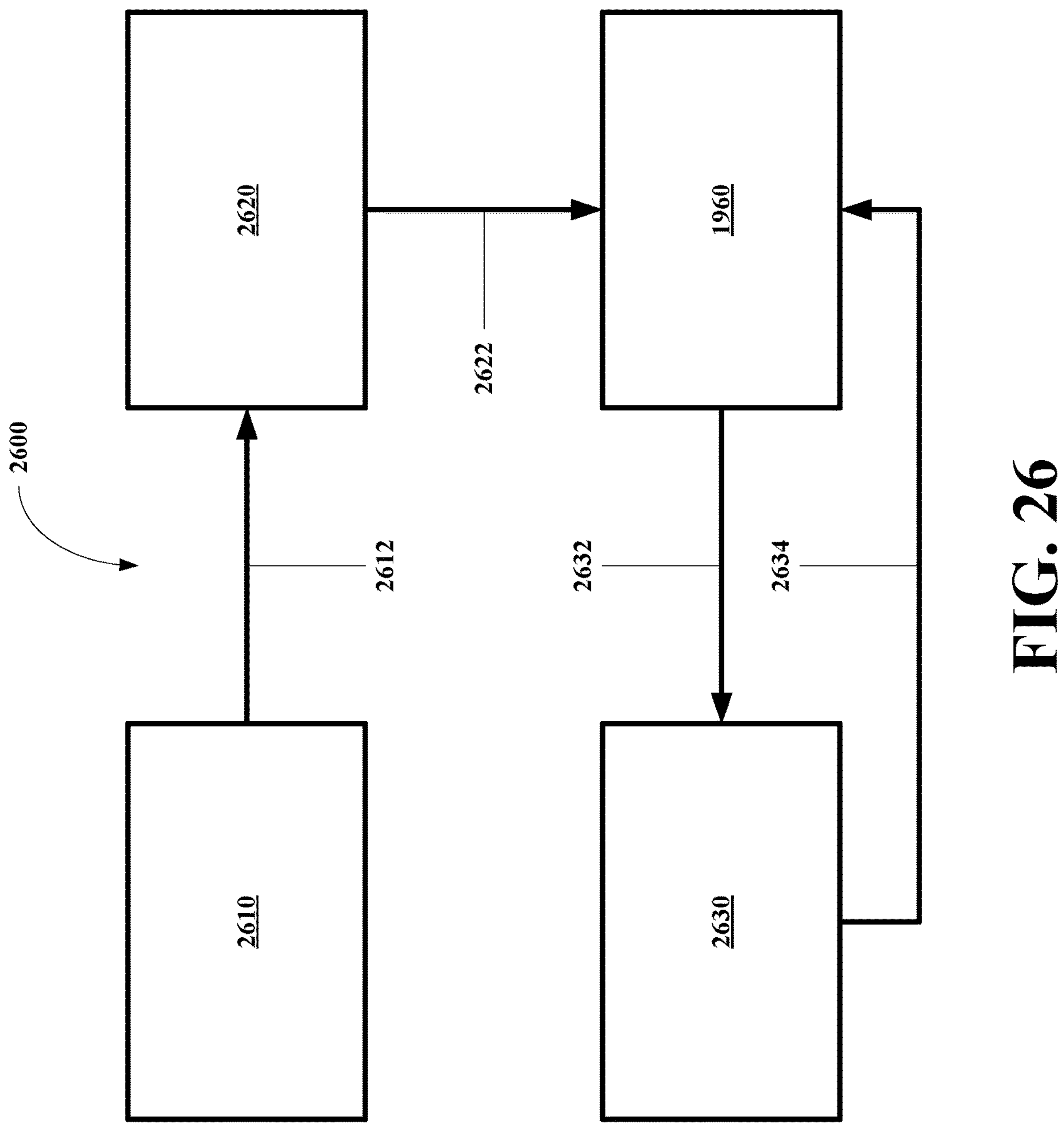

FIG. 26 depicts a graphical illustration of an embodiment of a data flow schema used for digital twinning within the virtual actor blockchain modeling subsystem.

Figure 27:
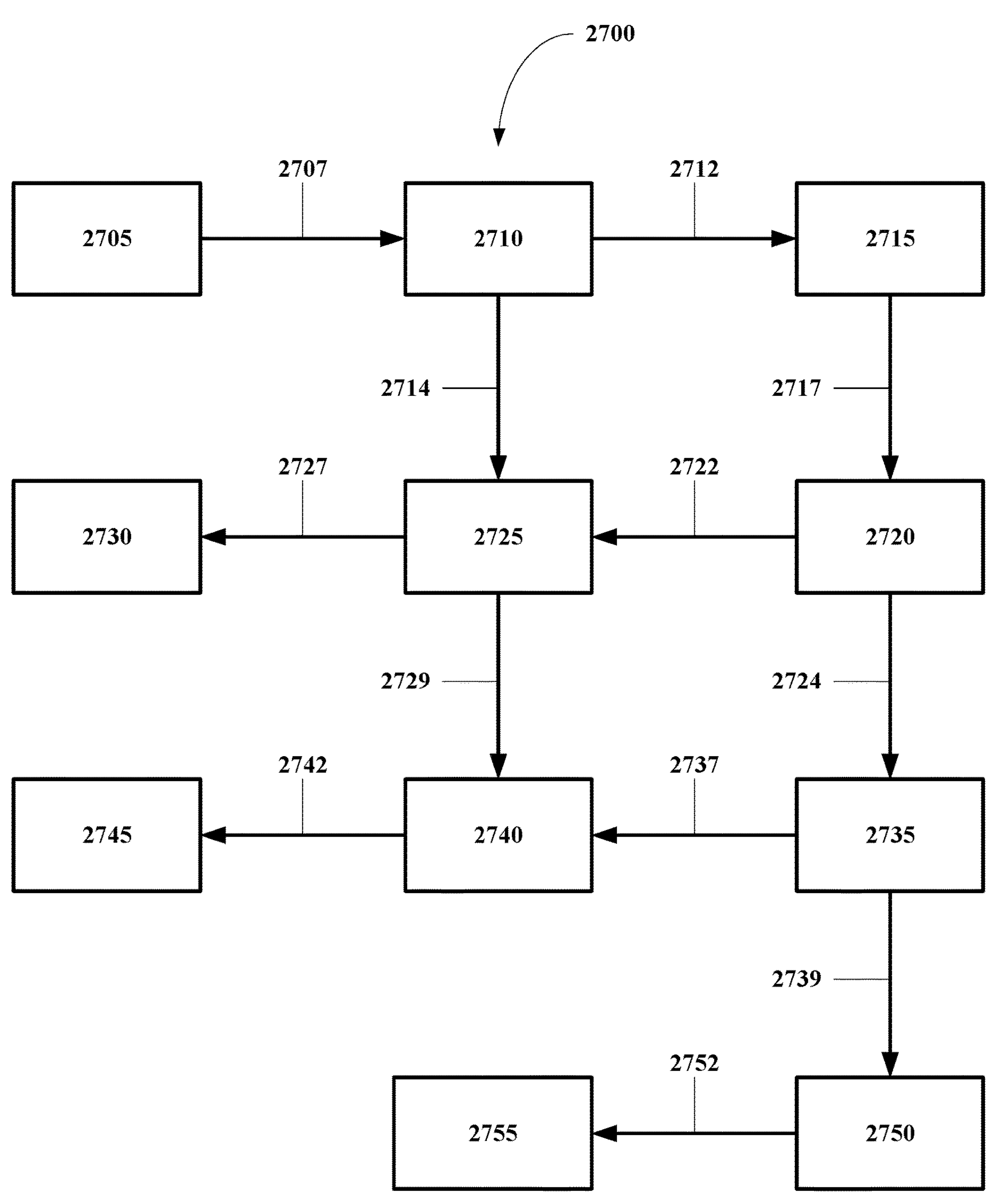

FIG. 27 depicts a graphical illustration of an embodiment of a digital transformation architectural layout implemented in the virtual actor blockchain modeling subsystem.

Figure 28A:
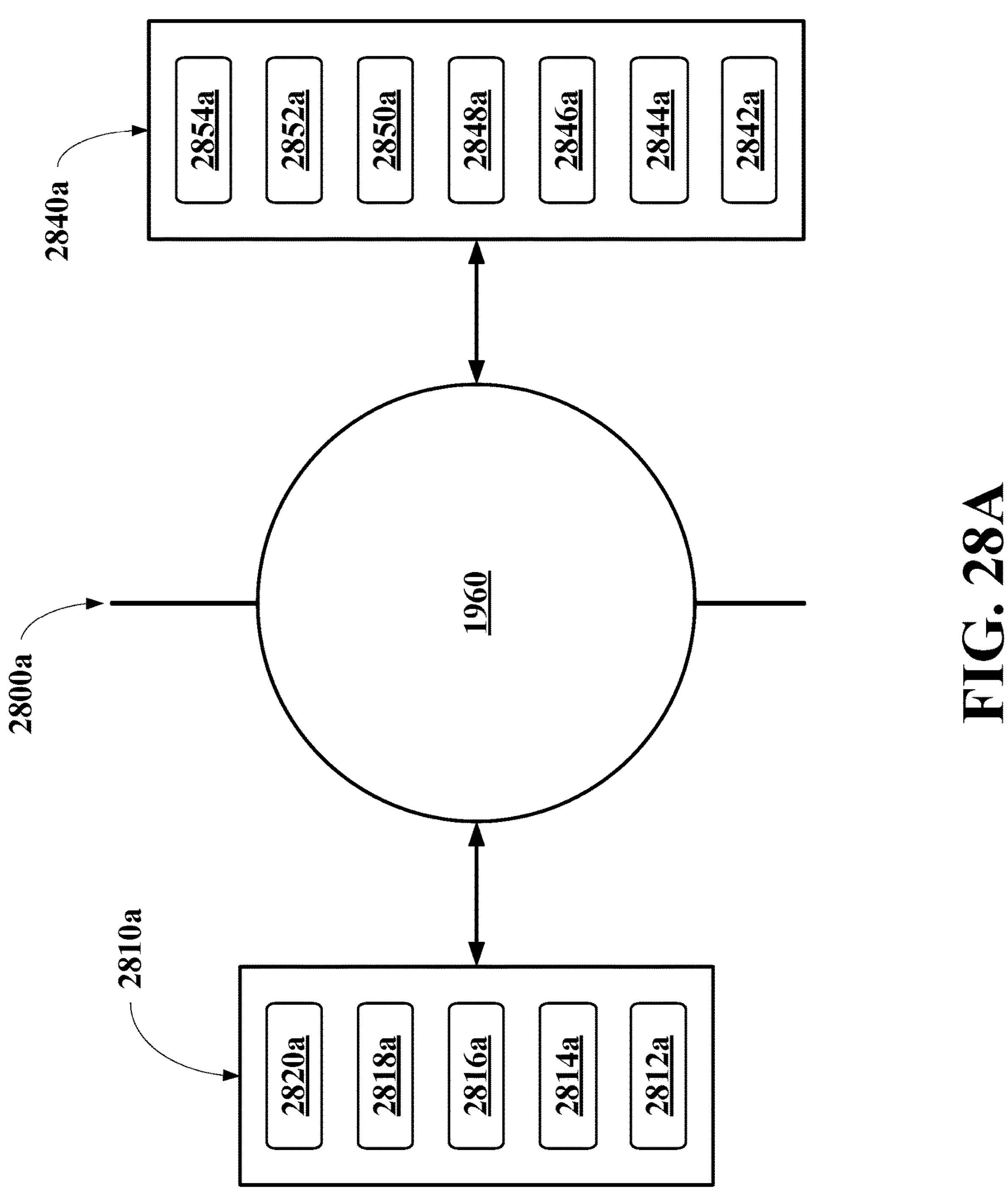

FIGS. 28A&B depict two graphical illustrations of an embodiment of a distributed ledger technology implemented in the virtual actor blockchain subsystem for facility data acquisition, data processing, facility/component modeling, and facility/component virtual twinning.

Figure 29:
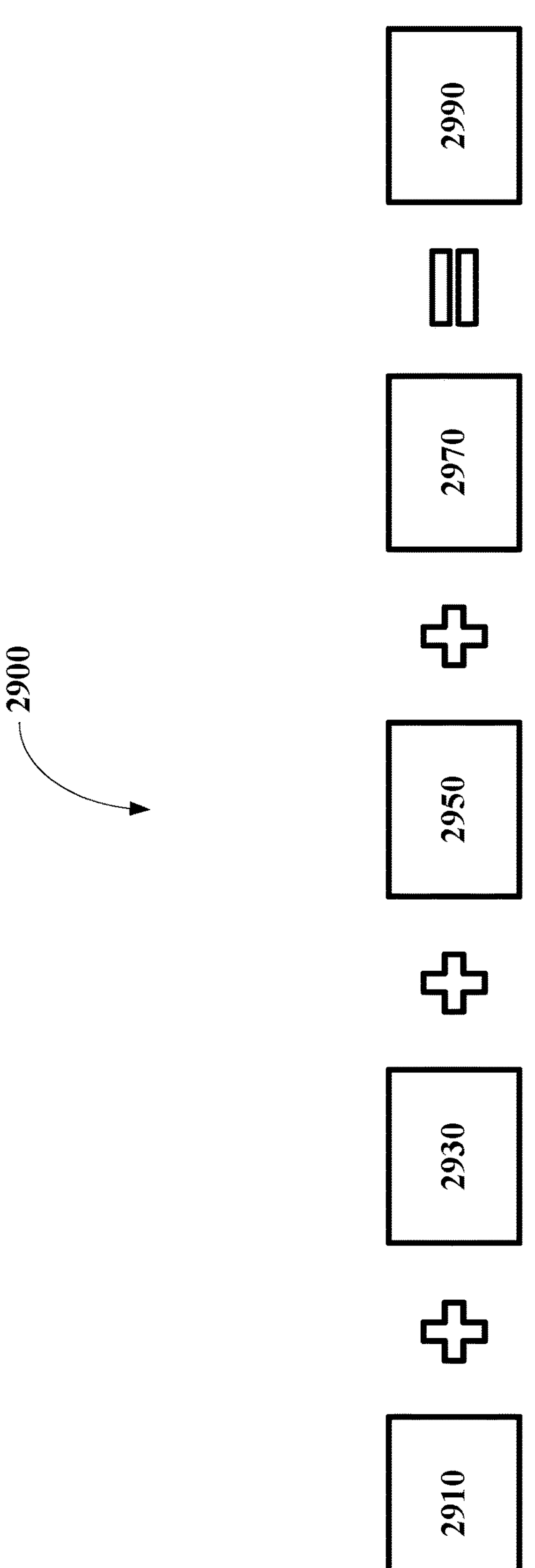
Figure 29:

FIG. 29 depicts a graphical illustration of an embodiment of a virtual actor blockchain subsystem simulator interface.

Figure 30:
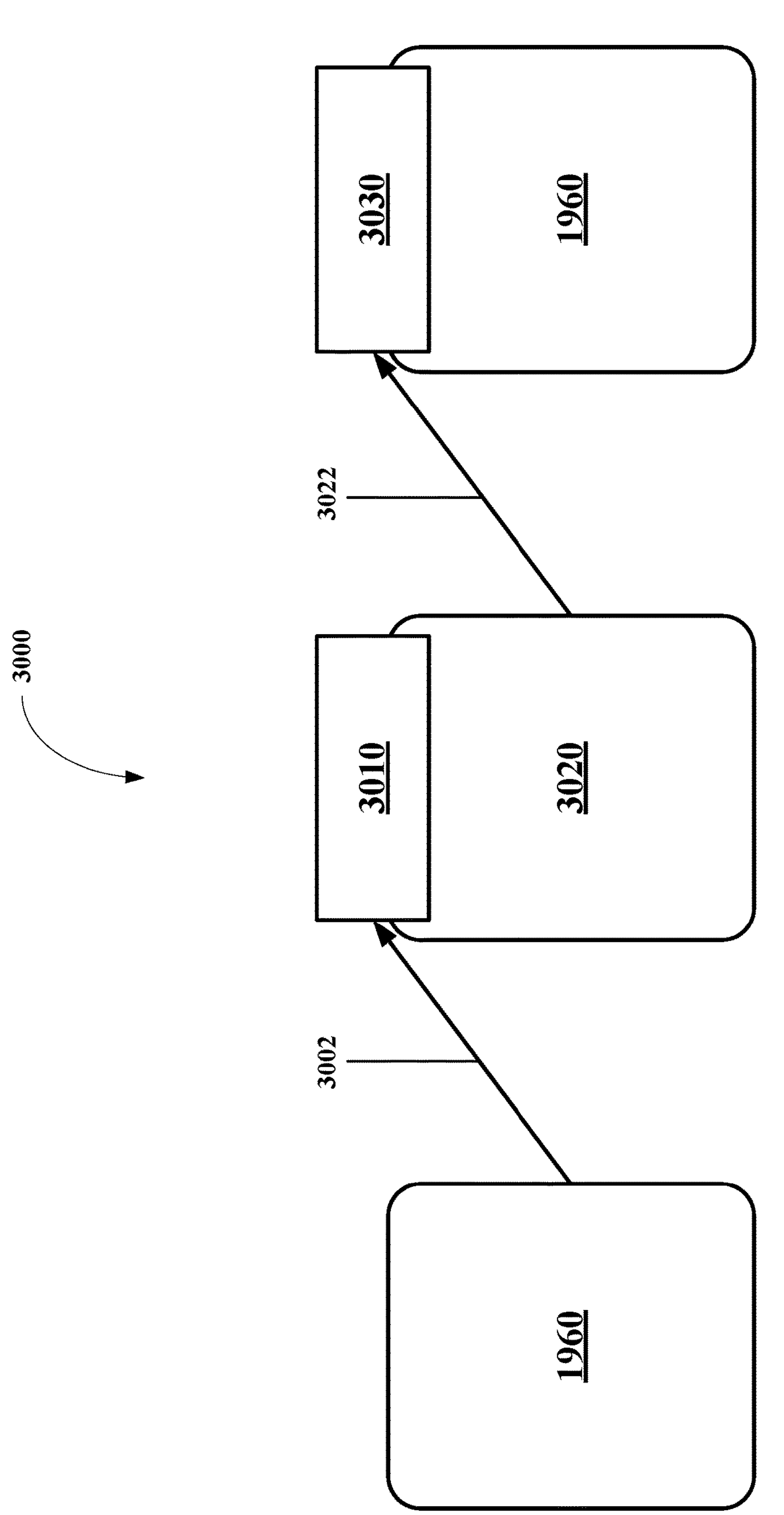

FIG. 30 depicts a graphical illustration of an embodiment of a virtual actor blockchain subsystem simulator interface.

Figure 31A:
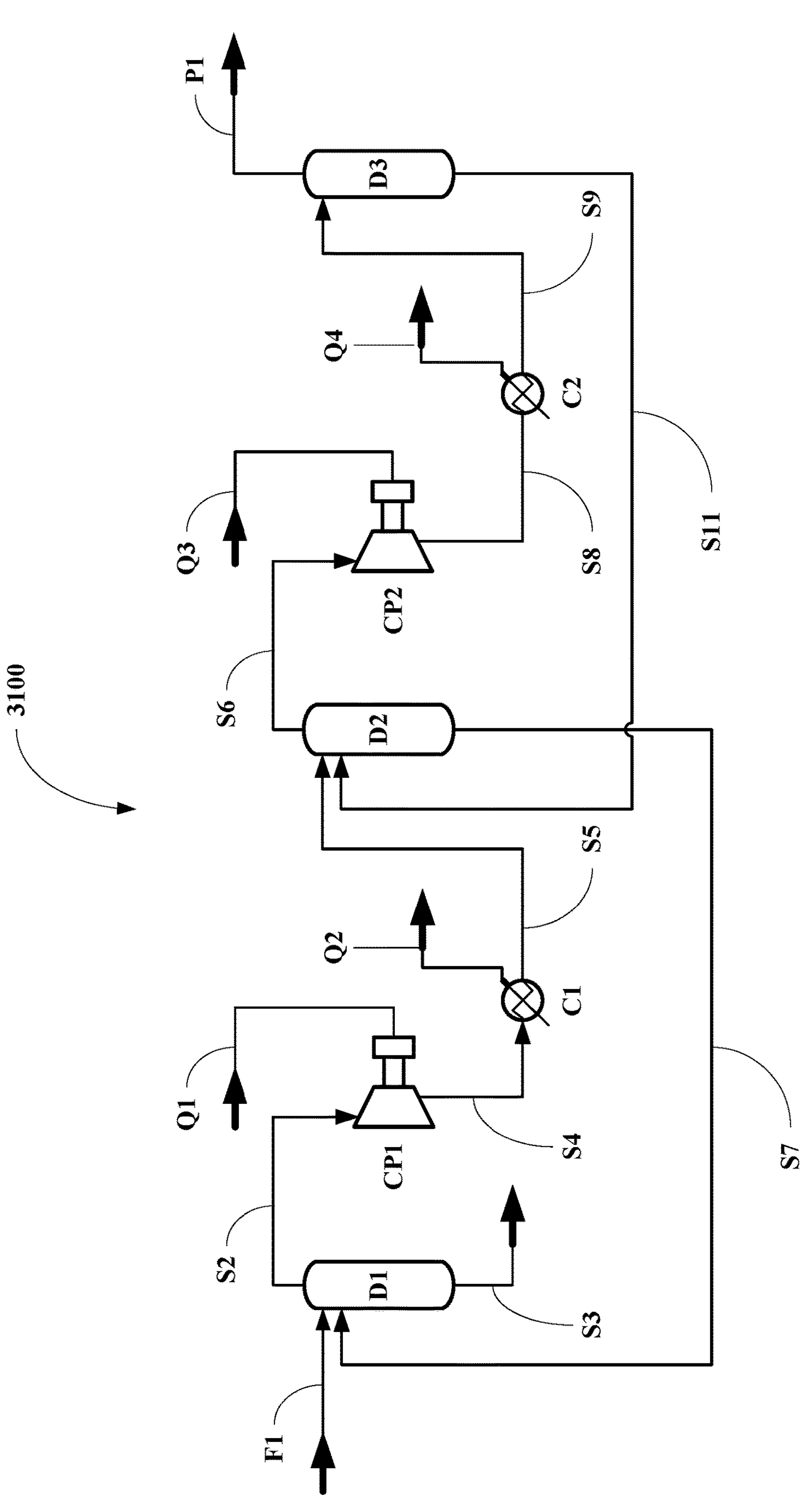

FIG. 31A depicts a graphical illustration of an embodiment of a two stage two-stage compressor facility component to be virtually twin via the virtual actor blockchain subsystem.

Figure 31B:
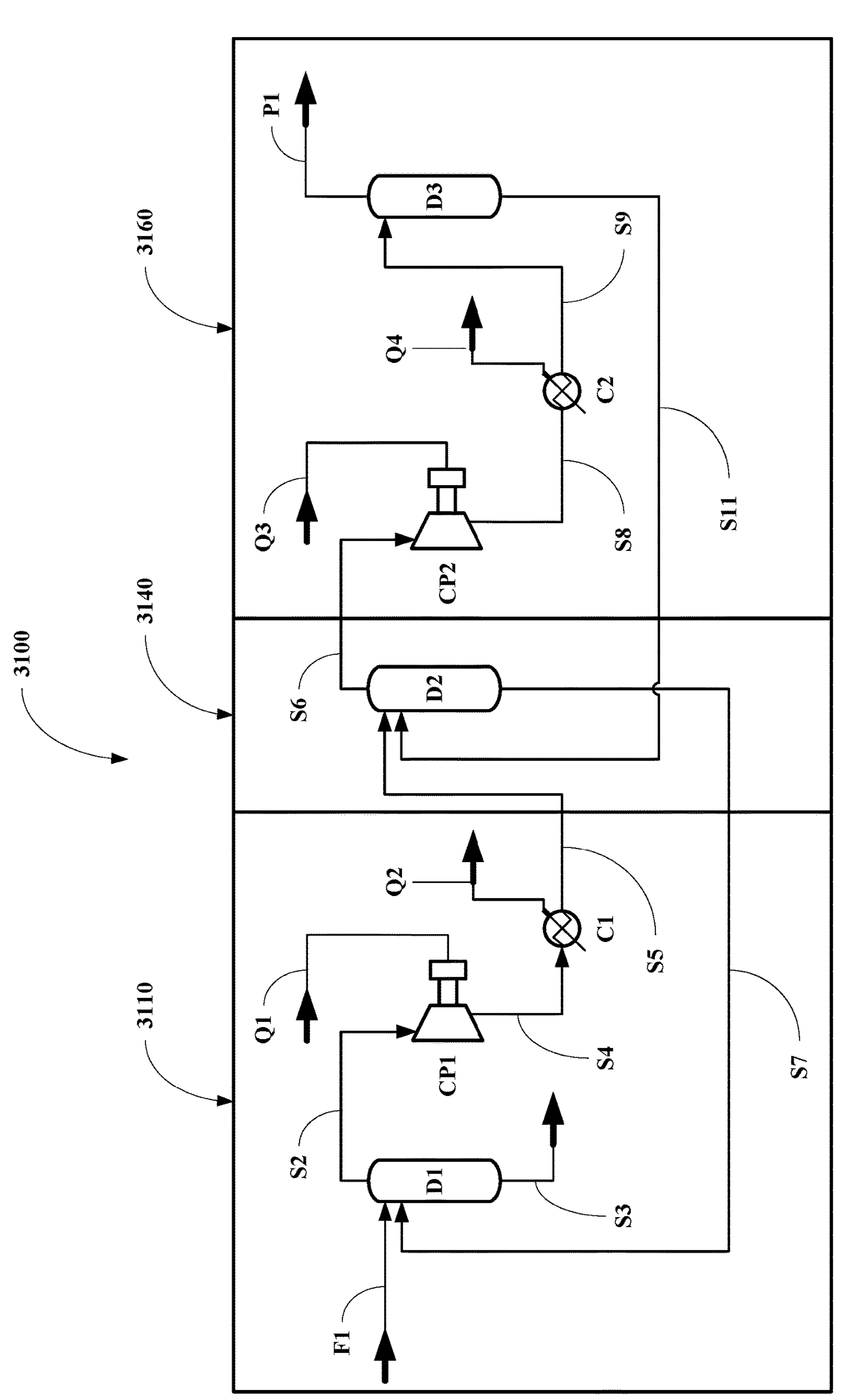

FIG. 31B depicts a graphical illustration of an embodiment of modeling of the two stage two-stage compressor facility component of FIG. 31A, wherein the two stage two-stage compressor facility component is divided into three sub-components for efficient sub-component modeling and an overall two stage two-stage compressor facility component modeling and the generation of a two stage two-stage compressor facility component virtual twin.

Figure 32:
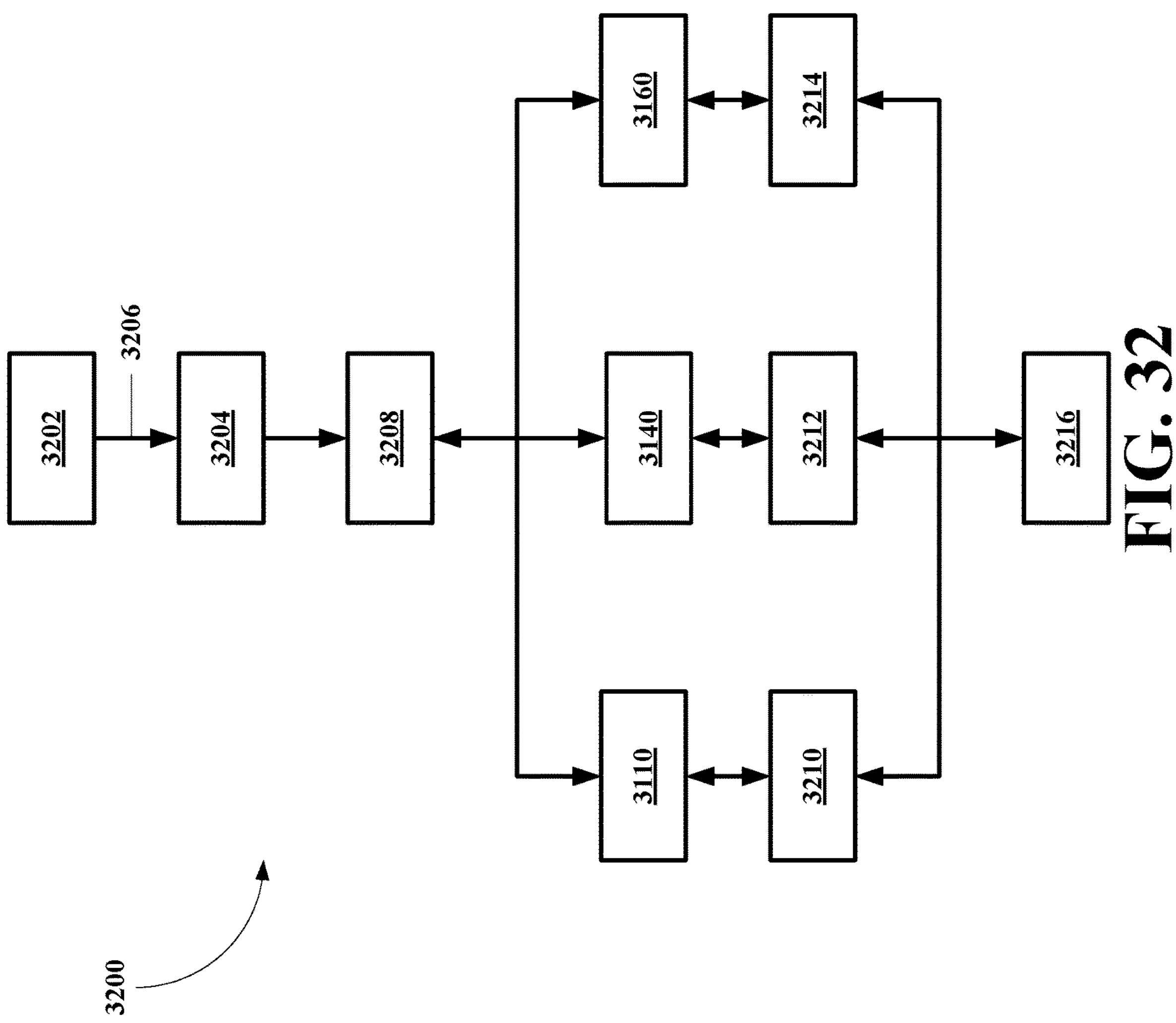

FIG. 32 depicts a graphical illustration of an embodiment of a solution architecture within the virtual actor blockchain subsystem for testing models and the virtual twinned facility/component generation based on the models.

Figure 33:
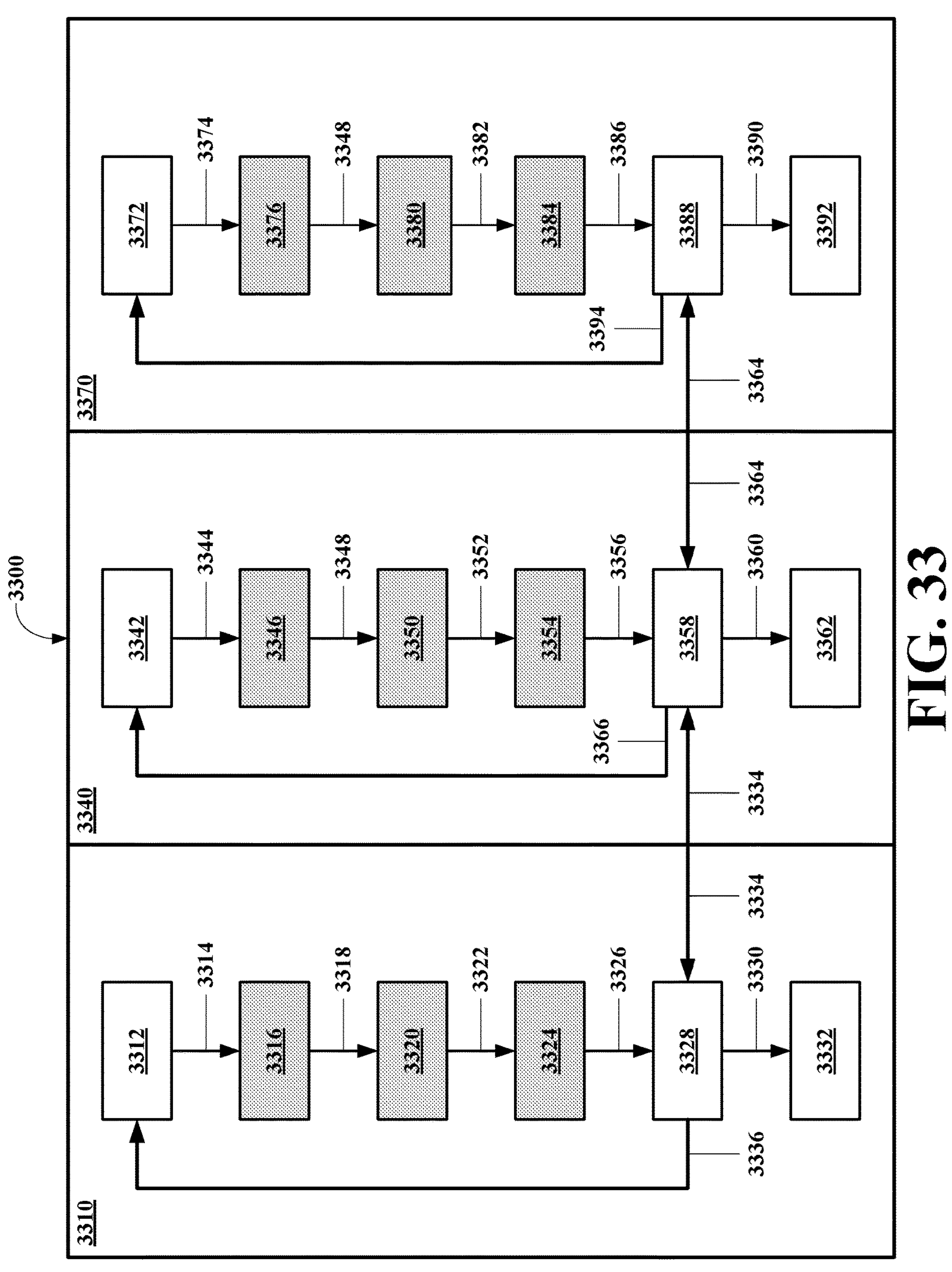

FIG. 33 depicts a graphical illustration of an embodiment of a detail data exchanging and run command calling within the virtual actor blockchain subsystem.

Figure 34:
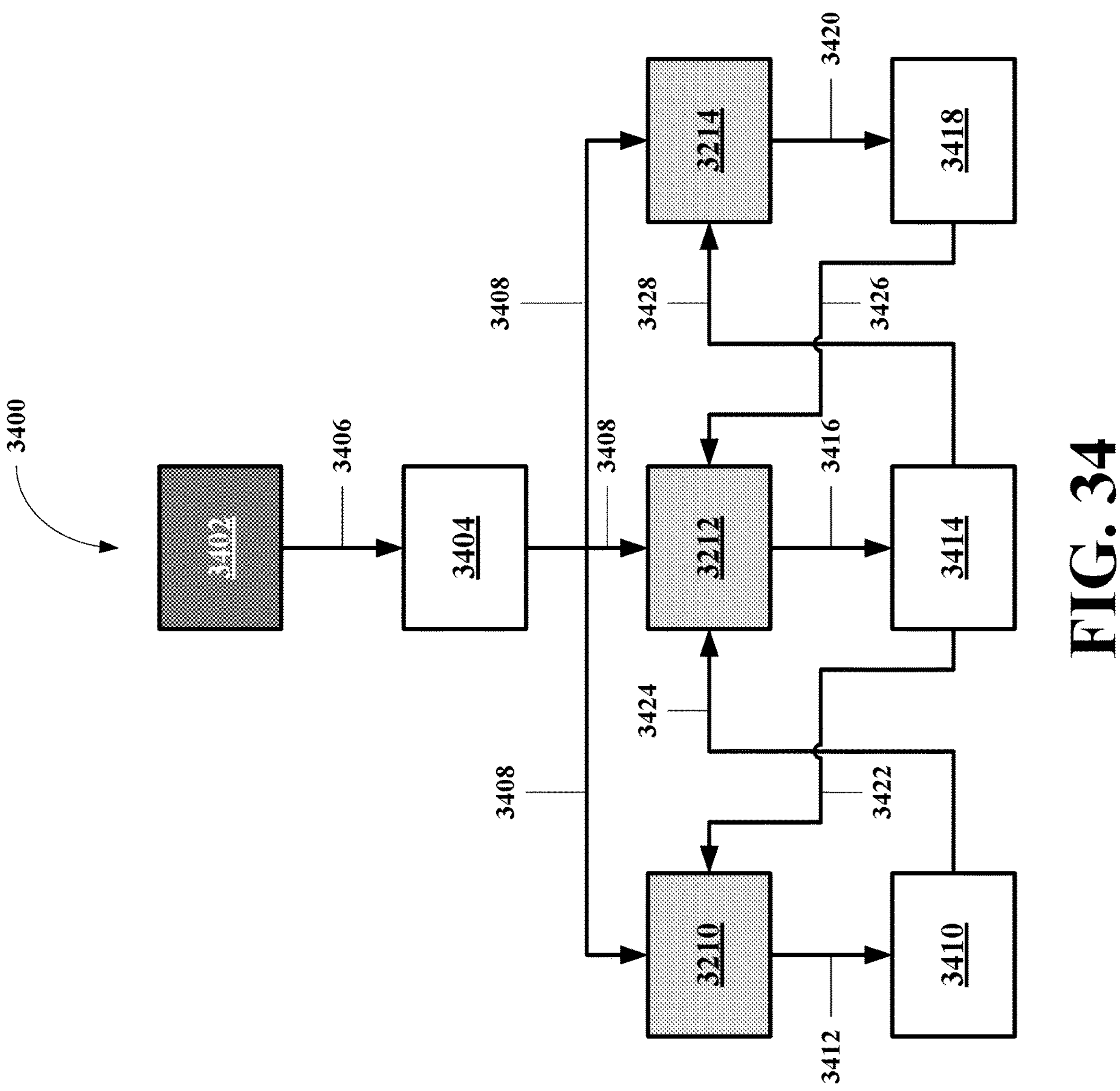

FIG. 34 depicts a graphical illustration of an embodiment of a process data flow configuration used by the virtual actor blockchain subsystem.

Figure 35:
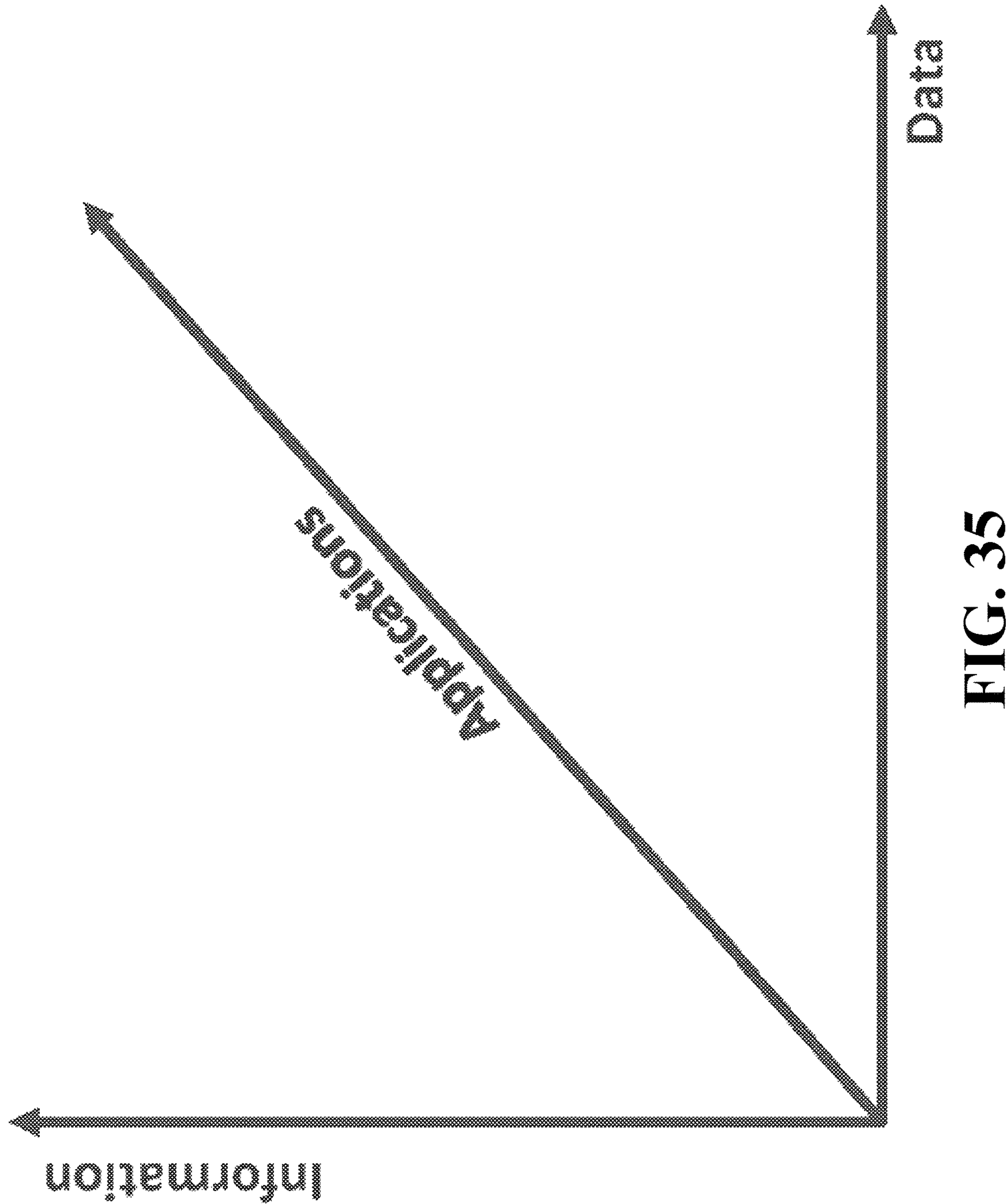

FIG. 35 depicts a 3D plot of information, data, and applications.

Figure 36:
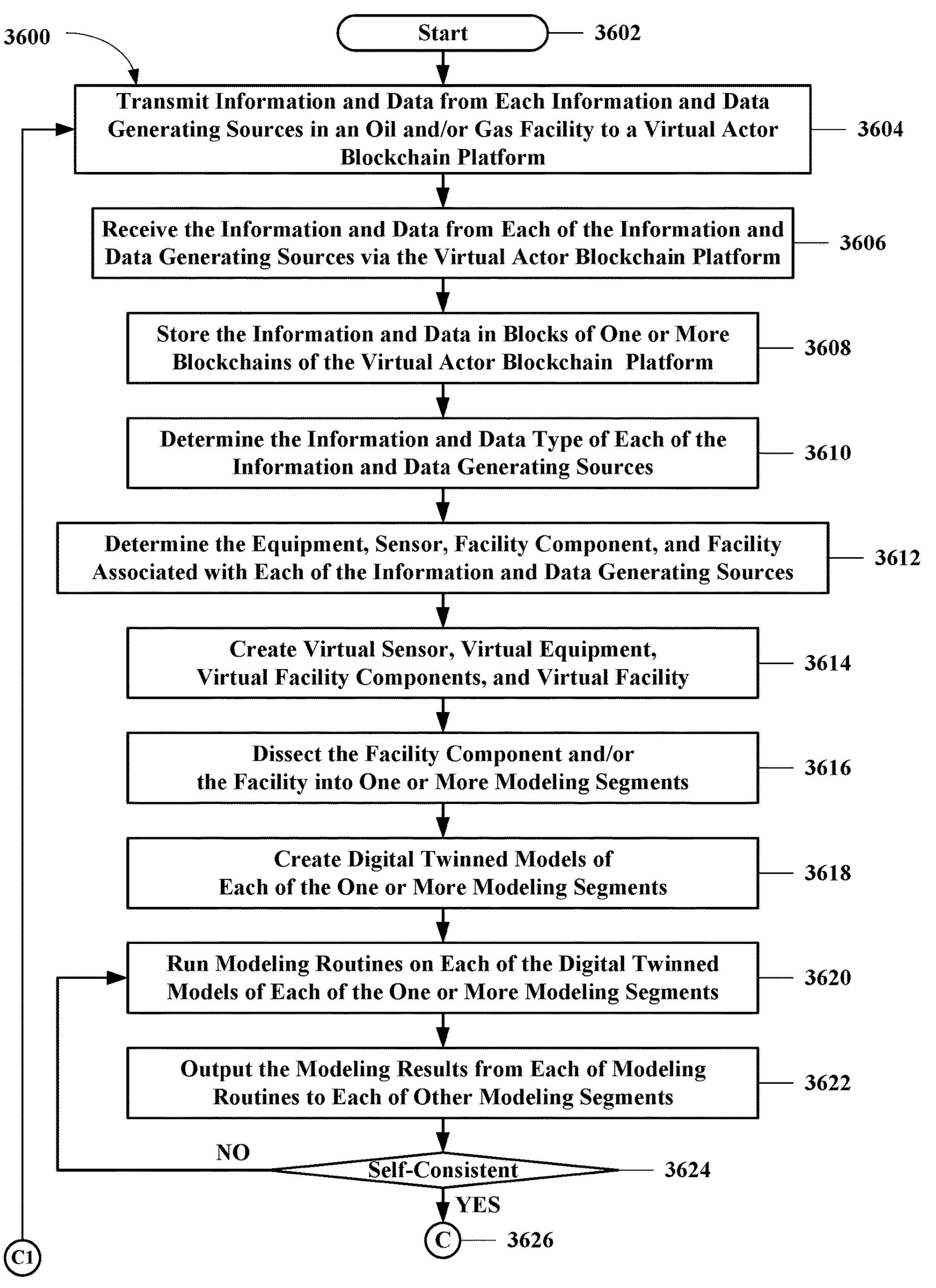

FIG. 36 depicts a schematic flowchart of an embodiment apparatus and method of this disclosure.

Figure 37:
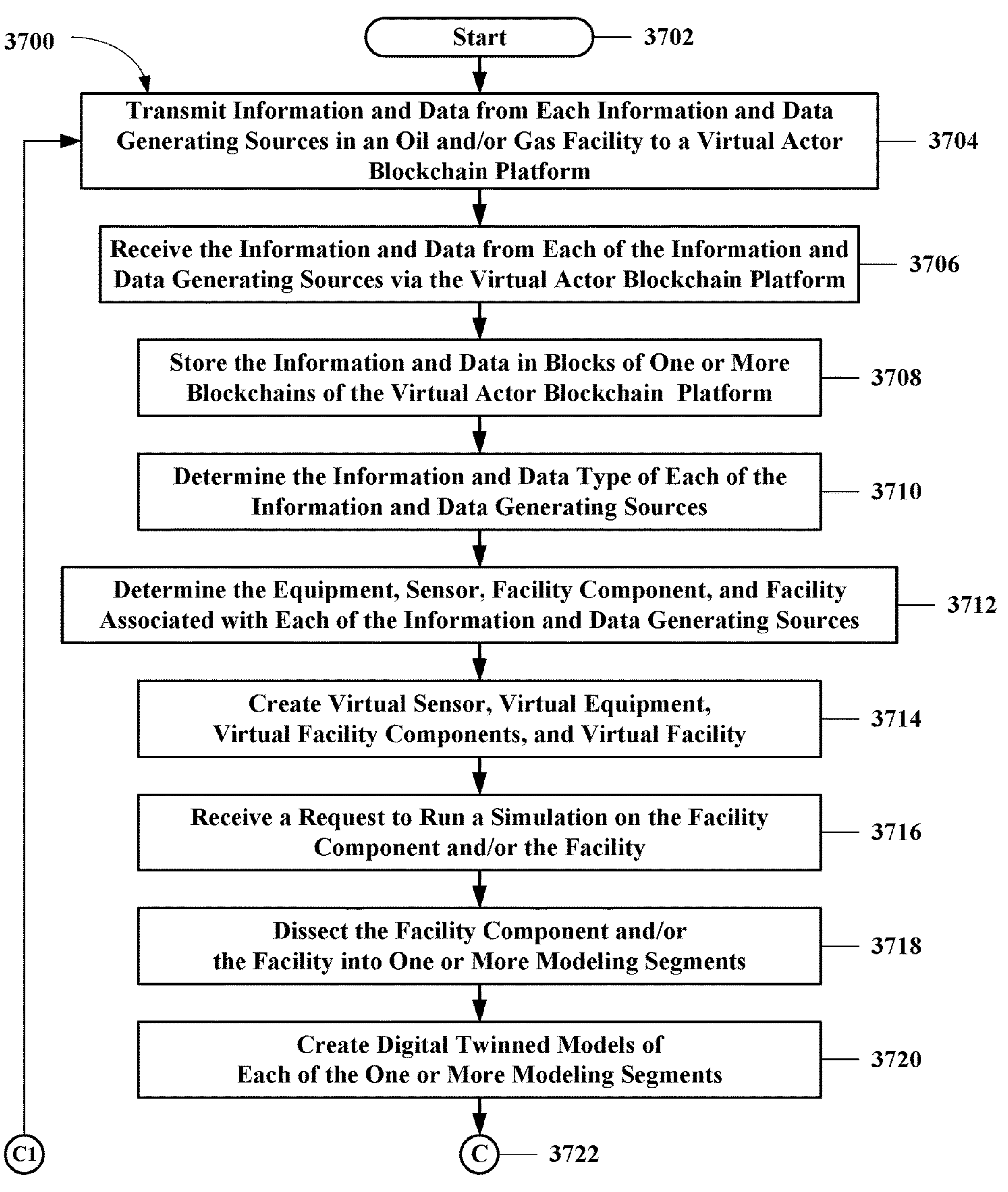

FIG. 37 depicts another schematic flowchart of another embodiment apparatus and method of this disclosure.

DEFINITIONS USED IN THE DISCLOSURE

As used in this disclosure and the appended claims, the singular forms "a", "an", and "the" include plural references unless the context clearly dictates otherwise. Thus, for example, references to "a computer" includes one or more computers, and/or compositions of the type described herein which will become apparent to those persons skilled in the art upon reading this disclosure and so forth.

Unless defined otherwise, all technical and scientific terms used herein have the same meaning as commonly understood by one of ordinary skill in the art to which this invention belongs. Any methods and materials similar or equivalent to those described herein may be used in the practice or testing of the methodology and technology of this disclosure, as it will be understood that modifications and variations are encompassed within the spirit and scope of the instant disclosure.

The terms "at least one", "one or more" or "one or a plurality", are often used interchangeably within this disclosure. For example, at least one device means one or more devices or one device and a plurality of devices.

The terms "about" and "approximately" mean that a stated value of a given quantity is within +20% of the stated value, or within ±15% of the stated value, or within ±10% of the stated value, or within +5% of the stated value, or within +2.5% of the stated value, or within +1% of the stated value.

The term "substantially" or "significantly" or "essentially" means that a stated value of a given quantity is within ±5% of the stated value, or within +2.5% of the stated value, or within +2% of the stated value, or within +1% of the stated value, or within +0.1% of the stated value.

The terms "contain", "containing", "comprise", "comprising", 'include", "including", "has", "have", and "having" are open ended claim transition terms.

The term "consisting essentially of" is an in between claim transition term.

The term "consisting of" is a narrow claim transition term.

The term "selected from the group consisting of" means a Markush group.

The term "blockchain" means a digital database containing information (such as records of financial transactions or facility data) that may be simultaneously used and shared within a large decentralized, publicly or private accessible network.

The term "distributed architecture" means components are presented on different platforms and several components may cooperate with one another over a communication network in order to achieve a specific objective or goal.

The term "event driven architecture" means a software architecture paradigm for promoting the production, detection, consumption of, and reaction to events. An event may be defined as "a significant change in state". For example, when a consumer purchases a car, the car's state changes from "for sale" to "sold". For example, when a sensor data indicated a sensor trigger event, the sensor's state changes from "normal" to "trigger event", such as a temperature senor registering a temperature out of an acceptable range or a pressure sensor registering a pressure out of an acceptable range.

The term "message driven architecture" means a software architecture paradigm for promoting the production, detection, consumption of, and reaction to messages. An event or a message may be defined as "a significant change in state", e.g., when a consumer purchases a car, the car's state changes from "for sale" to "sold".

The term "instance" means a concrete occurrence of any object, existing usually during the runtime of a computer program.

The term "incarnation" means a separate version of a database. For example, the incarnation of a database changes when you opens open that database or updates the data, when you opens open the database in a recovery mode such as a rest logic operations operation (e.g., RESETLOGS option for specific databases). Of course, data may be recovered from any prior incarnation so long as the necessary redo operation is available.

The term "virtual actor" means a primitive unit of computation. Virtual actors are completely isolated and never share memory and are thus stateful.

The term "virtual actor pattern" or "virtual actor architecture" means a computational model for concurrent or distributed systems in which a large number of virtual actors may execute or act simultaneously and independently of each other.

The terms "virtual machine", "VM", and "virtual guest machine" mean a compute resource that uses software instead of a physical computer to run programs and deploy applications (apps). One or more virtual machines or virtual guest machines may run on a single physical "host" machine. Each VM runs its own operating system and functions separately from and independently of the other VMs, even when they are all running on the same host. For example, a virtual MacOS machine may run on a physical personal computer (PC) or one a physical MacOS server or server installation. VM technology may be used for many applications across on-premise environments, private environments, private cloud environments, and public cloud environments. More recently, public cloud services are using virtual machines to provide virtual application resources to multiple users at once, for even more cost efficient and flexible computing.

The term "server" means a computer or computer system that provides resources, data, services, and/or programs to other computers, known as clients, over a network. In theory, whenever computers share resources with client machines—, —they are considered servers. There are many types of servers, including, without limitation, web servers, mail servers, virtual servers, etc. Alternatively, the term "server" means a powerful physical or virtual infrastructure that performs application and information processing, analysis, mining, and storage. Cloud servers are created using vitalization software to divide a physical (bare metal) server into multiple virtual servers. Organizations use an infrastructure-as-a-service (IaaS) model to process workloads, share, and store information. The organization may then access virtual server functions remotely through an online interface.

The term "RPC" means a Remote Procedure Call. RPC is a lightweight communication protocol for facilitating interactions among software applications. RPC's primary function focuses on allowing programs to communicate with remote programs hosted on another network. Most important of all, RPC calls do not involve the need for details regarding the server network. Any individual may use an RPC from their local computer to request different resources from a remote server system. Upon finalizing the request by a client, RPC prompts the server to execute a subroutine, a credible procedure. The RPC node blockchain relationship is clearly evident in how decentralized applications need blockchain data for proper functionalities. In the case of the RPC client-server model, the decentralized applications act as clients, while the RPC node takes on the role of the server.

The term "DMZ", as it pertains to computer security, means a demilitarized zone (sometimes referred to as a perimeter network or screened subnet).

The term "LAN" means a local area network.

The term "PAN" means sPersonal a Personal Area Network.

The term "WAN" means a Wide Area Network.

The term "SAN" means a Storage Area Network.

The term "MAN" means a Metropolitan Area Network.

The terms "system", "data store", and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

The term "big data" refers to large, diverse sets of information that grow at ever-increasing rates. Big data encompasses volume information/data created and collected at a given velocity or speed, and a variety or scope of data points being covered (known as the "three v's" of big data). Big data often comes from data mining and arrives in multiple formats from multiple data creating centers or data output devices. Big data generally comprises a great quantity of diverse information/data that arrives in increasing volumes and with ever-higher velocity. Big data my be structured, e.g., often numeric in nature and is easily formatted and stored, or unstructured, e.g., free-form or data that is not quantifiable as in the case of structured data. Big data may be analyzed and mined to extract trends and to identify problems and to support modeling and simulations. Big data may be collected from public or private intranets, from public or private internets, from public or private social media networks, from public or private websites, from personal electronic devices, from personal apps, from questionnaires, from product purchases, and/or from electronic check-ins. Big data is most often stored in computer databases and is analyzed using software specifically designed to handle large, complex data sets.

Big data may be categorized as unstructured or structured. Structured data includes information already managed by an organization in databases and spreadsheets; it is frequently numeric in nature. Unstructured data is information that is unorganized and does not fall into a predetermined model or format including data gathered from social media sources, which help institutions gather information on customer needs.

Big data may be collected from sensors and other outputs from smart devices allowing data gathering across a broad spectrum of situations and circumstances. Big data is generally stored in databases and is analyzed using software specifically designed to handle large, complex data sets using software-as-a-service (SaaS) platforms designed to manage complex and voluminous data.

Big data is generally used in data analytics to look for relationships between different types of data, such as demographic data and purchase history, to determine whether a correlation exists. Such assessments may be done in-house or externally by a third-party that focuses on processing big data into digestible formats. Businesses often use the assessment of big data by such experts to turn it into actionable information. Many companies, such as Alphabet and Meta (formerly Facebook), use big data to generate ad revenue by placing targeted ads to users on social media and those surfing the web.

Nearly every department in a company may utilize findings from data analysis, from human resources and technology to marketing and sales. The goal of big data is to increase the speed at which products get to market, to reduce the amount of time and resources required to gain market adoption, target audiences, and to ensure customers remain satisfied.

Big Data generally have certain advantages and disadvantages. In general, more data may allow a company to better tailor products and marketing efforts in order to create the highest level of satisfaction and repeat business.

The term "self-consistent" means that changes in results produced by two consecutive simulations or calculations or computations differ by less than or equal to one or more completion criteria, wherein the completion criteria will depend on the simulation and/or on user provided criteria.

The term "AI" means artificial intelligence, the ability of a digital computer or computer-controlled robot to perform tasks commonly associated with intelligent beings. The term is frequently applied to the project of developing systems endowed with the intellectual processes characteristic of humans, such as the ability to reason, discover meaning, generalize, or learn from past experience. Since the development of the digital computer in the 1940s, it has been demonstrated that computers can be programmed to carry out very complex tasks—such as discovering proofs for mathematical theorems or playing chess—with great proficiency. Still, despite continuing advances in computer processing speed and memory capacity, there are as yet no programs that can match full human flexibility over wider domains or in tasks requiring much everyday knowledge. On the other hand, some programs have attained the performance levels of human experts and professionals in performing certain specific tasks, so that artificial intelligence in this limited sense is found in applications as diverse as medical diagnosis, computer search engines, voice or handwriting recognition, and chatbots.

The term "ML" means machine learning is a subfield of artificial intelligence (AI) that uses algorithms trained on data sets to create self-learning models that are capable of predicting outcomes and classifying information without human intervention. Machine learning is used today for a wide range of commercial purposes, including suggesting products to consumers based on their past purchases, predicting stock market fluctuations, and translating text from one language to another. In common usage, the terms "machine learning" and "artificial intelligence" are often used interchangeably with one another due to the prevalence of machine learning for AI purposes in the world today. But, the two terms are meaningfully distinct. While AI refers to the general attempt to create machines capable of human-like cognitive abilities, machine learning specifically refers to the use of algorithms and data sets to do so.

The term "DL" means deep learning is a branch of machine learning that is made up of a neural network with three or more layers: (1) Input layer: data enters through the input layer; (2) hidden layers: hidden layers process and transport data to other layers; and (3) Output layer: the final result or prediction is made in the output layer. Neural networks attempt to model human learning by digesting and analyzing massive amounts of information, also known as training data. They perform a given task with that data repeatedly, improving in accuracy each time. It's similar to the way we study and practice to improve skills.

The term "data silo(s)" or "IT silo(s)" are isolated points in a system or facility including data purposely or accidently segregated from other data sources within the system or facility. These types of segregated data environments can impede an organization's use of information and render the organization's communication technology architecture inefficient. Data silos often occur in large organizations because departmental units often have their own business priorities and can be created on purpose or just through growth and can result in data and knowledge hoarding.

The language used herein has been principally selected for readability and instructional purposes, and it may not have been selected to delineate or circumscribe the inventive subject matter. Other implementations, uses and advantages of the invention will be apparent to those skilled in the art from consideration of the specification and practice of the invention disclosed herein.

DETAILED DESCRIPTION OF THE DISCLOSURE

The inventors have found that apparatuses and/or systems including: (a) a facility information and data communication assembly/subsystem; (b) a virtual actor blockchain assembly/subsystem; and (c) interfaces and methods implementing the apparatuses and/or systems may be constructed. These apparatuses/systems are designed to provide the oil and gas community optimal solutions that embrace proven traditional platforms as well as the integration of state-of-the-art digital technologies for the readiness of autonomous operations. These apparatuses/systems are also designed to provide: (1) multi-functional technical expertise for offshore and onshore major capital projects and optimization of production operations; (2) valuable experience and expertise for the design and development of digital twin systems, virtual sensor networks, robotic application potentials, green house emission control network, and online real-time, near real-time, and/or periodic performance solutions for digital led virtual asset platform; and (3) a forward-looking plan and new thinking for future data-driven autonomous operations based on an integrated operation window and virtual facility platform that includes an integrated data center. It should be recognized that the oil/gas facility and/or facility component simulation software is run within the virtual actor blockchain assembly/subsystem and the AI and ML routines are used within the virtual actor blockchain assembly/subsystem to store the information and data and utilize the information and data to improve oil/gas facility and/or facility component simulations better over time and to adjust features of the simulation software and AI and ML routines.

Industry Challenges

Operators are working with tighter operating budgets, while facing increased pressure from investors to generate more return on capital employed (ROCE). Operators are also increasing investments in remote operations to improve health & safety, reduce costs, increase operational efficiencies, and decrease their carbon footprint. Offshore operators are constrained by operational and information technology (IT) silos and poor internet connectivity in remote areas which impacts their ability to accelerate automation, real-time, near real-time, and/or periodic monitoring, predictive maintenance, and intelligent worker safety solutions. Massive amounts of data increasing at rapid scale and the proliferation of sensor technology continues to challenge operators with how they can extract actionable business insights from online and offline system silos that can enable their operations to run more efficiently.

Introduction of Concepts

These apparatuses/systems are configured to address: (1) digital twinning application challenges; (2) network architecture requirements; (3) digital transformation backbone network configurations for industrial processes; (4) improving workflow innovation to meet industrial requirements; (5) digital transformations using latest technologies to facilitate digital twinning and process modeling within digital twinned environments; (6) implementing these features within a virtual actor model blockchain environment; and (7) integrating these features with oil and gas rigorous models.

Digital Twin Application Current Practice and Challenges

Facilities designed without digital twining consideration and brown field IIoT represent inadequate environments for efficient utilization of historical data and real-time, near real-time, and/or periodic generated facility data, where in the traditional environments are based on PCN infrastructure as primary objectives. Most digital transformation improvements were concentrated on the existing PCN Client/Server and Plant Business Network to to enhance PCN capability concerning missed or missing data. These features resulted in high cost and difficulties in integrating solutions to achieve digital twinned environments and IIoT goals. These environments provide unclear interactive relationships among functional data silos, which can be analyzed through the multiphasic solutions that improve reliability, integrity, and other cross functional areas. These environments generally utilize OPC interfaces, which are not reliable for large data transformations, are more costly to maintain, and are impede a transition to more robust digital twinned environments. Thus, there is a need to implement digital twinned environments utilizing newer technologies such as DL/ML/AI technologies to asset in plant operations, upgrades, and monitoring.

OBJECTIVES OF THIS DISCLOSURE

Embodiments of this application are directed to understanding and demonstrating next generation digital twin using a virtual actor blockchain data fabric platform such as the Xenese™ Blockchain Data Fabric Platform in existing and new oil/gas process workflows. The Xenese™ blockchain platform is available from First Genesis, Inc. of Houston, Texas. Xenese™ is a trademark of First Genesis, Inc. of Houston, Texas.

The embodiments are designed to:

(1) utilize data from oil and/or gas upstream and downstream oil and gas production, refining, and storage to create or generate digital twin (DT) environments within a virtual actor model based blockchain platform such as the Xenese™ blockchain platform running on or in either an edge environment or a cloud environment. This provides a real-time, near real-time, or periodic digital representations of physical systems, associated processes, and/or process workflow. The digital twinning is then combined with machine learning (ML) and artificial intelligence (AI) capabilities to enable predictive analytics and prescriptive insights into improving and modeling downstream and upstream oil and gas processes, facilities, and/or installations.

(2) allow predicting automation control behaviors, early warnings of potential problems, and creating notifications for critical aspects of operations, such as upcoming maintenance deadlines or fluctuations in oil and gas operations.

(3) use legacy digital twin solutions within a virtual actor blockchain platform such as the Xenese™ blockchain platform to model most production and process operations, such as offshore assets, FPSOs, FLNGs, onshore facilities, LNG facilities, gas plant facilities, pipeline networks, and drilling operations. Digital twinning can be used to simulate and/or optimize operations through a highly integrated digital backbone. Using virtual sensor data based on physical sensor data alongside direct physical sensor data, the embodiments of this disclosure build an exact or near exact digital representation of the facility objectives and simulating facility behavior accurately for predicting future behavior.

(4) combine oil/gas modeling technologies, actor model advantages, and blockchain distributed data management, enabling digital twins to have a rigorous digital representation for a very large facility, including a lot of detailed edge systems on a real-time, near real-time, or periodic basis, without losing any rigorous behavioral information.

Development Philosophy

Embodiments of this application are designed to capitalize on newer procedures in oil and gas facility design, operation, and maintenance using prioritized data modernization initiatives to unlock greater value via real time, near-real time, or periodic end-to-end visibility, trusted connectivity to eliminate data silos, automation, and self-service capabilities, all while enhancing security, access, and governance as data scale continues to rapidly surge.

These embodiments of this application will include system engineering from boundary to boundary and/or cross-functional systems, engineering cybernetics to achieve several solutions that ultimately lead a principal global desired result, and information management system to deliver the final values.

Implementations of the Apparatuses and Systems of this Disclosure

The facility information and data communication assembly/subsystem is configured to: (a) provide all information concerning each facility including, without limitation, overall facility design, component configuration, facility components, and facility operational information and data via unidirectional or bidirectional communication pathways; and (b) provide information and data from all facility data output devices including, without limitation, sensors, databases, analytic routines, protocols, configurations, and any other information and/or data generating devices that produces acquirable and/or available information and data from the facility concerning facility operations and/or management.

The virtual actor blockchain assembly/subsystem includes: (a) a plurality of facility virtual actors associated with each facility; (b) a plurality of facility component virtual actors associated with one or more facility components; (c) a plurality of facility data virtual actors associated with one or more devices or elements within the facility that generate acquirable and/or available data; and (d) a plurality of user virtual actors associated with authorized users of the apparatuses, systems, interfaces, and/or methods.

The virtual actor blockchain assembly/subsystem also includes: (a) a facility and facility component information and data acquisition assembly/subsystem; (b) a facility and facility component information and data storage, archival, and retrieval assembly/subsystem; (c) a virtual or computer generated facility and facility component assembly/subsystem; (d) a facility and facility component modeling or simulation assembly/subsystem; and (e) a modeling or simulation storage, archival, and retrieval assembly/subsystem.

The facility and facility component information and data acquisition assembly/subsystem is configured to: (a) receive facility and facility component information and data via the facility data communication assembly/subsystem; (b) receive data from all facility data output devices via the facility data communication assembly/subsystem; (c) assign each facility to a facility virtual actor; (d) assign one or more facility components to a facility component virtual actor; and (e) assign data from one or more facility data output devices to a facility data virtual actor.

The facility and facility component information and data storage, archival, and retrieval assembly/subsystem is configured to: (a) store facility information and data in one or more blocks of a facility blockchain, (b) store facility component information and data in one or more blocks of a facility component blockchain; (c) store data from all facility data output devices in one or more blocks of the facility data blockchain; (d) update block data of a block in one of the blockchains after consensus polling; (e) archive one or more blocks from one or more of the blockchains after consensus polling; and (f) retrieval archived blocks and restore them to their appropriate blockchain after consensus polling.

The virtual or computer generated (CG) facility and facility component assembly/subsystem is configured to: (a) generate a virtual facility; (b) generate virtual facility components, one for each facility component; and (c) generate virtual devices, one for each facility device that collects data concerning the operations of the facility and/or facility components.

The facility and facility component modeling or simulation assembly/subsystem is configured to: (a) model or simulate operations of the entire facility or one or more facility components based on data acquired via the facility and facility component information and data acquisition assembly/subsystem; or (b) model or simulate operations of the entire facility or one or more facility components using the virtual facility, virtual facility components, and virtual devices based on data acquired via the facility and facility component information and data acquisition assembly/subsystem, stored facility data, or retrieved archival facility data; and (c) send the modeling or simulation results to the user who requested the model or simulation and to other authorized modeling/simulation users.

The modeling or simulation storage, archival, and retrieval assembly/subsystem is configured to: (a) store current modeling or simulation results for access by authorized modeling/simulation users; (b) archive modeling or simulation results for historical analysis; and (c) retrieve archived modeling or simulation results based on authorized modeling/simulation user requests.

The virtual actor blockchain assembly/subsystem also includes a user request acquisition and processing assembly/subsystem configured to: (a) receive requests from authorized user virtual actors; (b) schedule the requests based on a set of priority rules; (c) perform each of the requests based of the priority rules; (d) send the results of each of the requests to the requestor and to one or more authorized users; (e) store each request in a block of a user request blockchain; (f) modify a request after consensus polling; (g) archive one or more request blocks after consensus polling; and (g) retrieve one or more archived blocks after consensus polling, wherein the order is not events is not critical.

Each of the facility data virtual actors may be assigned to a given facility data output pathway, a specific group of facility data output pathways, data pathways associated with specific facility components, data pathways associated with a specific facility sub-component, data pathways associated with a specific facility process, and/or data pathways associated with a specific facility sub-process.

The virtual facility modeling subsystem may be used to predict future facility behavior, to optimize facility performance, to identify facility problems before they occur, to minimize facility downtime, and/or to improve facility operation and management.

The virtual actor blockchain assembly/subsystem also includes a virtual actor network comprising supervisor computers and/or servers, manager computers and/or servers, facility personnel computers and/or servers, data analysis personnel computers and/or servers, data modeling personnel computers and/or servers, and/or other personnel needing access to the virtual actor network computers and/or servers. The personnel virtual actors will have different access and/or different ability to invoke processes using the virtual component modeling subsystem and/or the virtual facility modeling subsystem. The inventors have also found that interfaces and methods may be configured to implement the apparatuses and/or systems of this disclosure.

Embodiments of this disclosure relate broadly to apparatuses and/or system including a facility data communication assembly/subsystem and a virtual actor blockchain assembly/subsystem. The facility data communication assembly/subsystem includes communication pathways from all data output devices within the facility including sensors, databases, analytics, protocols, configurations, and other information generated and acquired for facility management. The virtual actor blockchain assembly/subsystem includes data acquisition software for receiving the data from the facility, assignment of facility data to virtual actors based on the type of data received from the facility, wherein the virtual actors are assigned for each facility data output pathways and for specific facility components, sub-components, processes, and/or sub-processes. The virtual actor blockchain assembly/subsystem also includes computer models for each facility sensor, each facility component, each facility sub-component, each facility process, and each facility sub-process associated with one, some, or all virtual facility data actors to produce a virtual facility for modeling facility operation and management. The virtual facility modeling may be used to predict future facility behavior, to optimized facility performance, to identify facility problems before they occur, to minimize facility downtime, and/or to improve facility operation and management. The virtual actor blockchain assembly/subsystem also includes virtual actor network comprising supervisor, manager, facility personnel, data analysis personnel, data modeling personnel, and/or other personnel needing access to the virtual actor network computers and/or servers. The personnel virtual actors will have different access and/or different ability to invoke processes with the virtual modeling facility.

In certain embodiments, the apparatuses and systems are designed for real-time, near real-time, and/or periodic facility data acquisition, data analysis, and modeling or simulation based on the acquired real time or near real time data or modeling or simulation based on the acquired real-time, near real-time, and/or periodic data as input to a virtual facility or facility components, where the data acquisition is stored in blocks of one or more blockchains of the virtual actor blockchain assembly or subsystem and to interfaces and methods implementing same.

Facility Data Acquisition Assembly/Subsystem

Embodiments of the unique digital twin data fabric platform equips oil and gas operators with intelligent data management architecture to effectively and efficiently plan and operationally execute production using big data blockchain. The blockchain platform such as Xenese™ cohesively brings the various onshore and offshore time-scale applications together. The digital twin data fabric platform also provides: (a) annual data cycles, e.g., data such as reservoir information can be modeled within the twin fabric for yearly insights; (b) daily/monthly data cycles, e.g., non-real time data such as petroleum engineering information and monthly well planning data can be modeled within the blockchain platform such as Xenese™ digital twin fabric for deeper non-real time insights; and (c) real-time data cycles, near real-time data cycles, and/or periodic data cycles to support real-time, near real-time, and/or periodic data collections for oil/gas facility, flow line, wellhead monitoring and analytics. The blockchain platform oil and gas applications such as Xenese™ oil and gas applications include (a) engineering design; (b) deepwater & onshore production; (c) asset integrity management; (d) modeling and simulation; (e) performance monitoring, and (f) big data and analytics.

The virtual actor blockchain assembly/subsystem includes a facility data acquisition assembly/subsystem configured to receive data from the facility data output source pathways and to assign one or more facility data virtual actors to the facility data output sources based on the type of facility data source. The one or more facility data virtual actors assigned to the facility data output sources receive data from the pathways on time frames depending on the type of facility data source.

For facility data sources that generate data on a continuous basis, the data acquisition assembly/subsystem is configured to receive that data on a time frame based on the type of continuous data being output. For example, if the continuous data is produced on a microsecond basis and critical for real time or near real time facility operations, then the data acquisition assembly/subsystem is configured to receive the continuous data in data packets on a microsecond time frame, to convert the data in the data packets into a standardized data format, and to store the data in each of the data packets in a block of one or more blockchains. If the continuous data is not critical for real time or near real time facility operations, then the data acquisition assembly/subsystem is configured to receive the continuous data in data packets on a time frame suitable for the type of continuation data, to convert the data in the data packets into a standardized data format, and to store the data in each of the data packets in a block of one or more blockchains.

For facility data sources that generate data on a periodic or semi-periodic basis, the data acquisition assembly/subsystem is configured to receive that data on a periodic or semi-periodic time frame. For example, if the periodic or semi-periodic data is produced on a daily, then the data acquisition assembly/subsystem is configured to receive the periodic or semi-periodic data in daily data packets, to convert the data in the daily data packets into a standardized data format, and to store the data in each of the daily data packets in a block of one or more blockchains. If the periodic or semi-periodic data is produced on any other time frame, such as hourly, weekly, biweekly, monthly, etc., then the data acquisition assembly/subsystem is configured to receive the periodic or semi-periodic data in such data packets, to convert the data in such data packets into a standardized data format, and to store the data in each of such data packets in a block of one or more blockchains.

For facility data sources that generate data on a sporadic basis, the data acquisition assembly/subsystem is configured to receive the sporadic data upon production, to convert the data into a standardized data format, and to store the data in a block of one or more blockchains.

For facility data sources that generate data on an emergency basis, the data acquisition assembly/subsystem is configured to receive the emergency data upon production, to convert the data into a standardized data format, and to store the data in a block of one or more blockchains.

The virtual actor blockchain assembly/subsystem may utilize any application that receives data and converts the data into a standardized data format such as Airbyte® software softwar, a registered trademark of Daxtarity Inc., JSON (JavaScript Object Notation) software, or any other data standardization software.

Facility Configuration, Operation, and Management Information and Data Acquisition Assembly/Subsystem The virtual actor blockchain assembly/subsystem also includes a facility configuration, operation, and management information and data acquisition assembly/subsystem configured to acquire and receive information and data concerning overall facility configuration, facility components, facility processes, facility routine and emergency operation procedures and protocols, facility routine and emergency management procedures and protocols, facility routine and emergency analytic procedures and protocols, facility routine and emergency monitoring procedures and protocols, facility routine and emergency maintenance procedures and protocols, facility routine and emergency shutdown and restart procedures and protocols, facility routine and emergency component shutdown and restart procedures and protocols, facility routine and emergency modeling procedures and protocols, and any other facility configuration, operation, and management information and data need for facility operation and management.

Facility Modeling and Simulation Assembly/Subsystem

The virtual actor blockchain assembly/subsystem also includes a facility modeling and simulation assembly/subsystem including software for modeling facility operations, facility component operations, facility modifications, facility component modifications, and/or facility component additions or deletions. The modeling and simulation assembly/subsystem is configured to dissect each facility component into modeling units, which are run in parallel until the results of the modeling units become internally self-consistent to reduce computer resource demands. Of course, as computer technology advances, the degree of dissection may be reduced or increased to optimize modeling and simulation run times. The modeling and simulation assembly/subsystem is configured to pull all necessary data from the blocks of the one or more blockchains into which the necessary data has been stored and to write or output the results in a standardized data format to one or more blocks of the one or more blockchains of the virtual actor blockchain assembly/subsystem.

Facility and/or Facility Component Virtual Twinning Assembly/Subsystem

The virtual actor blockchain assembly/subsystem also includes a facility and/or facility component virtual twinning assembly/subsystem configured to generate a virtual facility and/or virtual facility components based on the facility configuration, operation, and management information and data and the facility output source data. The virtual facility is designed to reproduce the overall facility in a computer generated (CG) twin so that modeling and simulations may be performed on the virtual facility without affecting actual facility operations and the results made available to authorized user virtual actors. The virtual facility components are designed to reproduce each facility component in a CG twin so that modeling and simulations may be performed on the virtual facility component without affecting actual facility operations and the results made available to authorized user virtual actors. The facility CG twin will include virtual or CG analogs of each sensor, device, component, or the like associated with the overall facility. The facility component CG twin will include virtual or CG analogs of each sensor, device, or the like associated with the facility component. The facility and/or facility component virtual twinning assembly/subsystem is configured to pull all necessary data from the blocks of the one or more blockchains into which the necessary data has been stored for each virtual modeling or simulation and to write or output the results in a standardized data format to one or more blocks of the one or more blockchains of the virtual actor blockchain assembly/subsystem. The facility and/or facility component virtual twinning assembly/subsystem may be used to predict future facility behavior, to optimized facility performance, to identify facility problems before they occur, to minimize facility downtime, and/or to improve facility operation and management.

The following table lists the capabilities of existing digital twinning platforms compared to blockchain digital twinning platforms such as Xenese™. Existing Digital Twin Platforms have the following capabilities: limited security or no, no interoperability; no consensus; no rapid on-demand scalability; no abstraction layer to make non-configurable app changes, no remote failure detection & self-healing; no flexibility, limited integration, user interfaces and visualization tools, and modeling and simulation capabilities. Virtrual Virtual Actor Blockchain Platforms such as Xenese™ Digital Twin Platform have the following capabilities: full security, interoperability, consensus, rapid on-demand scalability, abstraction layer to make non-configurable app changes, remote failure detection & self-healing, flexibility, integration, user interfaces and visualization tools integrated into multiple visualization tools & interfaces, and modeling and simulation capabilities integrated into multiple simulation tools such as SimTech.

User Virtual Actor Network

The virtual actor blockchain assembly/subsystem also includes a user virtual actor network comprising supervisors, managers, facility personnel, data analysis personnel, data modeling personnel, and/or other facility personnel authorized to access the virtual actor network. The user virtual actor network may be configured to classify the user virtual actors into categories based on user access, user message request authorization, user result viewing authorization, user modeling and simulation message request authorization, user modeling and simulation result viewing authorization, and/or any other classification criterion.

Facility Data Actor Virtual Actor Network

The virtual actor blockchain assembly/subsystem also includes a facility data virtual actor network comprising one or more virtual actors for each facility data output source. The data facility virtual actor network may be configured to classify the facility data virtual actors into categories based on data type, data generation frequency, data collection frequency, data criticality, data sensitivity, data reliability, and/or any other classification criterion.

In certain embodiments, apparatuses or systems are configured to be associated with facilities associated with the oil and gas industry including oil/gas field collection and production facilities or systems (land based, sea based, and/or subsea based), oil/gas field distribution facilities or systems (land based, sea based, and/or subsea based), oil/gas refining facilities or systems, oil/gas refining distribution facilities or systems, petrochemical facilities or systems, petrochemical distribution facilities or systems, or any other facility or system involved in the oil/gas industry.

The virtual actor blockchain assembly/subsystem is based on a virtual actor architecture in including a messaging and query processing subsystem, a consensus management subsystem, one or more blockchains, one or more created and stored queryable blockchain cryptographic ledger subsystem, and/or a block read/write/add/proof/mine/modify/update subsystem, and interfaces and/or methods for implementing them, wherein the apparatuses, or systems are configured to scale when processing multiple requests to overcome repetitive and intensive processing in reading, writing, adding, proofing, mining, and broadcasting blocks and/or block transactions and/or processing consensus polling for adding, writing, mining, and/or proofing blocks and/or block transactions, and interfaces and methods for implementing them.

The inventors have found that apparatuses and systems may be implemented to provide the oil and gas community with optimal solutions that embrace proven traditional platforms as well as the integration of state-of-the-art digital technologies for the readiness of autonomous operations. The apparatuses and systems of this disclosure are designed to provide a multi-functional technical protocol for offshore and onshore major capital projects and optimization of production operations. The apparatuses and systems of this disclosure are also designed to provide valuable experience and expertise for the design and development of digital twinned systems, virtual sensor networks, robotic application potentials, green house emission control network, and online real-time, near real-time, and/or periodic performance solutions for a digital led virtual asset platform. The apparatuses and systems of this disclosure are also designed to provide a forward-looking plan and new thinking for future data-driven autonomous operations based on an integrated operation window and virtual facility platform that includes an integrated data center.

The apparatuses and systems of this disclosure are broadly configured to implement digital twinning applications, to implement a network architecture to support digital twinning applications, to implement a digital transformation backbone network for process industry modeling and virtual process twinning, and to implement workflow innovation and goals using a blockchain virtual actor architecture and data processing, modeling, and virtual process platform, wherein the industry may be any industry processing especially for the oil and gas industry. The virtual processes are designed to provide a platform for manipulating and testing oil and gas rigorous models without adversely affection actual facility operations.

Current practice used in digital twinning applications using brown field industrial internet of things (IIoT) built on a process control network (PCN) infrastructure as primary objective have proven inadequate for modeling and virtual facility twinning. Most current improvements involve digital transformations concentrated on the existing PCN client/server and facility business network directed at enhancing PCN capability for handling missing data. These current applications have high costs and are difficult to integrate as a solution to achieve digital twinning and IIoT goals. These current applications lack clarity in determining interactive relationships among functional silos, which may be analyzed through multiphasic solutions, including reliability, integrity, and other cross functional area and generally use an open platform communication (OPC) interface, which are not reliable for large amount data transformations, and have high cost for maintenance without providing a adequate incentive to implement digital twinning applications.

Moreover, these industries are slow to efficiently and effectively adopt and implement (1) modern digital twinning technology, (2) robotics based on the use of digital twinning to test the introduction of robotic units and/or robotic controllers in different areas of the facility, and (3) deep learning/machine learning/artificial intelligence (DL/MVL/AI) technologies in different areas of the facility to improve facility operations and management.

Embodiments of the apparatuses and systems of this disclosure are implemented to: (1) include system engineering for boundary to boundary system modeling and digital twinning, and cross-functional system modeling and digital twinning, (2) engineering cybernetics to achieve several solutions that may ultimately lead a principled global desired result, and (3) an information management system adapted to deliver the final process and/or sub-process values.

Embodiments of the apparatuses and systems of this disclosure are implemented to: (1) utilize Software-As-A-Service (SaaS) as an end-to-end solution to break functional silos and to mimic or simulate operation workflow in the real-world in a generated virtual environment; (2) allow operators to use leading-edge digital twinning technology of this disclosure for high quality production governance of facility operations, processes, and/or sub-processes producing easy to maintain quick deliverables in real time or near real time or within a relative short development time, wherein a relatively short development time means a time short enough to improve facility operations and/or management, especially in emergency situations; (3) utilize integrated solutions to analysis and identify hidden values and/or variables improving production, operation and/or management condition reliability, and data consolidated and usage; (4) utilize improved data acquisition/collection for generating and/or creating more effective and efficient DL/ML/AI applications, wherein the improved data acquisition/collection provides additional data and data reliability to enhance component and process DL/ML/AI modeling, component and process simulations, and virtual twinned component and process environments; (5) tie-in robotics and robotic units to reach PCN lower levels or supplement layers, without adversely affecting autonomous operation;

and (6) improve engineering design and operation maximizing profit and safety margins and minimizing project, component, and/or process costs.

Embodiments of the apparatuses and systems of this disclosure include a data simulation integrated online digital twinning (DSIODT) subsystem. The DSIODT subsystem includes: (1) simulation model based control analysis subsystem; (2) a virtual sensors and network subsystem; (3) a smart device modular application subsystem; (4) an online real-time, near real-time, and/or periodic integrated solution subsystem; (5) an online procedure automation optimization subsystem; (6) a "big data" application and analytic subsystem; (7) a robotics and interface connectivity subsystem; (8) an improved user interface subsystem; (9) an advanced enterprise cross functional application subsystem; (10) a DL/ML/AI application subsystem; (11) an IIoT and/or digital twin network design and development subsystem; and (12) an autonomous operation subsystem. DSIODT represents an architecture of an asset virtual digital twin as the backbone of the IoT of this disclosure.

Embodiments of the apparatuses and systems of this disclosure includes a blockchain data flow (BcDF) subsystem including: (1) a data flow scheme subsystem; (2) a virtual actor subsystem; and (3) virtual digital twinning subsystem.

A blockchain is a decentralized, distributed ledger that is used to record transactions across many computers so that the record cannot be altered retroactively without the alteration of all subsequent blocks and the consensus of the network majority or super-majority depending on the nature of the data being altered. Additionally, each block contains a cryptographic hash pointing to the previous block, a timestamp, and transaction data. By design, a blockchain is resistant to data modification.

A virtual actor model is a computational model for concurrent computation that treats "actors" as the universal primitives of concurrent computation. In the actor model, an actor is an autonomous entity that can send and receive messages and has a mailbox to which messages can be sent. An actor can create new actors, send messages to other actors, and determine how to respond to messages that it receives. The actor model provides a higher-level abstraction for concurrent computation, allowing developers to write concurrent programs without having to worry about the low-level details of thread management and synchronization. This makes it easier to write correct, concurrent code, and can also make it easier to write code that is performant and scalable.

Embodiments of the apparatuses and systems of this disclosure utilize proto.actor available form from Asynkron AB. Proto.actor is a distributed virtual actor framework that is designed (1) to be fast, (2) to have a lightweight runtime and low memory overhead, which makes it suitable for running on resource-constrained devices such as IoT devices, and (3) to be scalable. Proto.actor is inspired by the virtual actor model, which is an approach to concurrency and parallelism that is based on the idea of actors as independent, autonomous entities that communicate with each other through message passing. One of the key features of proto.actor is that it supports high-performance, low-latency communications between actors, which makes it well-suited for building distributed systems. In comparison with other actor frameworks, proto.actor emphasizes simplicity, performance, and flexibility. Proto.actor provides a simple, intuitive API for developing distributed systems, and it allows developers to choose the programming language and transport layer(s) that best fit their needs. For the above reasons, proto.actor is a superior virtual actor model than other virtual actor models including Akka available from Lightbend, Inc. and Orleans available from Microsoft are virtual actor frameworks that are like proto.actor in that they are based on the virtual actor model and are designed to support the development of distributed systems. However, there are some differences between the three frameworks including: (1) supported programming languages, e.g., proto.actor supports multiple programming languages, including C#, Go, Java, Python, and more; Akka supports several languages as well, including Scala, Java, and Python, but it is primarily developed in and for the Scala language; and Orleans is a Microsoft-developed framework that is primarily used with the .NET ecosystem, including languages such as C#, F #, and VB.NET; (2) performance, e.g., proto.actor is designed to be fast and scalable, with a focus on low-latency communication between actors; Akka and Orleans also place an emphasis on performance, but proto.actor has the advantage in this regard due to its simpler architecture and more lightweight runtime; (3) API and programming model, e.g., Proto.Actor has a simple, intuitive API that is easy for developers to use; Akka and Orleans have more comprehensive APIs that may be more powerful, but also more complex. The programming model for proto.actor is also relatively straightforward, with a focus on message-passing between actors, while Akka and Orleans have more sophisticated programming models that are more suited to certain types of applications.

In certain embodiments, the virtual actor blockchain architecture, environment, or platform may be the Xenese™ virtual actor blockchain platform and any other virtual actor blockchain distributed platforms. The Xenese™ platform is distributed smart data fabric provides innovative data management capabilities that accelerates modernization efforts across global enterprises. Through a trusted tamper-proof abstraction layer of underlying data architecture and data services, the Xenese™ platform speeds the development of data ecosystem projects and reduces total cost of ownership by delivering a unified, interoperable data fabric that delivers connected data and insights across the entire organization.

The virtual actor assembly/subsystem are configured to support all aspects of hydrocarbon processing operations including: (a) oil and gas upstream production, oil and gas pipeline distribution, oil and gas refining, and petrochemical production; (b) process engineering, design, control, maintenance, and management; (c) IIoT integration, (d) online solutions, and (e) virtual twinning of oil and gas upstream production, oil and gas pipeline distribution, oil and gas refining, and petrochemical production.

The virtual actor assembly/subsystem are configured to support (a) modeling and simulations to reduce or eliminate difficult recycles, (b) digital transformations lower level information to organize knowledge, practice, workflow, and others, and improve modeling and simulation reliability and integrity; and (c) big data management.

Big Data Handling

The virtual actor assembly/subsystem including a virtual actor model distributed ledger design for big data allow the design of distributed actor systems have numerous advantages: (a) scaling out—virtual actor models allow for adding and removing nodes from a cluster on demand, which makes it easier to scale a big data system horizontally as the amount of data increases helping to ensure that the system is capable of handling large volumes of data without becoming a bottleneck; (b) data processing—virtual actor models are capable of processing and analyzing data in parallel, which improves overall performance and efficiency of a big data system; (c) fault tolerance—by distributing virtual actors across different nodes in a cluster, virtual actor models are capable of helping to ensure that the system remains available even in the event of a node failure, helping to prevent data loss and ensure that the system continues to process data even in the presence of hardware or software failures; (d) decoupling data flows—virtual actors work independently and in isolation which allows for more flexibility and decoupling of data flows allowing easier integration and extension of new data processing functionality; (e) handling many concurrent tasks—virtual actors are capable of handling many concurrent tasks, which makes it well-suited for big data systems that need to process many requests or data streams simultaneously; (f) easy to reason—virtual actors, by design, are lightweight, independent, and isolated which makes it easier to reason about the system helping debugging, monitoring, and maintaining operations of a big data system.

Horizontal Pod Autoscaling (HPA)

The virtual actor assembly/subsystem are also configured to support horizontal pod autoscaling (HPA). HPA allows for automatically scaling a number of pods in a Kubernetes deployment based on observed CPU usage or custom metrics such as memory utilization. Some benefits of using HPA include: (a) automatically scaling the number of pods based on load ensuring that the virtual actor blockchain plaftorm have platform has sufficient resources to handle incoming data and messaging traffic, while also avoiding over-provisioning and wasting resources; (b) reducing the need for manual scaling allowing automated scaling processes, which are capable of saving time and reducing a potential for human error; (c) enabling better resource utilization by automatically scaling pods based on actual usage ensuring that resources are used more efficiently; (d) improved fault tolerance by automatically scaling pods in response to changes in load ensuring that the virtual actor distributed platforms remain available even in the event of a spike in traffic or other unexpected error event; and (e) customizable using metrics to scale based on the specific needs of the virtual actor blockchain platform or other virtual actor distributed platforms, wherein the metrics include metrics relevant to the task at hand.

Data Flow Schema on Blockchain Virtual Actor Platform

Embodiments of the apparatuses/systems include data flow schema used in virtual actor blockchain architecture, environment, or platform such as the Xenese™ virtual actor blockchain platform and any other virtual actor blockchain distributed platforms for digital twinning and for the generation of virtual facilities, virtual facility components, virtual facility processes, and/or virtual facility sub-processes. A simple data flow schema may be implemented using JSON data or other similar data from an IoT device sent to a gRPC API or other API written to the virtual actor blockchain platform or other virtual actor distributed platform distributed ledger data fabric, and then used by a simulation tool to run models. This schema shows that the IoT device generates JSON data or other similar data, which is sent to the gRPC API or other API. The gRPC API or other API writes this data to the virtual actor blockchain platform or other virtual actor distributed platform distributed ledger data fabric. The simulation tool reads the data from the virtual actor blockchain platform or other virtual actor distributed platform distributed ledger data fabric and uses it to run models, producing results which may then be stored back on the ledger data fabric for downstream processing and visualization.

Embodiments of the apparatuses/systems include a digital transformation architecture layout included in the virtual actor blockchain platform or other virtual actor distributed platforms. In this architecture, the IoT devices generate data on real-time, near real-time, and/or periodic basis and sends it to the gRPC API or other API, which writes it to a Merkle tree of a distributed ledger data fabric. The Merkle tree uses Proto.Actor or other similar virtual actor subsystems to compute hashes for blocks and organize them into a tree structure to produce a digital twin. The blocks in the tree are linked together using a cryptographic hash function (such as SHA-256) to create a blockchain.

Embodiments of the apparatuses/systems include simulation tool uses JMESPath or other similar subsystems to query the JSON data or other data in the distributed ledger data fabric and off-chain storage system. The results of a JMESPath or other similar subsystem query are then passed to the simulation tool, which uses the data to run models and produce results. This approach allows us to use JMESPath or other similar subsystem to extract and process specific data from the distributed ledger fabric and off-chain storage, making it easier to work with big data. Consensus algorithms used in this architecture comprises Proof of Sequence, which determines the order in which transactions are added to the blockchain. The apparatuses/systems also utilize PostgreSQL mailbox or other mailbox routines to manage message processing of data within the apparatuses/systems including assemblies/subsystems.

Embodiments of the virtual actor assembly/subsystem may be used in the oil and gas industry to create a blockchain-based digital twinning platform used to create a digital replica of an oil or gas production facility and track changes to in the facility over time. The blockchain-based digital twinning platform may use smart contracts (business rules and logics) to automate certain processes and ensure that all parties have a consistent view of the facility's current state. The blockchain-based digital twinning platform of the virtual actor assembly/subsystem is configured to create a digital replica of the facility, facility components, facility processes, or facility sub-processes. The blockchain-based digital twinning platform of the virtual actor assembly/subsystem is configured to collect data from sensors and other facility data output sources and integrating the data into the platform. Once the replica has been created, the blockchain-based digital twinning platform of the virtual actor assembly/subsystem is configured to use the replica you to simulate different scenarios and make predictions about the facility's future performance. The blockchain-based digital twinning platform of the virtual actor assembly/subsystem is configured to use smart contract (business rules and logics) to define the production models on the platform and make sure the replica gets automatically executed. For example, the blockchain-based digital twinning platform of the virtual actor assembly/subsystem may be configured to use a smart contract (business rules and logics) to automatically adjust the flow of oil or gas based on a current market price, or to automatically trigger maintenance procedures when certain conditions are met. Additionally, the blockchain-based digital twinning platform of the virtual actor assembly/subsystem may be configured to use the platform to track and verify compliance with environmental regulations. It is worth noting that the success of such a platform would require collaboration and data sharing among all the parties involved in the operation of the facility, hence the value of using the blockchain-based digital platform.

The blockchain-based digital twinning platform of the virtual actor assembly/subsystem afford a number of advantages or benefits in the oil and gas industry, particularly in the upstream production, pipeline, refinery, and petrochemical sectors including: (a) improved process engineering, design, and control—a digital twinned replica of a production facility or pipeline may be used to simulate and optimize the performance of these assets, helping to improve their efficiency and reduce costs; (b) enhanced maintenance and asset management by continuously monitoring the performance of assets and analyzing data generated by the digital twin, it may be possible to identify potential issues before they arise and take proactive maintenance measures to prevent them; (c) enhanced IIoT integration—a blockchain-based digital twin can facilitate the integration of information technology (IT) and operational technology (OT) systems, improving communication and data exchange across these domains; (d) improved enterprise-wide management by providing a single source of truth for data related to production assets, a digital twin can help to improve decision-making and coordination across different parts of the business; (e) online solutions configured to use of a digital twin replica to enable development of online solutions for various tasks, such as asset design, simulation, and optimization, reducing the need for physical prototypes and site visits; (f) a blockchain digital twinned replica may be used as a backbone for IT-OT integration in the oil and gas industry benefits in several ways; (g) data integrity and security having a main benefit of using a blockchain as a backbone for IT-OT integration that may provide a secure, tamper-proof record of data that is shared between IT and OT systems helping to ensure data integrity and authenticity, as well as provide a clear audit trail for tracking any changes or updates; (h) real-time, near real-time, and/or periodic data or periodic sharing—blockchain technology allows for real-time, near real-time, and/or periodic data sharing between IT and OT systems, which may help improve the efficiency and effectiveness of operations, especially useful in the oil and gas industry, where timely access to data may be critical for decision-making and incident response; (i) improved interoperability—a blockchain-based digital twin platform or replica may help facilitate interoperability between IT and OT systems by providing a common platform for data exchange and collaboration and help to reduce the complexity and cost of integrating different systems and enable more seamless communication and coordination between IT and OT teams; (j) enhanced resilience using a blockchain-based digital twinned platform or replica may help improve the resilience of IT-OT systems in the oil and gas industry by providing redundant copies of data and enabling decentralized decision-making helping to ensure that operations continue even if one or more system errors or failures; and (k) overall, the use of a blockchain digital twinned platform or replica as a backbone for IT-OT integration in the oil and gas industry may help to improve data integrity, security, and interoperability, as well as enhance the resilience of operations.

The blockchain-based digital twinning platform of the virtual actor assembly/subsystem may be configured to benefit big data management in the oil and gas industry including: (a) data integrity—a blockchain to store data is that it is virtually tamper-proof meaning that data stored in a blockchain-based digital twinned platform or replica may be trusted to be accurate and unmodified, making it more reliable for analysis and decision-making; (b) data security—a blockchain-based digital twinned platform or replica enhances data security by making it more difficult for unauthorized individuals to access or modify the data, because the data is decentralized and stored across multiple nodes in the network, rather than in a single, centralized location; (c) data accessibility—a blockchain-based digital twinned platform or replica makes it easier for different parts of a business to access and analyze data related to production assets, improving coordination and decision-making; (d) data analytics—a blockchain-based digital twinned platform or replica may facilitate the collection and analysis of large amounts of data, big data, helping to improve the efficiency and performance of production assets; and (e) data visualization—a blockchain-based digital twinned platform or replica may be used to create visualizations of data, making it easier to understand and communicate the insights and trends that are discovered through data analysis.

The blockchain-based digital twinning platform of the virtual actor assembly/subsystem may be used in well placement and well drilling and to improve: (a) nodal analysis, (b) online well digital monitoring, (c) artificial lift and gas lift optimization, (d) well integration to gathering network, (e) MPD drilling simulation, and (f) training.

The blockchain-based digital twinning platform of the virtual actor assembly/subsystem may be used in production areas to improve (a) facility steady-state and dynamic analysis, (b) both single phase and multiphase transient behavior analysis, (c) online system configuration and troubleshooting, (d) production facility debottleneck, (e) production well, (f) gathering pipeline network and process facilities integration, (g) benchmarking, and (h) training.

The blockchain-based digital twinning platform of the virtual actor assembly/subsystem may be used in pipeline hydraulics to improve (a) design and capacity studies, (b) operational issues: drag reducers, hydrates, corrosion, water hammer, wax, etc., (c) online and digital integration, (d) slugging, erosion, (e) flow induced vibration and leak detection, (f) model performance integration pipeline to process facilities, (g) single phase, multiphase: steady state or transient, and (h) training.

The blockchain-based digital twinning platform of the virtual actor assembly/subsystem may be used in process engineering to improve (a) process modeling: steady state or transient, (b) process optimization, (c) troubleshooting and control analysis, (d) online and digital integration, (e) greenhouse gas emissions, (f) operator training system (OST), and (g) training.

The blockchain-based digital twinning platform of the virtual actor assembly/subsystem include common requirements enforced by regulations including (a) greenhouse emission evaluation of process facilities using simulations to evaluate amount of carbon dioxide, methane, nitrous oxide and fluorinated gases that are released to the environment; (b) real-time, near real-time, and/or periodic gas flaring tracking using the blockchain-based digital twinning platform or replica to evaluate amount of combustible material burned and flared to the atmosphere due to poor operating or bad engineering design; (c) pipeline real-time, near real-time, and/or periodic monitoring and leak detection using the blockchain-based digital twinning platform or replica to detect pipeline leaks and amount of material released as well as tracking pipeline operation in r real-time, near real-time, and/or periodically; (d) pipeline and equipment erosion, corrosion and flow induced vibration (FIV) using the blockchain-based digital twinning platform or replica to monitor erosion, corrosion and FIV that may contribute to a material failure; and (e) catalyst recycling using the blockchain-based digital twinning platform or replica to recycle spent catalyst to reduce hazardous material accumulation and reduce cost of replacing catalyst.

The apparatuses and systems and interfaces and methods implementing them and described herein relate to oil and gas facilities operations and management implemented over a decentralized private communication application via a virtual actor design architecture that takes advantage of message contracts to overcome latency issues associated with typical blockchain activities such as mining and proofing.

In embodiments the apparatuses/systems are configured to process data received from data pathways of the facility data communication assembly/subsystem on a continuous basis or on a timed data packet basis on a decentralized application via a virtual actor design architecture. The received facility data is stored in a data block of a blockchain associated with the facility, wherein the data blocks are associated with a single data pathway or a group of data pathways of the facility data communication assembly/subsystem. Each of the data blocks includes a ledger reading set, a cryptographic signature associated with the data block, and the received data. The facility blockchain also includes transaction block associated with virtual actor requests concerning modeling, data archiving, data analysis, data processing, data mining, data historical processing, any other type of data processing or data modeling, or any combination thereof. The apparatuses/systems also include certain blockchain applications useful for implementing the virtual blockchain architecture. Suitable or useable applications include, without limitation, RestBUS APIs or similar applications; ZeroMQ brokerless message queues or similar applications; Geth platforms configured to port Etherium Framework client and server API from the Go language to C# virtual actorss actors or similar applications; ProtoaActor frameworks or similar applications; RedHat OpenShift platforms or similar applications; Kubemetes Kubernetes container orchestration layers or similar applications; CochroachDB applications or similar applications; and RedHat dedicated platforms or similar applications. The virtual actor design architecture facilitates a scalable echo system of stateful actors that operate as an abstraction to blockchain contracts in order to alleviate blockchain mining latency based on a push versus pull/polling of contract messages through the publisher/subscriber message-based architecture.

In certain embodiments, the apparatuses/systems are configured such that incoming requests activate virtual actor microservicers ported from the Geth Ethenium framework or similar framework, wherein the virtual actor receives event notifications through a ZeroMQ application for similar application over an extension of a RestBUS API or similar application used to alleviate blockchain latency.

In other embodiments, the apparatuses/systems are configured such that NoSQL OLAP persistent storage retains virtual actor state in real-time, near real-time, and/or periodic and maintains the blockchain ledger, wherein horizontal scaling of services is achieved through RedHat operations or other similar operations running inside a AWS EC2 Kunemetes Kubernetes cluster application or similar application that consist of multiple PODS run on virtual machines running containerized application images.

In other embodiments, the architecture is configured in a message design pattern, wherein the message applications include, without limitation, JSON, XML, CSV, JSV, ProtoBufm SOAP, Message Wire, HTML, Text, Byte Array, Stream, any other messaging application, or any combination thereof.

In other embodiments, each hash key and parent Merkle Tree hash key of each of the data blocks or transaction blocks is persisted through the virtual actor, whereby a child virtual actor is linked to its parent Merkle Tree root, whereby as a new transaction is added to an existing Merkle Tree, an event-based messaging occurs between a newly spawned child and its parent Merkle Tree.

In other embodiments, the apparatuses/systems are configured such that when a parent Merkle Tree receives messages of a newly received data or a newly added transactions, the parent Merkle Tree updates its corresponding Merkle Tree root hash key. The updated Merkle Tree root hash key is then broadcast to all other siblings via event-based messaging.

In other embodiments, the apparatuses/systems are configured to restrict the use of consensus algorithms to actor node discoverability based on (a) the existence and location of node actors within its cluster and (b) Raft consensus algorithms not to agree on transactions of transaction from transaction virtual actors.

In other embodiments, the apparatuses/systems are configured to support both a Restful API application and a Server Sent Event (SSE) application, or similar applications.

In other embodiments, the apparatuses/systems are configured support a RESful API application or other similar application, wherein a topology of the architecture is configured to be hosted on the private cloud server assembly incorporating or comprising a series of decentralized servers via load balancers to distribute a REST API application traffic across a cluster of containerized virtual actor node masters. Communication with a specific virtual actor node is achieved via messaging over a series of RESTful WebAPI application connections or other similar application.

In other embodiments, the apparatuses/systems are configured to support a SSE application or a similar application and further comprising a persisted TCP/IP connection application or siilar a similar connection application configured to persist a single bi-directional connection between a client and a virtual node master within a cluster.

In other embodiments, each virtual actor cluster node communicates with each other via messaging over an SSE application persistent connection or similar application connection.

In certain embodiments, a method of processing data and/or transactions for a decentralized application is disclosed, the method being implemented on a computing device including a virtual actor design architecture. The virtual actor architecture is configured to receive data blocks related to data streams or data packets received from each or a specific group of the data communication pathways of the facility data communication assembly/subsystem and to receive transaction blocks related to transactions from virtual transaction actors. Each of the data blocks include a ledger reading set, a cryptographic signature associated with each of the received data streams or packets, and the received data from the data stream or packet. Each of the transaction blocks include a ledger reading set, a cryptographic signature associated with the at least one transaction to be authenticated. Again, the apparatuses/systems also include certain blockchain applications useful for implementing the virtual blockchain architecture. Suitable or useable applications include, without limitation, RestBUS APIs or similar applications; ZeroMQ brokerless message queues or similar applications; Geth platforms configured to port Etherium Framework client and server API from the Go language to C# virtual actorss actors or similar applications; ProtoaActor frameworks or similar applications; RedHat OpenShift platforms or similar applications; Kubemetes Kubernetes container orchestration layers or similar applications; CochroachDB applications or similar applications; and RedHat dedicated platforms or similar applications. The virtual actor design architecture facilitates a scalable echo system of stateful actors that operate as an abstraction to blockchain contracts in order to alleviate blockchain mining latency based on a push versus pull/polling of contract messages through the publisher/subscriber message-based architecture.

In other embodiments, incoming web requests arriving over HTTP protocol activate virtual actor microservicers ported from the Geth Ethenium framework, whereby said virtual actor receives event notifications through ZeroMQ over an extension of the RestBUS API used to alleviate blockchain latency.

In other embodiments, NoSQL OLAP persistent storage or other similar persistent storage retains virtual actor state in real-time, near real-time, and/or periodic and maintains the blockchain ledger providing horizontal scaling of services achieved through RedHat application operation or other similar application operation running inside AWS EC2 Kunernetes Kubernetes clusters or other similar clusters that consist of multiple PODS run on virtual machines running containerized application images.

In other embodiments, again the architecture is configured in a message design pattern, wherein the message applications include, without limitation, JSON, XML, CSV, JSV, ProtoBufm SOAP, Message Wire, HTML, Text, Byte Array, Stream, any other messaging application, or any combination thereof.

In other embodiments, the architecture may further include a plugin module, wherein the module creates a queryable and private permissioned blockchain ledger via an extract, transform, load application e.g., ETL, configured to aggregate data from disperse data sources and convert the aggregated data into a distributed block chain. In a related aspect, the architecture creates a distributed abstraction of each Etherium contract identified by its contract ID or via a similar contract identified by ID.

In other embodiments, the apparatuses/systems may also be configured to process transaction verification operations for a decentralized application via virtual actor design architecture. The apparatuses/systems are configured to receive a transaction block related to at least one transaction, each of the transaction blocks including a ledger reading set, a cryptographic signature associated with the at least one transaction to be authenticated, and the transaction data. In certain embodiments, the apparatuses/systems may also comprise a RestBUS API; a ZeroMQ brokerless message queue; a Geth platform configured to port Etherium Framework client and server API from the Go language to C# virtual actors; a ProtoaActor framework; a RedHat OpenShift platform; Kubemetes Kubernetes container orchestration layer; a CochroachDB; and a RedHat dedicated platform, wherein the system is configured such that incoming web requests arrive over HTTP protocol and activate virtual actor microservicers ported from the Geth Ethenium framework, whereby said virtual actor receives event notifications through ZeroMQ over an extension of the RestBUS API used to alleviate blockchain latency, where the system is configured such that NoSQL OLAP persistent storage retains virtual actor state in real-time, near real-time, and/or periodic and maintains the blockchain ledger, whereby horizontal scaling of services is achieved through RedHat's operation running inside AWS EC2 Kunemetes Kubernetes clusters that consist of multiple PODS run on virtual machines running containerized application images, and where the architecture facilitates a scalable echo system of stateful actors that operate as an abstraction to blockchain contracts in order to alleviate blockchain mining latency based on a push versus pull/polling of contract messages through the publisher/subscriber message-based architecture.

In other embodiments, each hash key and parent Merkle Tree hash key of the block is persisted through the virtual actor, wherein a child virtual actor is linked to its parent Merkle Tree root. As a new transaction is added to an existing Merkle Tree, an event-based messaging occurs between a newly spawned child and its parent Merkle Tree. When a parent Merkle Tree receives messages of the of newly added transactions, the parent Merkle Tree updates its corresponding Merkle Tree root hash key, wherein the updated Merkle Tree root hash key is broadcast to all other siblings via event-based messaging.

The inventors have found that interfaces, apparatuses, or systems and methods for implementing them may be constructed to effectively and efficiently provide scalable routines for reading, writing, adding, proofing, mining, verifying, authenticating, modifying, updating, etc. block and/or block transactions of accessed and pre-processed blockchains. The interfaces, apparatuses, or systems includes a plurality of decentralized servers and one or more computing devices including a plurality of virtual machines, a plurality of virtual actors associated with a virtual actor architecture, a messaging and query processing system, a consensus management system, one or more blockchains, one or more created and stored queryable blockchain cryptographic ledgers, and a block read/write/add/proof/mine/modify/update/verify/authenticate system.

Before the present composition, methods, and methodologies are described, it is to be understood that this invention is not limited to particular compositions, apparatuses, systems, methods, and experimental conditions described, as such compositions, apparatuses, systems, methods, and conditions may vary. It is also to be understood that the terminology used herein is for purposes of describing particular embodiments only, and is not intended to be limiting, since the scope of the present invention will be limited only in the appended claims.

Embodiments of the interfaces, apparatuses, or systems and methods implementing them, as described herein, relate to process transaction verification operations for a decentralized application via a virtual actor design architecture taking advantage of message contracts to overcome latency issues associated with typical blockchain activities such as mining, proofing, and consensus building in accessed and pre-processed blockchains.

In certain embodiments, the interfaces, apparatuses, or systems and methods implementing them are configured to (a) receive a block related to at least one transaction, the block includes a ledger reading set and cryptographic signature associated with the at least one transaction to be authenticated, (b) a high performance messaging library, e.g., RestBUS API; (c) a high-performance asynchronous message queue; (d) a serializing data structure framework, e.g., the Proto.Actor framework or other similar framework; an enterprise Kubernetes platform, e.g., the RedHat OpenShift platform; a Kubernetes container orchestration layer; a cloud-native, distributed SQL database, e.g., CochroachDB; and a dedicated OpenShift 3platform, e.g., RedHat dedicated platform, where the architecture facilitates a scalable eco system of virtual (stateful) actors that operate as an abstraction to blockchain contracts in order to alleviate blockchain mining latency based on a push versus pull/polling of contract messages through the publisher/subscriber message-based architecture.

Consensus System

The consensus systems of this disclosure are configured to generate assign a unique variable length cryptographic or encrypted virtual actor consensus token (VACT) to each virtual actor registered in the apparatus, system, and/or interface, wherein each the VACT includes a unique virtual actor identifier and at least one data field. When a consensus is required for performing any action associated with a blockchain, then the apparatuses, systems, and/or interfaces or methods implementing them broadcasts a consensus notification to all virtual actors via the VACT requesting each virtual actor to review the information contained in the at least one data field. The data fields include cryptographic paths to the block or transaction content within a block stored in the ledger for that specific block or transaction of a currently accessible blockchain. After reviewing, each virtual actor can message back their yes or no vote. In certain embodiments, the consensus may result in an allowed action (allowance) with between 50% plus 1 actor to 100% of all virtual actors (unanimous consent). In other embodiments, the consensus may result in allowance with between 60% and 100% consent. In other embodiments, the consensus may result in allowance with between 70% and 100% consent. In other embodiments, the consensus may result in allowance with between 80% and 100% consent. In other embodiments, the consensus may result in allowance with between 90% and 100% consent. In other embodiments, the consensus may result in allowance with between 95% and 100% consent. In other embodiments, the consensus may result in allowance with 100% consent (unanimous).

DETAILED DESCRIPTION OF THE DRAWINGS OF THE DISCLOSURE

Figure 1:
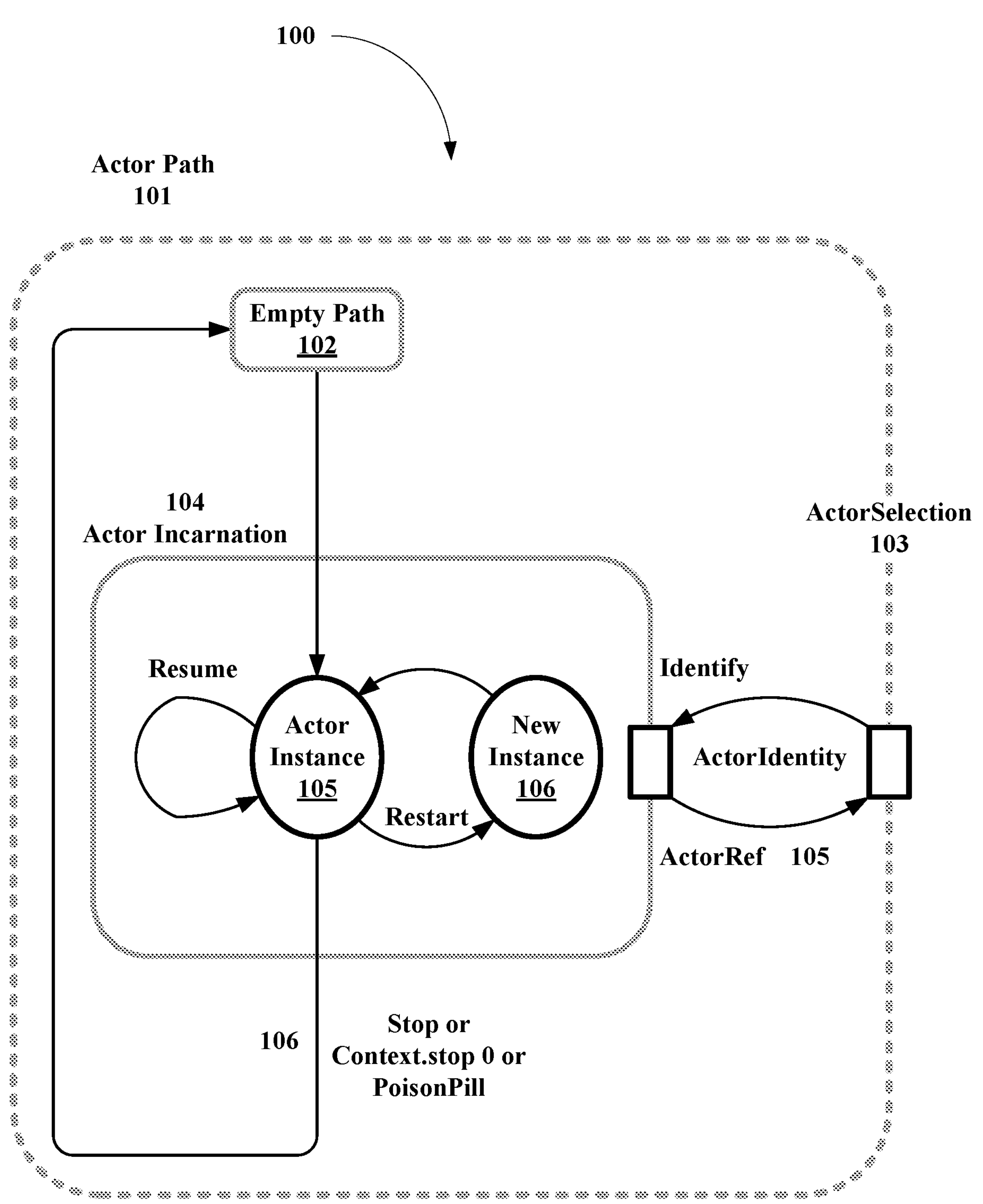
FIG. 1 shows an illustration of a virtual actors actor network and its operation.

Referring now to FIG. 1, actors can communicate with each other and they can create more actors (see, e.g., FIG. 1, 100). As shown in FIG. 1, ActorPath 101 starts with an empty path 102, where the Actor is assigned to a subject, a path is then reserved for that Actor, a random UID (unique identification) is assigned to an incarnation of the Actor, an instance is created and a preStart is called on the instance. Actor Incarnation 104 belongs to a particular path which has a UID and a mailbox, where a new instance replaces an old instance, postRestart is assigned which calls on a new instance. After new instance starts, preRestart is called on the old instance. Once Actor is identified, Actor selection 103 represents a path (or multiple with wildcard), allows for resolution of the underlying Actor Ref 105 by sending an identify message. The Actor Ref 105 represents the incarnation, hides the instance, which ActorRef 105 has a path and UID. Finally, a Stop or context.stop is assigned 106. Alternatively, a PoisonPill is activated, depending on the instructions in the message. PostStop is called on the instance, and a path is allowed to be used again.

The problem behind the inherent scalability barriers to blockchain technology is architecture. More specifically, the root problem is lack of a distributed architecture. The seminal objective of the blockchain technology was secure transactions through the immutability of its distributed ledgers. Scalability was not the primary objective.

Unsuccessful solutions to blockchain scalability have incorporated everything for Graphical Processing Unit (GPU) farms to large clusters of virtual machines (VMs). The architecture, as disclosed herein, uses several design patterns created specifically for distributed computing to solve scalability challenges denotes denoted as Mobius Blockchain Platform as a Service (BcPaaS™). In a related aspect, each design pattern compliments to each other and interoperated seamlessly.

Private or permissioned blockchain networks are far more secure than public blockchain networks. Private blockchain networks require a massive private cloud infrastructure to function at scale. As disclosed herein, the BcPaaS™ architecture coupled with a private cloud blockchain network based on the Pivotal.IO platform provide both a highly secure blockchain network with the performance of a public blockchain network. In embodiments, the BcPaaS™ adopts an event based model to scale. Although BcPaaS™ consumes external requests via standard WebAPI requests, internally, services communicate through event driven architecture at the micro-services level. In a related aspect, this event-driven architecture uses the faster TCP protocol, as opposed to WebAPI traffic over the verbose Http protocol.

Figure 2:
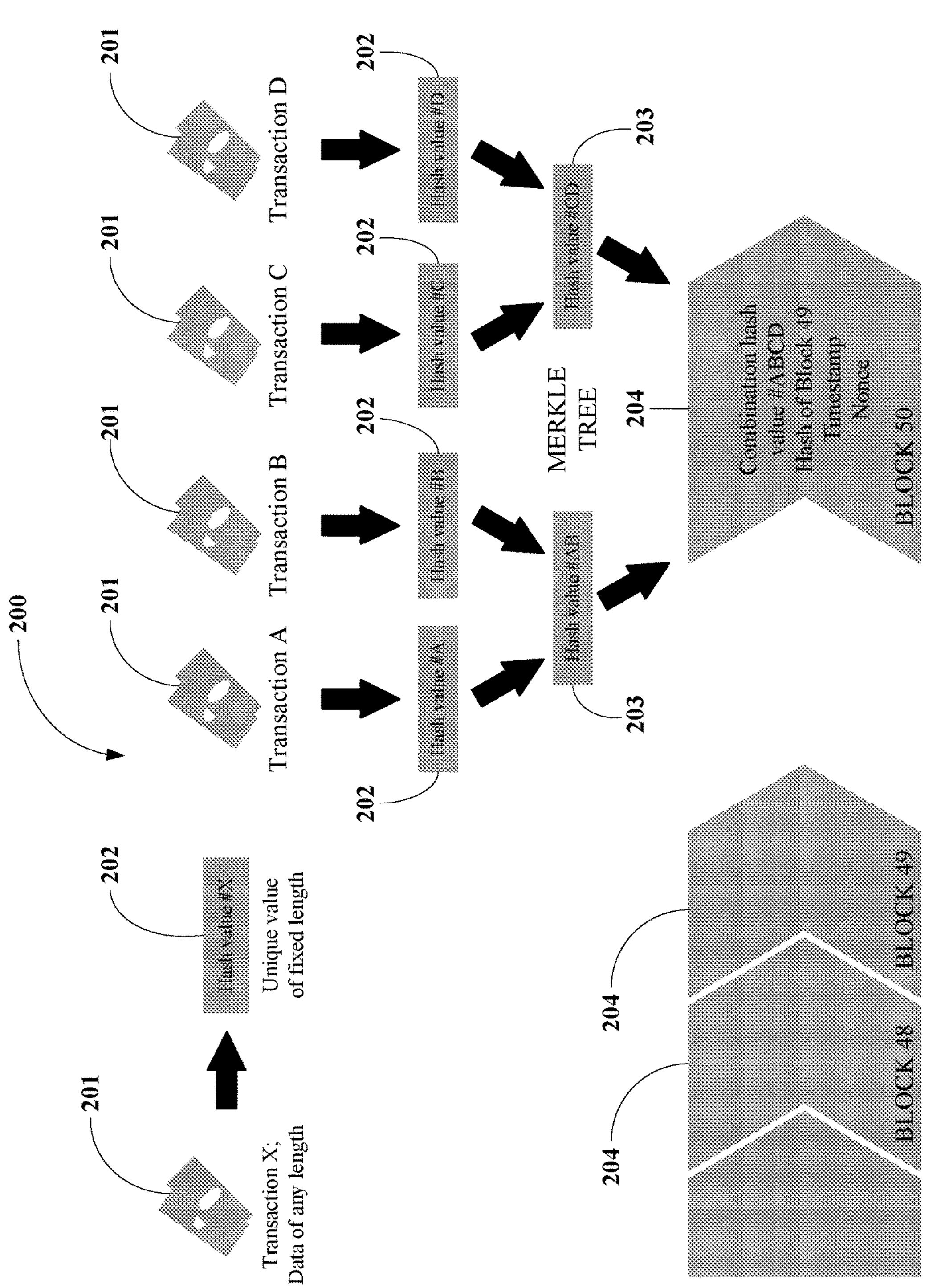
FIG. 2 shows and illustration of a Merkle Tree.

Referring now to FIG. 2, the present architecture uses an event driven design model or message driven design model in order to alleviate inefficient repetitive and intensive process of finding the parent Merkle Tree (see FIG. 2, 200) associated with a specific blockchain transaction hash.

Briefly, transactions 201 are kept in a ledger called a block 204. As new transactions 201 are recorded, this changes the composition of a ledger. To find a particular transaction 201, a Merkle Tree 200 is used. The Merkle Tree 200 consists of hash values 202 and combined hash values 203. The combined hash values (202 and 203), the hash of a previous block 204, time stamp and Nonce are combined to produce a new block 204.

Figure 3:
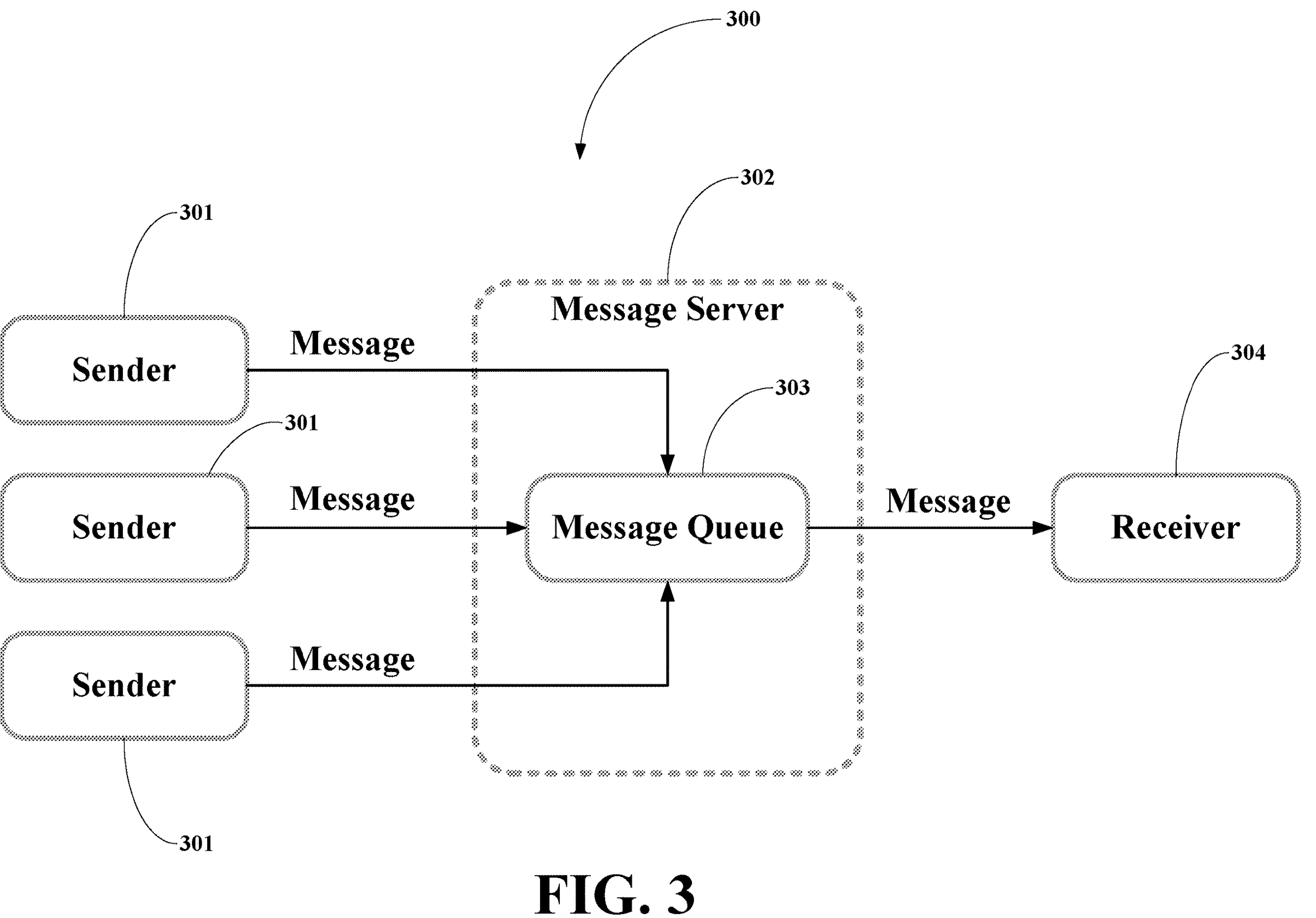
FIG. 3 shows an illustration of messaging architecture.

Referring now to FIG. 3, embodiments of the Blockchain Platform Service architecture is built on a messaging design pattern (see, e.g., FIG. 3, 300). Briefly, a message is sent from sender 301 to a messaging server 302, where the message enters a message queue 303 to sort incoming message, and finally sent to the appropriate receiver 304. In a related aspect, the envelope messaging may support includes, but is not limited to, JSON, XML, CSV, JSV, SOAP, ProtoBuf, MessageWire, HTML, Text, Byte Array Streams, or mixtures of the messaging formats. In a further related aspect, the default internal messaging of the instant architecture uses a binary serialization format or protocol buffers (e.g., Googles ProtoBuf). Protocol buffers are language-neutral, platform-neutral, extensible mechanisms for serializing structured data, which represent a faster process compared to, for example, XML, which buffers represent a smaller and simpler way to serialize and conduct intra-service communications. For example, ProtoBuf allows one to define how the data is to be structured once, then special generated source code may be used to easily write and read structured data to and from a variety of data streams using a variety of languages.

While most blockchain solutions use numerous containerized service instances and/or GPUs to offload the process intensive work of mining and both creating and validating proofs, the instant architecture as disclosed has adopted a Virtual Actor design pattern to create an abstraction of each blockchain transaction.

Virtual actors are a primitive unit of computation. A key advantage of virtual actors is that they are fast and designed specifically for solving the problem of distributed computing as each mailbox contains a mailbox used in support intra-service communications. Virtual actors are completely isolated and never share memory and are thereby stateful. The stateful aspect of virtual actors allows for each hash key and parent Merkle Tree has key to be persistent and used to link the child virtual actor to its parent Merkle Tree root. As new transactions are added to an existing Merkle Tree, instantaneous event-based messaging occurs between the newly spawned child and its parent Merkle Tree. As a parent Merkle Tree receives messages of newly added transactions, the parent Merkle Tree updates its Merkle Tree root hash key. In turn, this updated Merkle Tree root has key is broadcast to all other siblings via event based messaging or non event based messaging. Virtual actors represent a more powerful means of addressing scalability challenges than typical microservices considering that one can spawn more on a single box that a typical mircroservices. As disclosed herein, as virtual actors are spawned, Blockchain Platform Service achieves greater density than relying on numerous containerized service instances and/or GPUs in the cloud.

Subtle vulnerabilities within the seemingly impervious blockchain cryptography have surfaced. These vulnerabilities arose through the online exchanges where cryptocurrency wallets are stored. In these instances, basic security to safeguard public and private keys would work. However, it is the more sophisticated 51% attack that was the most alarming. In the 51% attack hackers sought to achieve a majority of computing power to control the mining effort that proofs depend on. Simply put, if one gains a majority (51%) of the node computing power in a network then one needs to establish a consensus needed to establish what transactions will become accepted by the minority (49%) of the nodes. The architecture as disclosed herein is based on a new and novel consensus algorithm not to agree on transactions, but on the existence and location of node actors within its cluster. By restricting the use of consensus algorithms to actors, node discoverability transactions are never made vulnerable to brute force denial of service attacks such as 51%.

The seminal purpose of the architecture as described herein is to address the fundamental performance issues surrounding blockchain. The fundamental performance issues common to blockchain is its inability to scale. Currently, blockchain can only process a maximum of 15 contracts per minute. This makes widespread adoption of blockchain difficult, at best.

As disclosed herein, the core of the invention is the virtual actor model. The virtual actor model is used to provide stateful RESTful services that are highly scalable and responsive to events as they support publishing/subscribing to streaming messages/events. Instead of querying ("mining") for blockchain contracts, the architecture as disclosed utilizes the virtual actor model to create a distributed abstraction of each Ethereum contract uniquely identified by it contract ID. Each virtual actor contract can subscribe to streaming events from a high brokerless message queue (ZeroMQ) in order to push messages to the virtual actor instead of a threaded object using indexing to constantly find contract messages repeatedly, which makes for a highly intensive process requiring resource intensive equipment such as costly highspeed graphical processing unites (GPUs). In other words, the disclosed architecture leverages established distributed design practices to achieve what has thus required costly resource intensive hardware.

Figure 4:
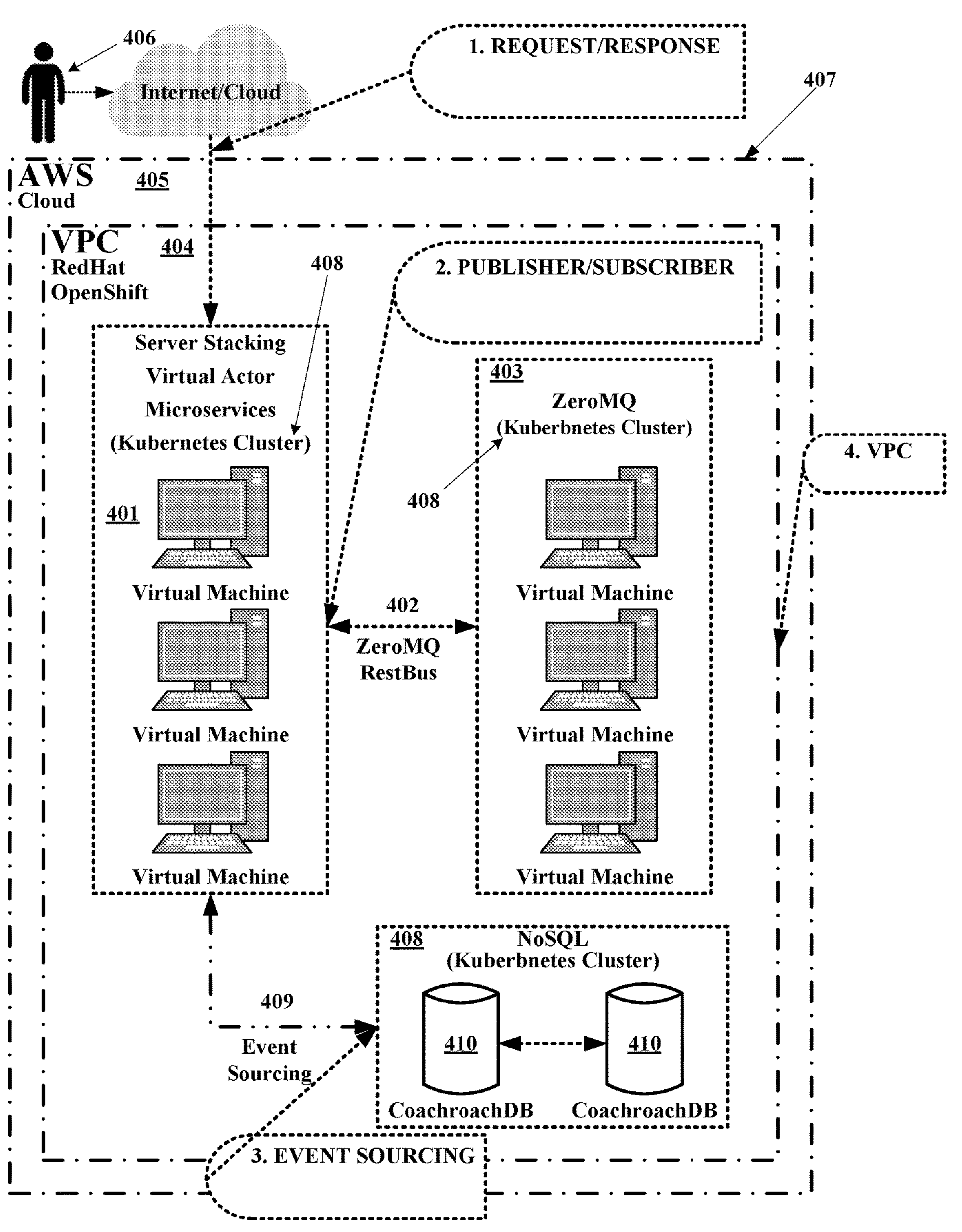
FIG. 4 illustrates the architecture as disclosed.

Referring to FIG. 4, a service stack framework is used to create RESTful distributable message-based microservices over the Request/Response architecture 407. The RestBUS API is used for communicating HTTP requests over message queues versus the HTTP protocol. The ZeroMQ Brokerless message queue 403 is used to leverage the more than 6,000,000 messages per second throughput over publisher/subscriber architecture. The Geth platform is used to port the Ethereum framework client and server API from the Go language to C# virtual actors run over a private blockchain where heavy hardware resources are necessary. The Proto-Actor framework is used to provide virtual actor functionality to the Server Stack 401 distributed microservices framework. The RedHat OpenShift platform as a service 404 is used as a thin veneer sitting on top of the Kuberbnetes orchestration layer 408 to both containerize and scale microservices. The Kubernetes container orchestration layer 408 is used to provide clusters management services of the microservices. The CoachroachDB 410 is used to provide highly scalable replicated data storage needed to support highspeed event sourcing or message sourcing of virtual actor state in real-time, near real-time, and/or periodically. The RedHat "dedicated" platform as a service 404 is used to natively run the OpenShift platform as a service inside A WS 405 via multi-talent Virtual Private Cloud (VPC). The C# programming language was used to write the proposed architecture, architecture; however, it will be apparent to one of skill in the art that other languages may be used to practice the invention.

In embodiments, referring again to FIG. 4: (1) Request/Response: incoming messages from a user 406 arrive over HTTP protocol activate virtual actor microservices ported from Geth Ethereum framework; (2) Publisher/Subscriber: virtual actor contracts receive message notifications or event notifications through ZeroMQ over an extension of the RestBus API 402 used to alleviate blockchain mining latency 402/403; (3) Message Sourcing or Event Sourcing: NoSQL QLAP persistent data storage is used to retain virtual actor state in real-time, near real-time, and/or periodically and maintain the blockchain ledger 409; and (4) VPC (Virtual Private Cloud): horizontal scaling of services achieved through RedHat's OpenStart 404 running inside AWS EC2 kubernetes Kubernetes clusters 408 that consist of multiple PODS run on virtual machine nodes running containerized application images.

The virtual actor model is used to facilitate a highly scalable eco system of stateful actors to operate as an abstraction to blockchain contracts in order to alleviate blockchain mining latency based on a push versus pull/polling of contract messages through the publisher/subscriber message-based architecture.

In embodiments, a plugin module creates a queryable and private permissioned blockchain ledger by utilizing ETL to aggregate data from disparate data sources and converts that data into a distributed blockchain. In a related aspect, the plugin model utilizes blockchain to provide a layer of security for sensitive data being classified though the Blockchain Platform Support Vector Machine (SVM) algorithms.

In embodiments, plugin modules utilize blockchain smart contracts to perform process automation. In a related aspect, these modules utilize blockchain to provide security between edge devices and the Blockchain Platform cluster. In a further related aspect, the plugin modules utilize blockchain and smart contracts to execute secure payments based immutable workflow events. Moreover, these modules utilize blockchain to provide a layer of security and abstraction between the data user and the data repository.

In embodiments, the architecture as disclosed is capable of supporting two flavors of clients, where each client represents a different use case. Each of Blockchain Platform services implement interfaces that support both Restful API (IService) and Service Sent Event (SSE) (IReceiver) which behave in a similar fashion to WebSockets, but are more resilient. The architecture as disclosed herein allows the end-user to select which approach best suits their use case without needing to choose between versions.

The Restful WebAPI connection client use case represents the easiest to implement and most common to consumers of Blockchain Platform architecture. For such a client, the topology of the Blockchain Platform Service architecture is hosted in the Cloud and incorporates a series of decentralized serves through the use of load balancers to distribute REST API traffic across a cluster of containerized virtual actor node master. In turn, the virtual actor note node masters communicate with a cluster of containerized virtual actor node slaves. Communication with a specific virtual actor node is achieved via messaging over a series of RESTful WebAPI connections.

The persisted TCP/IP connection client use case is reserved for proprietary/embedded systems and requires adoption of the special TCP/IP client to consume the Blockchain Platform architecture. For such a client, the topology of the architecture is largely unchanged from the RESTful API connection client with the exception of the persisted TCP/IP connection.

This specialized TCP/IP connection client utilizes Server Sent Events (SSE) technology to persist a single bi-directional connection between the client and a virtual actor node master within the cluster. SSE utilizes long lived HTTP connections and provides lower latency than WebSockets and is not encumbered by the limitations of custom TCP protocols. Essentially, anything that supports HTTP will support SSE, which makes SSE a much simpler choice when needed to get through proxies and firewalls.

Each virtual actor cluster node communicates with each other via messaging over an SSE persisted connection. This client provides the fastest response time for the architecture as disclosed, and is ideal for distributed devices/appliances.

The architecture as disclosed herein is capable of performance metrics that outperform extant blockchain solution. These performance metrics are based on the following virtual machine configuration tabulated in Table 1.

TABLE 1

| Performance Metrics | |
|---|---|
| Parameters | Values |
| Virtual Users | 1,000 |
| Transaction Complexity | 1 KV write of size 1,000 bytes |
| StateDB Database | Stateful Virtual Actor with Oracle DB event or message source |
| Peer Resources | VM 16 CPUs, 112 GB memory, 800 GB ram |
| Block Size | 30 transactions per second and 1,000 transaction per second |

Each virtual actor can process approximately 5,000,000 messages per second during intra-process communications. The virtual actor ecosystem as disclosed herein can produce more than 1,000 blockchain proofs per second.

Implementations of this disclosure may be made in hardware, firmware, software, or any suitable combination thereof. Aspects of this disclosure may be implemented as instructions stored on a machine-readable medium, which may be read and executed by one or more processors. A machine-readable medium may include any mechanism for storing or transmitting information in a form readable by a machine (e.g., a computing device). For example, a tangible computer readable storage medium may include read only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of this disclosure, and performing certain actions.

The apparatuses and/or systems as disclosed herein may include a plurality of individual components (e.g., computer devices) each programmed with at least some of the functions described herein. In this manner, some components of system may perform some functions while other components may perform other functions, as would be appreciated.

The various components illustrated in FIG. 4 may be coupled to at least one other component via a network, which may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network. In FIG. 4, as well as in other drawing Figures, different numbers of entities than those depicted may be used. Furthermore, according to various implementations, the components described herein may be implemented in hardware and/or software that configure hardware.

For purposes of explanation, numerous specific details are set forth in order to provide a thorough understanding of the description. It will be apparent, however, to one skilled in the art that implementations of this disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference to various features are described that may be preferences or requirements for some implementations, but not other implementations.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

It will be appreciated that an a "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

The language used herein has been principally selected for readability and instructional purposes, and it may not have been selected to delineate or circumscribe the inventive subject matter. Other implementations, uses and advantages of the invention will be apparent to those skilled in the art from consideration of the specification and practice of the invention disclosed herein.

Mapping and Consensus Processing

Figure 11:
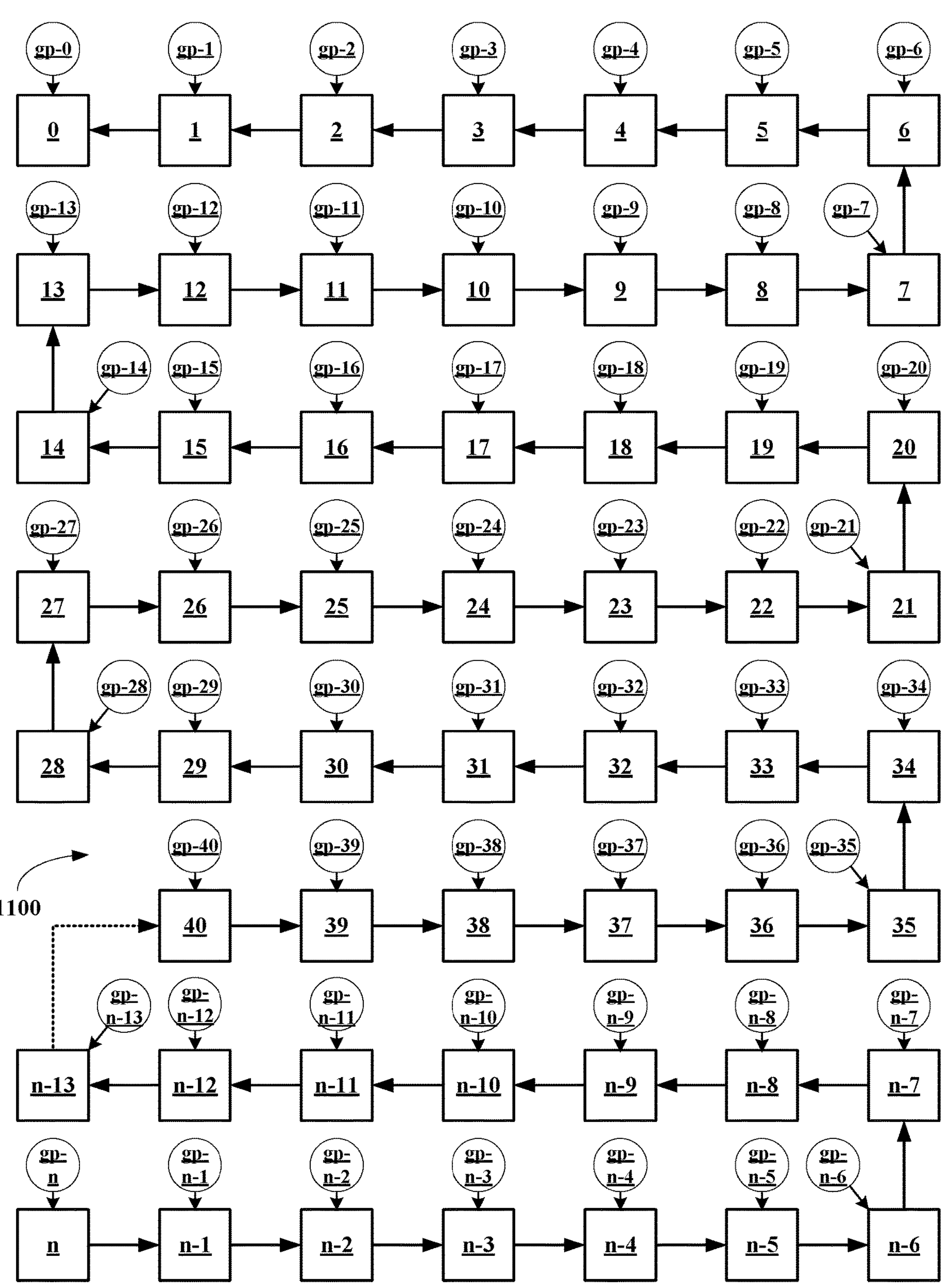
FIG. 11 illustrates the creation of a graphical ledgers of a Merkle Tree of a blockchain being accessed.

Referring now to FIG. 11, a blockchain, generally 1100, is shown to include blocks 1-*n*. Each block 1-*n* includes a hash including encrypted data and a hash link to its predecessor as it true for all blockchains. When a blockchain is brought into the systems, apparatuses, and/or interfaces described herein, each block 1-*n* is assigned a unique graphical path identifier gp-b1 to gp-bn. Each transaction within each of the blocks 1-*n* is assigned a unique graphical path identifier gp-b1-*t*1 to gp-b1-*tm*, gp-b2-*t*1 to gp-b2-*tm*, gp-b3-*t*1 to gp-b3-*tm*, . . . gp-bn-2-*t*1 to gp-bn-2-*tm*, gp-bn-1-*t*1 to gp-bn-1-*tm*, and gp-bn-*t*1 to gp-bn-*tm*, wherein each m is an independent integer ranging over the number of transactions in its block. The graphical identifiers are stored in a graphical ledgers ledger associated with a Merkle Tree of a blockchain being accessed. These unique graphical path identifiers allow direct access to each block of the accessed blockchain and to each transactions transaction of each block of the accessed blockchain by all virtual actors created and associated with the accessed blockchain.

Referring now to FIGS. 12A-C, a six block blockchain, generally 1200, the blockchain 1200 includes a root hash $a_0$. The root hash $a_0$ is linked to two first tier branch hashes $b_1$ and $b_2$.

The first tier branch hash $b_1$ is linked to two second tier branch hashes $c_1$ and $c_2$, while the first tier branch hash $b_2$ is linked to two second tier branch hashes $c_3$ and $c_4$.

The second tier branch hash $c_1$ is linked to two third tier branch hashes $d_1$ and $d_2$, the second tier branch hash $c_2$ is linked to two third tier branch hashes $d_3$ and $d_4$, the second tier branch hash $c_3$ is linked to two third tier branch hashes $d_5$ and $d_6$, while the second tier branch hash $c_4$ is linked to two third tier branch hashes $d_7$ and $d_8$.

The third tier branch hash $d_1$ is linked to two fourth tier branch hashes $e_1$ and $e_2$, the third tier branch hash $d_2$ is linked to two fourth tier branch hashes $e_3$ and $e_4$, the third tier branch hash $d_3$ is linked to two fourth tier branch hashes $e_5$ and $e_6$, the third tier branch hash $d_4$ is linked to two fourth tier branch hashes $e_7$ and $e_8$, the third tier branch hash $d_5$ is linked to two fourth tier branch hashes $e_9$ and $e_{10}$, the third tier branch hash $d_6$ is linked to two fourth tier branch hashes $e_{11}$ and $e_{12}$, the third tier branch hash $d_7$ is linked to two fourth tier branch hashes $e_{13}$ and $e_{14}$, while the third tier branch hash $d_8$ is linked to two fourth tier branch hashes $e_{15}$ and $e_{16}$.

The fourth tier branch hash $e_1$ is linked to two transactions hashes $t_1$ and $t_2$, the fourth tier branch hash $e_2$ is linked to two transactions hashes $t_3$ and $t_4$, the fourth tier branch hash $e_3$ is linked to two transactions hashes $t_5$ and $t_6$, the fourth tier branch hash $e_4$ is linked to two transactions hashes $t_7$ and $t_8$, the fourth tier branch hash $e_5$ is linked to two transactions hashes $t_9$ and $t_{10}$, the fourth tier branch hash $e_6$ is linked to two transactions hashes $t_{11}$ and $t_{12}$, the fourth tier branch hash $e_7$ is linked to two transactions hashes $t_{13}$ and $t_{14}$, the fourth tier branch hash $e_8$ is linked to two transactions hashes $t_{15}$ and $t_{16}$, the fourth tier branch hash $e_9$ is linked to two transactions hashes $t_{17}$ and $t_{18}$, the fourth tier branch hash $e_{10}$ is linked to two transactions hashes $t_{19}$ and $t_{20}$, the fourth tier branch hash $e_{11}$ is linked to two transactions hashes $t_{21}$ and $t_{22}$, the fourth tier branch hash $e_{12}$ is linked to two transactions hashes $t_{23}$ and $t_{24}$, the fourth tier branch hash $e_{13}$ is linked to two transactions hashes $t_5$ and $t_{26}$, the fourth tier branch hash $e_{14}$ is linked to two transactions hashes $t_{27}$ and $t_{28}$, the fourth tier branch hash $e_{15}$ is linked to two transactions hashes $t_{29}$ and $t_{30}$, while the fourth tier branch hash $e_{16}$ is linked to two transactions hashes $t_{31}$ and $t_{32}$.

Looking at FIG. 12A, the unique graphical path identifiers gp-1 through gp-n are comprise graph paths as set forth in Table 2:

TABLE 2

| Unique Graphical Path Identifiers | | | |
|---|---|---|---|
| Block | Block Path | Transaction | Transaction Path |
| 1 | $a_0b_1c_1d_1e_1t_1e_1t_2e_2t_3e_2t_4$ | 1 | $a_0b_1c_1d_1e_1t_1$ |
| 1 | | 2 | $a_0b_1c_1d_1e_1t_2$ |
| 1 | | 3 | $a_0b_1c_1d_1e_2t_3$ |
| 1 | | 4 | $a_0b_1c_1d_1e_2t_4$ |
| 2 | $a_0b_1c_1d_2e_3t_5e_3t_6$ | 5 | $a_0b_1c_1d_2e_3t_5$ |
| 2 | | 6 | $a_0b_1c_1d_2e_3t_6$ |

TABLE 2-continued

| Unique Graphical Path Identifiers | | | |
|---|---|---|---|
| Block | Block Path | Transaction | Transaction Path |
| 3 | $a_0b_1c_1d_2e_4t_7e_4t_8$ | 7 | $a_0b_1c_1d_2e_4t_7$ |
| 3 | | 8 | $a_0b_1c_1d_2e_4t_8$ |
| 4 | $a_0b_1c_2d_3e_5t_9e_5t_{10}e_6t_{11}e_6t_{12}d_4e_7t_{13}d_4e_7t_{14}$ | 9 | $a_0b_1c_2d_3e_5t_9$ |
| 4 | | 10 | $a_0b_1c_2d_3e_5t_{10}$ |
| 4 | | 11 | $a_0b_1c_2d_3e_6t_{11}$ |
| 4 | | 12 | $a_0b_1c_2d_3e_6t_{12}$ |
| 4 | | 13 | $a_0b_1c_2d_4e_7t_{13}$ |
| 4 | | 14 | $a_0b_1c_2d_4e_7t_{14}$ |
| 5 | $a_0b_1c_1d_4e_8t_{15}e_8t_{16}d_5e_9t_{17}e_9t_{18}$ | 15 | $a_0b_1c_2d_4e_8t_{15}$ |
| 5 | | 16 | $a_0b_1c_2d_4e_8t_{16}$ |
| 5 | | 17 | $a_0b_2c_3d_5e_9t_{17}$ |
| 5 | | 18 | $a_0b_2c_3d_5e_9t_{18}$ |
| 6 | $a_0b_1c_3d_5e_{10}t_{19}e_{10}t_{20}d_6e_{11}t_{21}e_{11}t_{22}e_{12}t_{23}e_{12}t_{24}$ | 19 | $a_0b_2c_3d_5e_{10}t_{19}$ |
| 6 | | 20 | $a_0b_2c_3d_5e_{10}t_{20}$ |
| 6 | | 21 | $a_0b_2c_3d_6e_{11}t_{21}$ |
| 6 | | 22 | $a_0b_2c_3d_6e_{11}t_{22}$ |
| 6 | | 23 | $a_0b_2c_3d_6e_{12}t_{23}$ |
| 6 | | 24 | $a_0b_2c_3d_6e_{12}t_{24}$ |
| 7 | $a_0b_1c_4d_7e_{13}t_{25}e_{13}t_{26}e_{14}t_{27}e_{14}t_{28}d_8e_{15}t_{29}e_{15}t_{30}d_8e_{16}t_{31}e_{16}t_{32}$ | 25 | $a_0b_2c_4d_7e_{13}t_{25}$ |
| 7 | | 26 | $a_0b_2c_4d_7e_{13}t_{26}$ |
| 7 | | 27 | $a_0b_2c_4d_7e_{14}t_{27}$ |
| 7 | | 28 | $a_0b_2c_4d_7e_{14}t_{28}$ |
| 7 | | 29 | $a_0b_2c_4d_8e_{15}t_{29}$ |
| 7 | | 30 | $a_0b_2c_4d_8e_{15}t_{30}$ |
| 7 | | 31 | $a_0b_2c_4d_8e_{16}t_{31}$ |
| 7 | | 32 | $a_0b_2c_4d_8e_{16}t_{32}$ |

Looking at FIG. 12B, a new block B8 has been proposed for consensus approval. Block B8 comprises four transactions $t_{33}$ through $t_{36}$. The systems, apparatuses, and/or interfaces update the VACTs to include the hash contents of the new block B8 for consensus review and consent as will be explained more completely in FIGS. 13A-D.

Looking at FIG. 12C, once consensus is achieved to the given consensus criteria, the new block B8 is added to the blockchain blockchains and graphical paths are assigned and the contents of new block B8 are added to the ledger and the graph table now appears set forth in Table 3:

TABLE 3

| Updated Unique Graphical Path Identifiers | | | |
|---|---|---|---|
| Block | Block Path | Transaction | Transaction Path |
| 1 | $a_0b_1c_1d_1e_1t_1e_1t_2e_2t_3e_2t_4$ | 1 | $a_0b_1c_1d_1e_1t_1$ |
| 1 | | 2 | $a_0b_1c_1d_1e_1t_2$ |
| 1 | | 3 | $a_0b_1c_1d_1e_2t_3$ |
| 1 | | 4 | $a_0b_1c_1d_1e_2t_4$ |
| 2 | $a_0b_1c_1d_2e_3t_5e_3t_6$ | 5 | $a_0b_1c_1d_2e_3t_5$ |
| 2 | | 6 | $a_0b_1c_1d_2e_3t_6$ |
| 3 | $a_0b_1c_1d_2e_4t_7e_4t_8$ | 7 | $a_0b_1c_1d_2e_4t_7$ |
| 3 | | 8 | $a_0b_1c_1d_2e_4t_8$ |
| 4 | $a_0b_1c_2d_3e_5t_9e_5t_{10}e_6t_{11}e_6t_{12}d_4e_7t_{13}d_4e_7t_{14}$ | 9 | $a_0b_1c_2d_3e_5t_9$ |
| 4 | | 10 | $a_0b_1c_2d_3e_5t_{10}$ |
| 4 | | 11 | $a_0b_1c_2d_3e_6t_{11}$ |
| 4 | | 12 | $a_0b_1c_2d_3e_6t_{12}$ |
| 4 | | 13 | $a_0b_1c_2d_4e_7t_{13}$ |
| 4 | | 14 | $a_0b_1c_2d_4e_7t_{14}$ |
| 5 | $a_0b_1c_1d_4e_8t_{15}e_8t_{16}d_5e_9t_{17}e_9t_{18}$ | 15 | $a_0b_1c_2d_4e_8t_{15}$ |
| 5 | | 16 | $a_0b_1c_2d_4e_8t_{16}$ |
| 5 | | 17 | $a_0b_2c_3d_5e_9t_{17}$ |
| 5 | | 18 | $a_0b_2c_3d_5e_9t_{18}$ |
| 6 | $a_0b_1c_3d_5e_{10}t_{19}e_{10}t_{20}d_6e_{11}t_{21}e_{11}t_{22}e_{12}t_{23}e_{12}t_{24}$ | 19 | $a_0b_2c_3d_5e_{10}t_{19}$ |
| 6 | | 20 | $a_0b_2c_3d_5e_{10}t_{20}$ |
| 6 | | 21 | $a_0b_2c_3d_6e_{11}t_{21}$ |
| 6 | | 22 | $a_0b_2c_3d_6e_{11}t_{22}$ |
| 6 | | 23 | $a_0b_2c_3d_6e_{12}t_{23}$ |
| 6 | | 24 | $a_0b_2c_3d_6e_{12}t_{24}$ |
| 7 | $a_0b_1c_4d_7e_{13}t_{25}e_{13}t_{26}e_{14}t_{27}e_{14}t_{28}d_8e_{15}t_{29}e_{15}t_{30}d_8e_{16}t_{31}e_{16}t_{32}$ | 25 | $a_0b_2c_4d_7e_{13}t_{25}$ |
| 7 | | 26 | $a_0b_2c_4d_7e_{13}t_{26}$ |
| 7 | | 27 | $a_0b_2c_4d_7e_{14}t_{27}$ |
| 7 | | 28 | $a_0b_2c_4d_7e_{14}t_{28}$ |
| 7 | | 29 | $a_0b_2c_4d_8e_{15}t_{29}$ |
| 7 | | 30 | $a_0b_2c_4d_8e_{15}t_{30}$ |
| 7 | | 31 | $a_0b_2c_4d_8e_{16}t_{31}$ |
| 7 | | 32 | $a_0b_2c_4d_8e_{16}t_{32}$ |

TABLE 3-continued

| Updated Unique Graphical Path Identifiers | | | |
|---|---|---|---|
| Block | Block Path | Transaction | Transaction Path |
| 8 | $a_0b_3c_5d_9e_{17}t_{33}e_{17}t_{34}e_{14}t_{27}e_{14}t_{28}d_8e_{15}t_{29}e_{15}t_{30}d_8e_{16}t_{31}e_{16}t_{32}$ | 33 | $a_0b_3c_5d_9e_{17}t_{33}$ |
| 8 | | 34 | $a_0b_3c_5d_9e_{17}t_{34}$ |
| 8 | | 35 | $a_0b_3c_5d_9e_{18}t_{35}$ |
| 8 | | 36 | $a_0b_3c_5d_9e_{18}t_{36}$ |

Figure 13A:
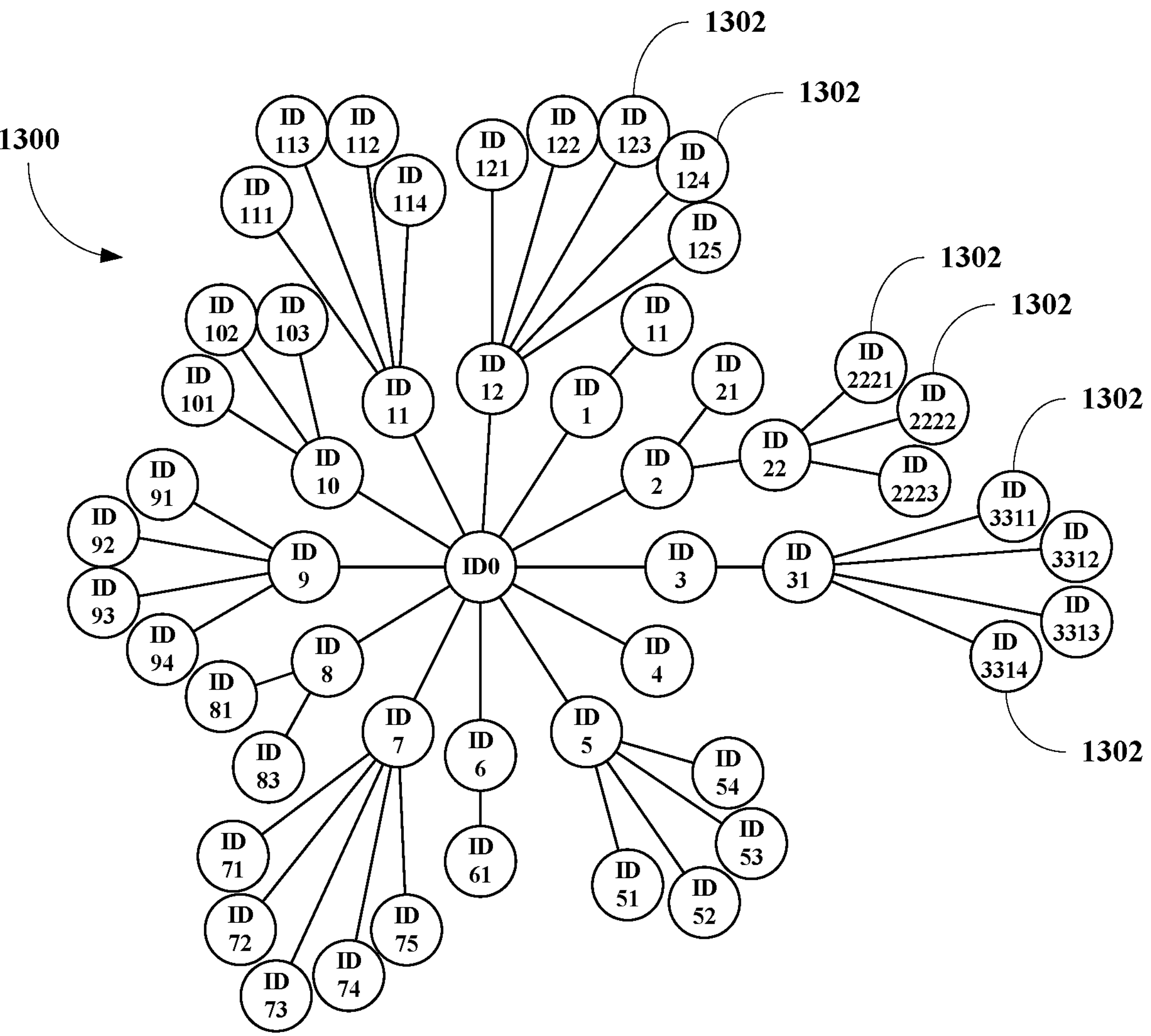
Figure 13B:
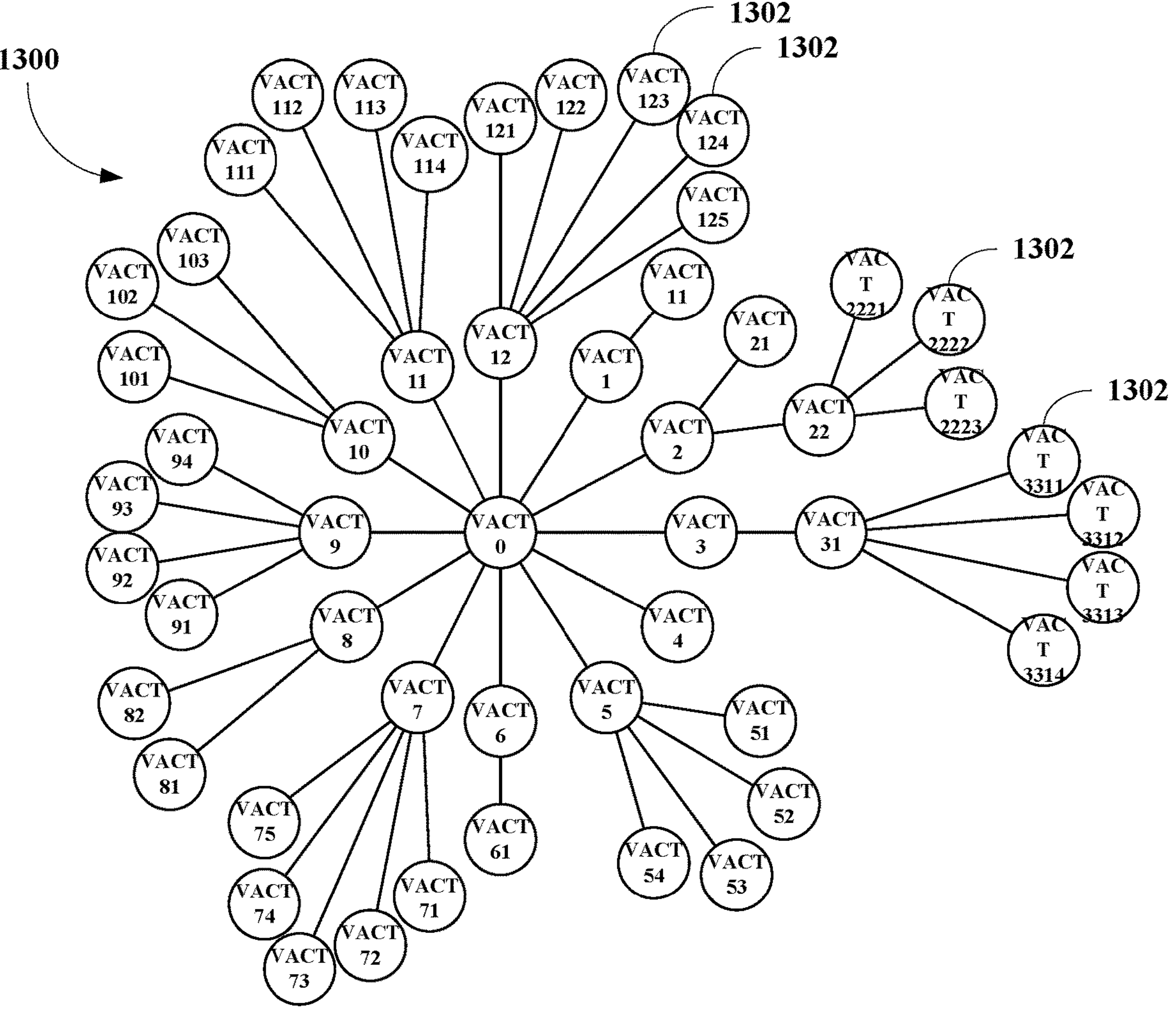
Figure 13C:
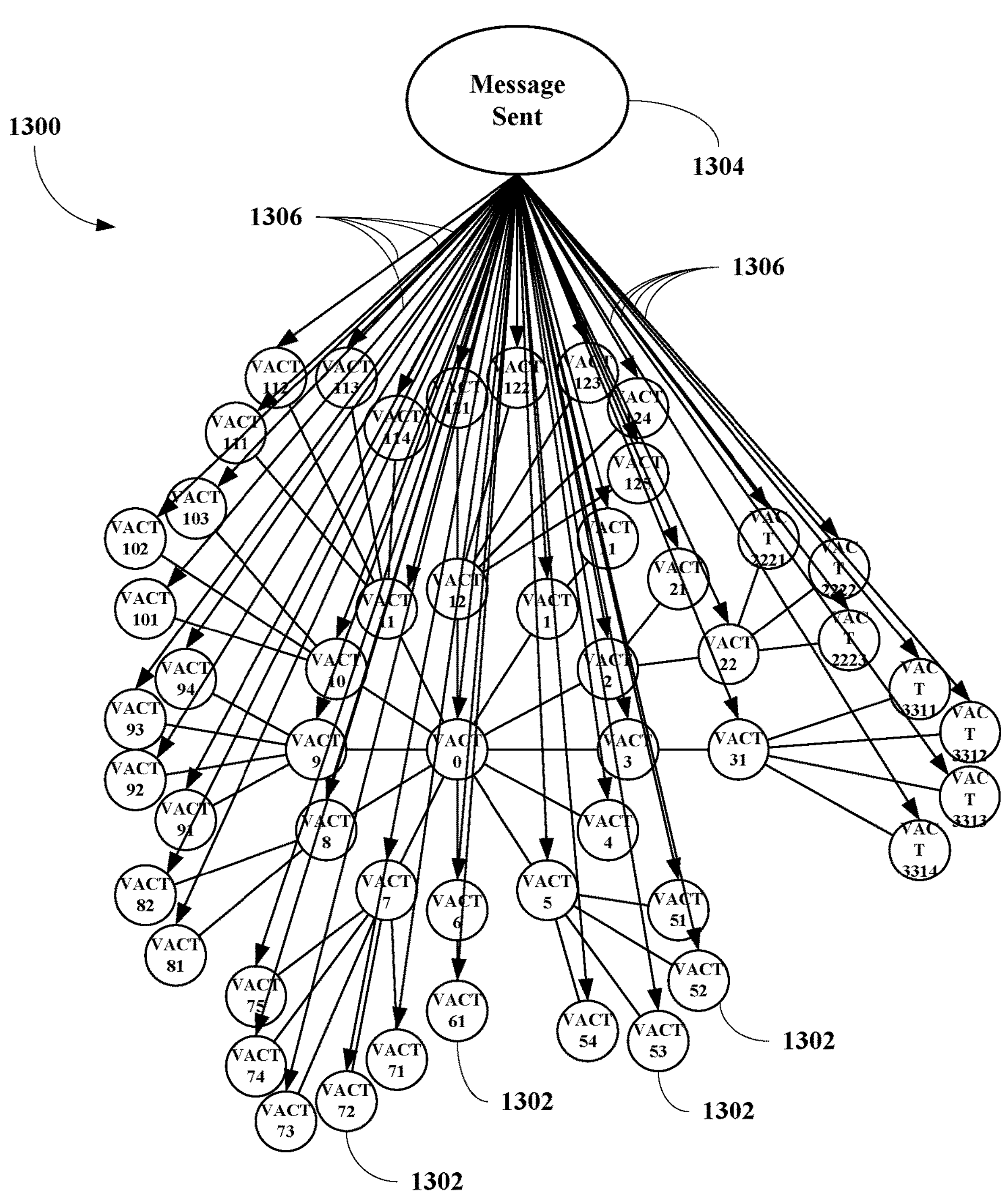

Referring now to FIGS. 13A-C illustrated the creation of consensus tokens used for processing consensus polling on adding new blocks and/or new transactions, proofing, verifying, and/or authenticating existing blocks and/or transactions, or modifying and/or updating existing blocks and/or transactions.

Looking at FIG. 13A, a network, generally 1300, of virtual actors 1302 including network identifiers ID0 through ID3314. The network is constructed simply for illustration purposes and not as a limitation as most network will be far larger encompassing 1000 if not millions of virtual actors. The network includes virtual actor 0 and all of its son/daughter virtual actors. The network may of course include numerous unrelated virtual actor zeros with its son/daughter virtual actors. Again, the network 1300 is only for illustration purposes to allow pictorial understanding to the consensus methodology of this disclosure.

Looking at FIG. 13B, the virtual actors 1302 of the network 1300 is then assigned unique variable length cryptographic or encrypted virtual actor consensus token VACTs for each of the virtual actors 1302 in addition to their original network IDs. The VACTs allow consensus information to be directly accessible to each virtual actor 1302 in the network via the messaging service.

Looking at FIG. 13C, the message service 1304 sends a message 1306 to the virtual actors 1302 including the data field of the data to be considered for consensus review.

Figure 13D:
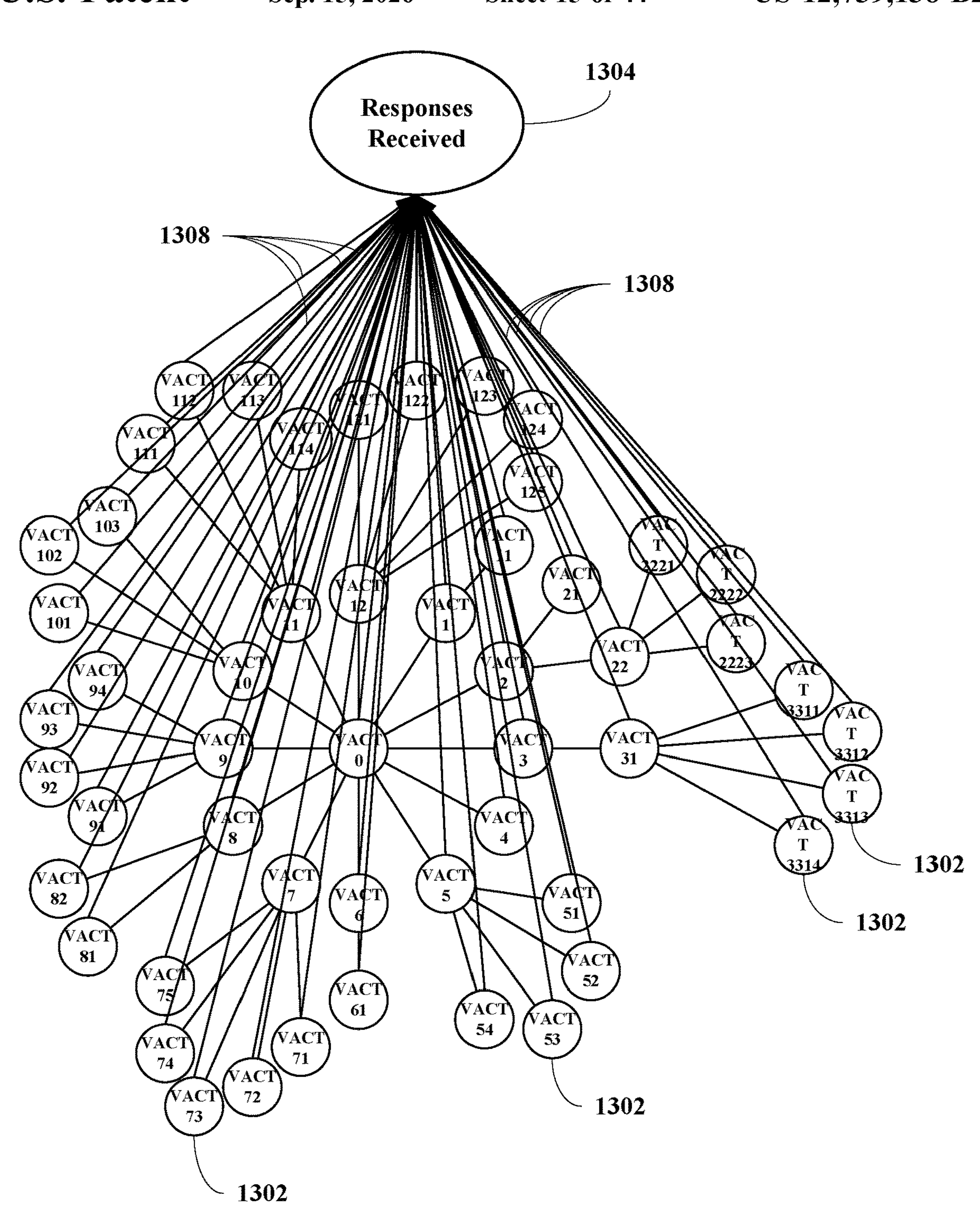

Looking at FIG. 13D, the message service 1304 receives responses 1308 from the virtual actors 1302 including the data field of the data to be considered for consensus review. If the number of positive response equals or exceeds that consent criteria, then the data in the data field in is approved and the data field is added and the virtual actor 1302 data structures include the approved data in the data field. The data may comprise (a) new blocks or transactions in the blockchain and/or (b) existing block or transactions within the existing block. The approval may be to (a) add the new block or new transaction of a pre-processed blockchain, (b) verify existing block data or existing block transactions, (c) modify existing block data or existing block transactions, (d) delete an existing block or an existing block transaction, (e) any other information that needs consensus approval, and (f) any mixture thereof.

Referring now to FIG. 14A depicts a conceptual flow chart for pre-processing a new blockchain and producing a graphical ledger for the blockchain. The method includes identifying the new blockchain to be added and accessed. The method includes generating virtual actors for the new blockchain. The method includes preparing a graphical ledger for the new blockchain. The method includes broadcasting to all of the virtual actors that a new blockchain is now accessible. The method includes updating the information stored by all of the virtual actors in the network so that they all have stateful access to the new blockchain.

Referring now to FIG. 14B depicts a conceptual flow chart for creating consensus tokens for all virtual actors for consensus polling. The method includes generating unique variable length cryptographic or encrypted virtual actor consensus tokens (VACTs) for each virtual actor in the network. The method includes broadcasting a message to all virtual actors notifying them of the generated VACT.

Referring now to FIG. 15 depicts a conceptual flow chart for performing consensus polling. The method includes adding data to the data field of the VACTs for all virtual actors. The method includes adding data field content to the VACTs. The method includes broadcasting a message to all virtual actors requesting consent of the data in the data field associated with the message. The method includes receiving polling responses to the message. The method includes accumulating the responses. The method includes determining if sufficient positive responses to satisfy the consensus criteria to act upon the data in the data field. If the consensus criteria are satisfied, then updating the one or more blockchain to which the data pertains; otherwise, no action is taken.

Rethinking Oil and/or Gas Production

Referring now to FIG. 16, a chart to rethink oil and/or gas production is shown including cycles including: (1) real-time, near real-time, and/or periodic decision-making; (2) continuous insights; (3) optimized production; and (4) predictive operations.

Real-time, near real-time, and/or periodic decision-making requires large amounts of data including data to to be discovered, generated data, collected data, stored data, connected data, and any other data generated or collected by instruments, sensors, users, searches, databased, or other data sources. Theses These data are generally distributed across many different networks including many different data sources and storage system. Real-time, near real-time, and/or periodic data from these data sources are required for rapid decision-making, faster problem resolution, and more efficient facility operations.

Continuous or periodic insights requires require automated processes through smarter workflow workflows, and make data interoperable leading to more streamlined and efficient operations.

Optimized production results in improved production performance while reducing manual processes that block progress to save costs, improve safety, optimize the production chain, and reduce errors.

Predictive operations implements predictive digital twin models within oil and/gas upstream, mid-stream, and downstream systems. Digital twinning is used to optimize the entire facilities, parts of facilities during a facility lifecycle. Digital twinning may also be used to improve preemptive maintenance, asset management, facility or facility unit upgrades, facility or facility unit scheduled shut downs, facility or facility unit unscheduled or adverse event shut downs, and facility or facility unit decommissioning.

Current Digital Online Solution Configuration

Referring now to FIG. 17, a diagram of an existing digital online solution system layout, generally 1700, is shown to include an existing process facility network architecture subsystem 1710 and an existing online application subsystem 1750 in communication with the existing process facility network architecture subsystem 1710 via a first communication pathway 1712 and a second communication pathway 1714. The existing process facility network architecture subsystem 1710 including a unit operation level 1716, a field network level 1718, a control network level 1720, a client server network level 1722, a process control network level 1724, and a facility network/business network/public network level 1726. These levels are often referred to as Level 0, Level 1, Level 2, Level 3, Level 3.5, and Level 4.

The unit operation equipment level 1716 includes equipment units 1716*a*.

The field network level 1718 includes a field network 1718*a*. The field network 1718*a* includes communication pathways 1718*b* connecting the equipment units 1716*a* to the field network 1718*a*. The field network level 1718 also includes control units 1718*c* and communication pathways 1718*d* connecting the control units 1718*c* to the field network 1718*a*. The field network level 1718 also includes server units 1718*e* and communication pathways 1718*f* connecting the server units 1718*e* to the field network 1718*a*.

The control network level 1720 includes a control network 1720*a*. The control network 1720*a* includes communication pathways 1720*b* connecting the control units 1718*c* to the control network 1720*a*. The control network level 1720 also includes servers server units 1720*c* and communication pathways 1720*d* connecting the server units 1720*c* to the field network 1720*a*.

The client server network level 1722 includes a client server network 1722*a*. The client server network 1722*a* includes communication pathways 1722*b* connecting the server units 1720*c* to the client server network 1722*a* and communication pathways 1722*c* the server units 1718*c* to the client server network 1722*a*. The client server network 1722*a* presents the typical limited integrated solutions based on each of the function silos or servers.

The process control network level 1724 includes process user computer units 1724*a* connected to the client server network 1724*a* via communication pathways 1722*d* and process control server units 1724*b* connected to the client server network 1724*a* via communication pathways 1722*e*.

The facility/business/public network level 1726 includes a facility network 1726*a*. The facility network 1726*a* includes communication pathways 1726*b* connecting the process control server units 1724*b* to the facility network 1726*a*. The facility network 1726*a* also includes business end user computer units 1726*c* and business end user computer communication pathways 1726*d*. The facility/business/public network level 1726 also includes a business network 1728*a*. The business network 1728*a* includes business network server units 1728*b*, business network server communication pathways 1728*c* connecting the business network server units 1728*b* to the business network 1728*a*, and a communication pathway 1726*e* connecting the facility network 1726*a* to the business network 1728*a*. The facility/business/public network level 1728 also includes a public internet network 1730*a* includes communication pathways 1730*b* connecting the business network server units 1728*b* to the public internet network 1730*a* and public internet server units 1730*c* and communication pathways 1730*d*. The facility/business/public network level 1726 represents the typical C/S solutions based on each of the silos or servers.

The existing online application subsystem 1750 generally includes: (a) a model based control analysis component 1752; (b) an advanced modular applications component 1754; (c) a model based virtual sensors component 1756; (d) an online real-time, near real-time, and/or periodic solutions component 1758; (e) an operation procedure optimization component 1760; (f) an advanced corporation application component 1762; (g) a database and data base interface component 1764; (h) a human-machine interface (HMI) and a graphics user interface (GUI) component 1766; and (i) a DL/MVL/AI applications component 1768.

The prior art digital online solution system layout 1700 have a number of disadvantages: (a) operational solutions are not organized systemically; (b) operational solutions function within their given data silos only; and (c) the layout uses traditional C/S structure architecture.

Existing Digital Online Solution Layout

From functional silos to data sprawls, the current process plant architecture is not optimal. Solutions are not developed for process operation systemically, and solutions are limited functionally within their respective silos. The current process plant architecture uses traditional client/server (C/S) structure architecture making data difficult to transform among the different solutions for facility operations.

Moving Forward the Vision of Digital Virtual Asset

Embodiments of this disclosure is designed to utilize Software As A Service (SaaS) routines for end-to-end solutions allowing operators to break functional silos and to mimic operation workflow in the real-world using leading-edge digital twin technology for production governance in high quality. These embodiments utilize leading-edge digital twin technology to provide quick deliverables for process simulations, predictions, etc., which are easy to maintain within a relative short development time. These embodiments integrate solutions and consolidate and analysis hidden values for production, reliability condition, and other data. These embodiments provide improved and more robust data collection and using DL/ML/AI applications to consolidate and analyze such collected data. These embodiments are also designed to provide more data to train DL/ML/AI models, using simulation methods. These embodiments are also designed to tie-in with robotics to reach PCN lower levels as PCN supplement layer, without interrupting autonomous operations. These embodiments are also designed to improve engineering design and operation of oil and gas upstream and downstream facilities allowing the ability to maximize profits and safety merging, including project cost.

Prior Art Current Facility Information Data Collection Systems

Referring now to FIG. 18, an embodiment of a prior art or current facility information data collection system, generally 1800, is shown to include facility information data collection system fundamentals 1810 including: (a) equipment & modular simulation 1812; (b) process, pipeline, facility simulation 1814; (c) integrated control configuration 1816; (d) performance optimization 1818; (e) online integrated solution 1820; (f) database and ML/AI integration 1822; and (g) economic add-on integration 1824.

The fundamentals 1810 are implemented on a facility information data collection system layout 1830. The layout 1830 includes a process control network (PCN) 1840, a facility intranet or IT network 1870, and a public internet 1880.

The PCN 1840 includes: (a) a unit operation level or level 0 1842 including unit operation equipment 1844; (b) a sensor level or level 1 1846 including field instruments, devices, sensors, and other data generating devices 1848; (c) a control system level or level 2 1850 including a distributed control system (DCS), a supervisory control and data acquisition (SCADA) system, and programmable logic controller (PLC) system 1852; (d) an advanced control system level or level 3 1854 including advanced control system applications 1856; and (e) a client server network level or level 3.5 1858 including DMZ client server network applications 1860.

The facility intranet or IT network 1870 includes a management level or level 4 1872 including operation management applications 1874. The facility intranet or IT network 1870 also includes business management applications 1876.

DMZ is a physical or logical subnetwork that contains and exposes an organization's external-facing services to an untrusted, usually larger, network such as the Internet. The purpose of a DMZ is to add an additional layer of security to an organization's local area network (LAN): an external network node can access only what is exposed in the DMZ, while the rest of the organization's network is protected behind a firewall. The DMZ functions as a small, isolated network positioned between the Vertical Integration 1890.

The prior art or current facility information data collection system 1800 has certain disadvantages including: (a) poor efficiency information sharing; (b) heavy load for data centralization; (c) cyber security concerns including solutions move away from Level 3/3.5 to Level 4; (d) difficult to gather data through PCN to information technology (IT) layer; and (e) limited information from level 0 and level 1.

Referring now to FIG. 19A, a diagram of an blockchain virtual actor digital online solution system layout, generally 1900, is shown to include a facility network assembly/subsystem 1910 and a blockchain data services software (BcDSS) information/data collection/acquisition assembly/subsystem 1960 in communication with the facility network assembly/subsystem 1910 via a first unidirectional communication pathway 1912, a second unidirectional communication pathway 1914, and a first bilateral communication pathway 1916.

The facility network assembly/subsystem 1910 includes a process control network (PCN) 1920, a facility intranet or IT network 1940, and a public internet 1950.

The PCN) 1920 includes: (a) a unit operation level or level 0 1922 including operational equipment 1922*a*; (b) a field network level or level 1 1924 including field instruments, devices, sensors, or any other data creating devices 1924*a*; (c) a control network level or level 2 1926 including control system including DCS, SCADA, and/or PLC 1926*a*; (d) a client server network level or level 3 1928 including an advanced control system 1928*a*; and (e) a process control network level or level 3.5 1930 including a DMZ client server network 1930*a*.

The facility intranet or IT network 1940 includes an operation and business management level or level 4 1942 including an operational management component 1942*a*, and a separated business management component 1944, which is in communication with the public internet 1950.

The blockchain data services software (BcDSS) facility information/data collection assembly/subsystem 1960 includes (a) a unit operation equipment data acquisition component 1962, which assigns a virtual actor to each of data generating devices of the unit operation level or level 0 1922 and unit operation equipment 1922*a* via the first unidirectional communication pathway 1912, (b) a virtual sensor component 1964, which generates a virtual sensor for each sensor control units from data acquired from the field network level or level 1 1924 and the field instruments, devices, sensors, or any other data creating devices 1924*a* control via the second unilateral communication pathway 1914 and from data collected in the unit operation equipment data acquisition component 1962 via a first internal unilateral communication pathway 1966; and (c) a central database component 1968, which receives and stores information/data acquired from the unit operation equipment data acquisition component 1962 via a first bidirectional internal communication pathway 1970 and from the virtual sensor component 1964 via a second bidirectional internal communication pathway 1972 and is in bidirectional communication with the an operation and business management level or level 4 1930 including an operational management component 1930*a* via the first bilateral communication pathway 1916.

The blockchain virtual actor digital online solution system layout 1900 is configured to activated autonomous operation using ML and AI routines bypassing the PCN making data acquisition, modeling, and virtual twinning more reliable, flexible, secure, scalable, and efficient. The layout 1900 is also configured to break silos and to make big data analysis easier and improve ML and AI applications accuracy.

Figure 19B:
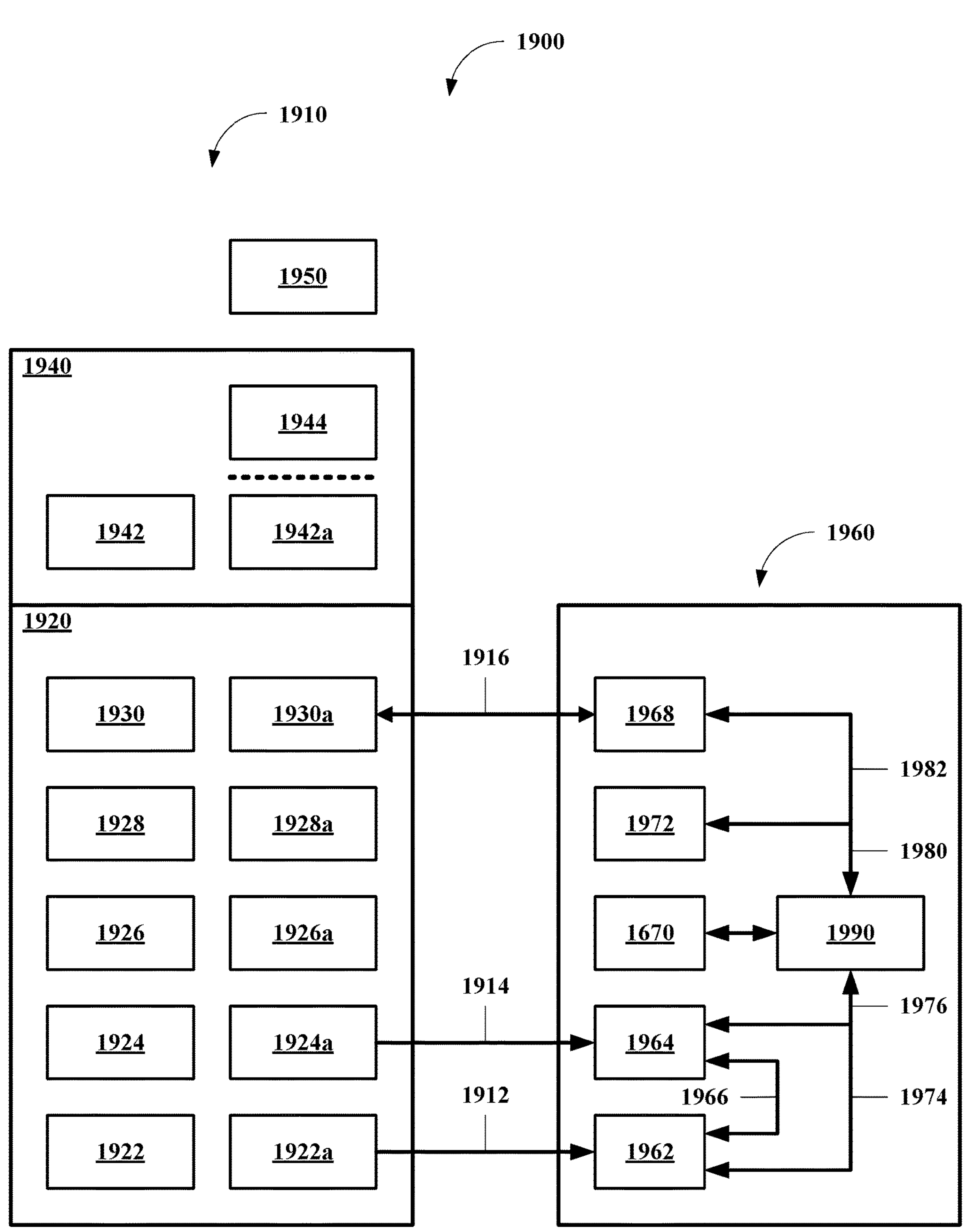

Referring now to FIG. 19B, a diagram of an blockchain virtual actor digital online solution system layout, generally 1900, is shown to include a facility network assembly/subsystem 1910 and a blockchain data services software (BcDSS) information/data collection/acquisition assembly/subsystem 1960 in communication with the facility network assembly/subsystem 1910 via a first unidirectional communication pathway 1912, a second unidirectional communication pathway 1914, and a first bilateral communication pathway 1916.

The facility network assembly/subsystem 1910 includes a process control network (PCN) 1920, a facility intranet or IT network 1940, and a public internet 1950.

The PCN) 1920 includes: (a) a unit operation level or level 0 1922 including operational equipment 1922*a*; (b) a field network level or level 1 1924 including field instruments, devices, sensors, or any other data creating devices 1924*a*; (c) a control network level or level 2 1926 including control system including DCS, SCADA, and/or PLC 1926*a*; (d) a client server network level or level 3 1928 including an advanced control system 1928*a*; and (e) a process control network level or level 3.5 1930 including a DMZ client server network 1930*a*.

The facility intranet or IT network 1940 includes an operation and business management level or level 4 1942 including an operational management component 1942*a*, and a separated business management component 1944, which is in communication with the public internet 1950.

The blockchain data services software (BcDSS) facility information/data collection assembly/subsystem 1960 includes (a) a unit operation equipment data acquisition component 1962, which assigns a virtual actor to each of data generating devices of the unit operation level or level 0 1922 and unit operation equipment 1922*a* via the first unidirectional communication pathway 1912, (b) a virtual sensor component 1964, which generates a virtual sensor for each sensor control units from data acquired from the field network level or level 1 1924 and the field instruments, devices, sensors, or any other data creating devices 1924*a* control via the second unilateral communication pathway 1914 and from data collected in the unit operation equipment data acquisition component 1962 via a first internal unilateral communication pathway 1966; and (c) a central database component 1968, which receives and stores information/data acquired from the unit operation equipment data acquisition component 1962 via a first bidirectional internal communication pathway 1970 and from the virtual sensor component 1964 via a second bidirectional internal communication pathway 1972 and is in bidirectional communication with the an operation and business management level or level 4 1930 including an operational management component 1930*a* via the first bilateral communication pathway 1916.

The blockchain virtual actor digital online solution system layout 1900 is configured to activated autonomous operation using MIL, and AI routines bypassing the PCN making data acquisition, modeling, and virtual twinning more reliable, flexible, secure, scalable, and efficient. The layout 1900 is also configured to break silos and to make big data analysis easier and improve ML and AI applications accuracy.

Referring now to FIG. 20, an embodiment of a data simulation integrated online digital twinning (DSIODT) assembly/subsystem, generally 2000, of the blockchain data services software (BcDSS) information/data collection/acquisition assemblies/subsystems 1960 of FIGS. 19A&B, are shown to include a facility and facility network assembly/subsystem 2010 and a blockchain data services software (BcDSS) assembly/subsystem 2060 in communication with the facility and facility network assembly/subsystem 2010 including via a first unidirectional communication pathway 2012, a second unidirectional communication pathway 2014, and a first bilateral communication pathway 2016.

The facility network assembly/subsystem 2010 includes a process control network (PCN) 2020, a facility intranet or IT network 2040, a public internet 2050, and a facility data communication assembly/subsystem described below including the unidirectional communication pathways 2012 and 2014 and the bidirectional communication pathway 2016.

The PCN 2020 includes: (a) a unit operation level or level 0 2022 including operational equipment 2022*a*; (b) a field network level or level 1 2024 including field instruments, devices, sensors, or any other data creating devices 2024*a*; (c) a control network level or level 2 2026 including a control system including DCS, SCADA, and/or PLC 2026*a*; (d) a client server network level or level 3 2028 including an advanced control system 2028*a*; and (e) a process control network level or level 3.5 2030 including a DMZ client server network 2030*a*.

The facility intranet or IT network 2040 includes an operation and business management level or level 4 2042 including an operational management component 2042*a* and a separated business management component 2044, which is in communication with the public internet 1950.

The blockchain data services software (BcDSS) assembly/subsystem 2060 includes: (a) a unit operation equipment data acquisition assembly/subsystem 2062 configured to: (i) acquire facility data from the facility data communication assembly/subsystem; (ii) assign facility data virtual actors to data generated by all devices and sensors associated with the unit operation equipment of the unit operation level 0 2022 via the first unidirectional communication pathway 2012; 2012; (iii) assign facility data virtual actors to information and data associated with the unit operation equipment 2022*a* via the first unidirectional communication pathway 2012; (iv) to store the data in one or more blocks of one or more blockchains of the BcDSS assembly/subsystem 2060, and to generate virtual twins of the unit operation equipment within the BcDSS) assembly/subsystem 2060; (b) a field instrument, device, and sensor virtual sensor assembly/subsystem 2064 configured to (i) acquire facility data from the facility data communication assembly/subsystem; (ii) assign facility data virtual actors to data generated by all instruments, devices, and sensors associated with the unit operation level or level 0 2022 via the second unidirectional communication pathway 2014; (iii) to store the data in one or more blocks of one or more blockchains of the BcDSS assembly/subsystem 2060, and (iv) to generate virtual twins of the unit operation equipment within the BcDSS) assembly/subsystem 2060; (c) a modeling and simulations assembly/subsystem 2066; and (d) a central database assembly/subsystem 2068 configured to house the one or more blockchains for access by all assemblies/subsystems and components of the BcDDS assembly/subsystem 2060 and to support bidirectional communication with the an operation and business management level or level 4 2030 including an operational management component 2030*a* via the first bilateral communication pathway 2016.

The blockchain data services software (BcDSS) facility information/data collection assembly/subsystem 2060 is configured to implement digital integration online digital twinning (RIoDT) and digital virtual asset assessment utilizing a series of routines and functions. The unit operation equipment data acquisition assembly/subsystem 2062 includes, without limitation: (a) a robotic operation action applications component 2062*a*, (b) a robotic for inspections/measurements component 2062*b*, and (c) a unit operation assessment applications component6 2062*c*. The virtual sensor component 2064 includes, without limitation: (a) a model based virtual sensor applications component 2064*a*, (b) a data reliability analysis applications component 2064*b*, and (c) a traditional workflow and simulation applications component 2064*c*.

The modeling and simulations assembly/subsystem 2066 of the BcDSS assembly/subsystem 2060 includes, without limitation: (a) a model based control integration applications component 2066*a*, (b) a control narrative analysis applications 2066*b*, (c) a controller tuning applications 2066*c*, (d) an operation procedure optimization applications 2066*d*, (e) an advance control applications 2066*e*, (f) a process control optimization applications 2066*f*, (g) a model based modular applications 2066*g*, (h) an online real-time, near real-time, and/or periodic solution applications 2066*h*, and (i) an advanced business applications 2066*i*.

The central database assembly/subsystem 2068 includes, without limitation: (a) databases and database interface component 2068*a*, (b) a DL/MVL/AI applications components 2068*b*, and (c) multiple process integration applications components 2068*c*.

The BcDSS assembly/subsystem 2060 also includes an advanced corporate AI applications component 2070 configured to permit improved B/S structuring and improve systemic integration.

The BcDSS assembly/subsystem 2060 also provides a list of fundamental applications 2080 including, without limitation: (a) an equipment & modular simulation applications component 2082, (b) a process, pipeline, and facility simulation applications component 2084, (c) an integrated control configuration applications component 2086 (*d*) a performance optimization applications component 2088, (e) an online integrated solution applications 2090, (f) a database and ml/ai integration applications component 2092, and (g) an economic add-on integration applications component 2094.

Referring now to FIG. 21, a graphical illustration of a virtual actor model, generally 2100, is shown. Again, a virtual actor model is a computational model for concurrent computation that treats "virtual actors" as universal primitives of concurrent computation. In the virtual actor model, the virtual actor is an autonomous entity configured to send and receive messages to and from a mailbox. Each virtual actor may create new virtual actors, send messages to other virtual actors, and determine how to respond to received messages. The virtual actor model provides a higher-level abstraction for concurrent computation, allowing developers to write concurrent programs without having to worry about low-level details inherent in thread management and synchronization. This feature makes it easier to write correct, concurrent code, and may also make it easier to write code that is performant and scalable, wherein performant means that something is working correctly or well enough to be considered functional. In a technology context, this term is believed to have originated with programmers seeking a concise word to express that a system or program will work, but may not yet be optimal. Performant may have come from a portmanteau of performance and conformant—as in working and meeting existing standards.

The virtual actor model 2100 includes a first virtual actor 2110. The first virtual actor 2110 is in bilateral communication with a computer 2112 forming an isolate state via an isolated communication pathway 2114. The first virtual actor 2110 includes a mailbox 2116 in communication therewith via a mailbox communication pathway 2118. The first virtual actor 2110 is configured to send messages 2120 to a second virtual actor 2130 via a message communication pathway 2122 and to send messages 2124 to a third virtual actor 2150 via a message communication pathway 2126. The second virtual actor 2130 is configured to send messages 2132 to the third virtual actor 2150 via a message communication pathway 2134. The third virtual actor 2150 is configured to send messages 2152 to the mailbox 2116 of the first virtual actor 2110 via a message communication pathway 2154, which are deposited in the mailbox 2116 allowing access by the first virtual actor 2110. The third virtual actor 2150 is also configured to send messages 2156 to fourth virtual actor 2170 via a message communication pathway 2158. Of course, it should be recognized that each virtual actor is supported on an individual real world computer, a real world server, a real world computer system, or a real world distributed computer system in such a way that each virtual actor represents an isolated state. Additionally, each virtual actors includes a mailbox configured to receive messages and making them available to each virtual actor.

Referring now to FIG. 22, a graphical illustration of a host node cluster scaling process, generally 2200, a process supported by the blockchain data services software (BcDSS) information/data collection/acquisition assembly/subsystem 1960 of FIGS. 19A&B, is shown to include a base host node cluster 2210 including a first host node 2212, a second host node 2214, and a third host node 2216 in communication one with the other via a host node communication ring 2218. The host node cluster scaling process 2200 is illustrated by invoking a scaling function 2230. The scaling function 2230 results in expanding the base host node cluster 2210 into an expanded host node cluster 2240. The expanded host node cluster 2240 now includes the first host node 2212, the second host node 2214, the third host node 2216, a first new host node 2242 and a second new host node 2244 all in communication with each other via a host node communication ring 2246. Thus, the blockchain data services software (BcDSS) assembly/subsystem, represented by the virtual actor blockchain platform, is capable of dynamically adding more computing power via expanding host node clusters. Each host node may include block actors, user actors, blockchains, or any combination thereof.

Referring now to FIG. 23, a graphical illustration of a federated scaling process, generally 2300, a process of the blockchain data services software (BcDSS) information/data collection/acquisition assembly/subsystem 1960 of FIGS. 19A&B, is shown to include a base host node cluster 2310 includes a first host node 2312, a second host node 2314, a third host node 2316, a fourth host node 2318, and a fifth host node 2320 in communication one with the other via a host node communication ring 2322. The federated scaling process 2300 is illustrated by invoking a federated scaling function 2330. The federated scaling function 2330 results in creating communication pathways 2340 between the base host node cluster 2310 and two other host node clusters 2360 and 2380. The host node cluster 2360 includes a first host node 2362, a second host node 2364, a third host node 2366, a fourth host node 2368, and a fifth host node 2370 in communication one with the other via a host node communication ring 2372. The host node cluster 2380 includes a first host node 2382, a second host node 2384, a third host node 2386, a fourth host node 2388, and a fifth host node 2390 in communication one with the other via a host node communication ring 2392. Thus, the blockchain data services software (BcDSS) assembly/subsystem, represented by the virtual actor blockchain platform, is capable of dynamically creating communication pathways between host node clusters expanding the distributed computing power available to the blockchain data services software (BcDSS) facility information collection assembly/subsystem 1900 via federated scaling of host node clusters. Again, each host node may include block actors, user actors, blockchains, or any combination thereof.

Xenese™ is Capable of Connecting Multiple Xenese™ Installation Clusters

Referring now to FIG. 24, a graphical illustration of an off-chain scaling process, generally 2400, a process of the blockchain data services software (BcDSS) information/data collection/acquisition assembly/subsystem 1960 of FIGS. 19A&B, is shown to include a base host node cluster 2410 includes a first host node 2412, a second host node 2414, a third host node 2416, a fourth host node 2418, and a fifth host node 2420 in communication one with the other via a host node communication ring 2422. The off-chain scaling process 2400 is illustrated by invoking an off-chain scaling function 2430. The off-chain scaling function 2430 results in creating communication pathways 2340 between the host nodes 2412-2420 and off-line cloud servers 2450 for off-line storage such as AWS, S3, or Azure Blob Storage off-line storage services.

Horizontal Pod Autoscaling

Referring now to FIG. 25, a graphical illustration of a horizontal pod autoscaling (HPA) process, generally 2500, a process of the blockchain data services software (BcDSS) information/data collection/acquisition assembly/subsystem 1960 of FIG. 19, is shown to include external requests 2510 that sent via communication pathways 2512 to an ing function 2520. The ing function 2520 output is forwarded to a SVC function 2530, which distributes the external requests among a number of pods 2540. The HPA process 2500 also include a HPA component 2550, which allows CPU utilization to go over 70% modify replica count. The HPA component 2550 sends it output to a deployment component 2560, which causes Pod scale up.

Data Flow Schema on a Blockchain Platform

Referring now to FIG. 26, a graphical illustration of a data flow schema of a digital twinning process, general0ly 2600, a process of the blockchain data services software (BcDSS) information/data collection/acquisition assembly/subsystem 1960 of FIGS. 19A&B, is shown to include a data acquisition assembly/subsystem 2610 associated with an oil/gas facility. The data acquisition assembly/subsystem 2610 includes data streams 2612 from all data producing devices with the oil/gas facility, e.g., IIoT devices, sensors, models, controller units, or any other devices that produces data within the oil/gas facility. The data streams may be formatted as JSON data streams. The data streams 2612 are forwarded to a blockchain API service 2620. The blockchain API service 2620 writes the data in the data streams 2612 to the blockchain ledger of the blockchain data services software (BcDSS) information/data collection/acquisition assembly/subsystem 1960. The digital twinning process 2600 also includes a data modeling assembly/subsystem 2630, which reads data from the blockchain ledger via the read from the ledger communication pathway 2632. The data modeling assembly/subsystem 2630 includes modeling routines, which provide the results from the modeling and/or simulation applications back to the blockchain data services software (BcDSS) information/data collection/acquisition assembly/subsystem 1960 via communication pathway 2634.

FIG. 26 represents a simple data flow schema that shows how JSON data from an IoT device may be sent to a gRPC API, written to the assembly/subsystem 1960 distributed ledger data fabric, and then used by the modeling and simulation applications to run models and simulations.

Blockchain Platform Digital Transformation Architectural Layout

Referring now to FIG. 27, a graphical illustration of a data digital transformation architectural layout, generally 2700, a process of the blockchain data services software (BcDSS) information/data collection/acquisition assembly/subsystem 1960 of FIGS. 19A&B, is shown to include IoT devices 2705 that forward data streams 2707 to a gPRC API component 2710. The gPRC API component 2710 writes the data in the data streams 2707 to a Merkle tree component 2715 of the assembly/subsystem 1960 via write to Merkel tree communication pathway 2712 and writes the data in the data stream 2707 to a PostgreSQL event sourcing 2725 via communication pathway 2714. The Merkle tree 2715 forwards data to to a proto.actor component 2720 via communication pathway 2717. The proto.actor component 2720 forwarded data to the PostgreSQL event sourcing 2725 via communication pathway 2722 and to a proof of sequence consensus component 2735 via a communication pathway 2724. The PostgreSQL event sourcing 2725 forwards data to a simulation/modeling component 2730 via a communication pathway 2727 and to a PostgreSQL Mailbox 2740 via a communication pathway 2729. The proof of sequence consensus component 2735 forwards data to the PostgreSQL Mailbox 2740 via a communication pathway 2737 and to an off-chain storage component 2750 via a communication pathway 2739. The PostgreSQL Mailbox 2740 forwards data to a results component 2745 via a communication pathway 2742. The off-chain storage component 2750 forwarded data to a JMESPath Query component 2755 via a communication pathway 2752.

In this architecture, the IoT devices generate data in real-time, near real-time, and/or periodically and sends it to the gRPC API, which writes it to the Merkle tree (distributed ledger data fabric). The Merkle tree uses Proto.Actor to compute the hashes for the blocks and organize them into a tree structure (digital twin). The blocks in the tree are linked together using a cryptographic hash function (such as SHA-256) to create a blockchain.

The simulation tool uses JMESPath to query the JSON data in the distributed ledger data fabric and off-chain storage system. The results of the JMESPath query are then passed to the simulation tool, which then uses the data to run models and produce results. This approach allows us to use JMESPath to extract and process specific data from the distributed ledger fabric and off-chain storage, making it easier to work with large amounts of data.

The consensus algorithm used in this architecture is Proof of Sequence, which determines the order in which transactions are added to the blockchain. The PostgreSQL mailbox is used to manage the message processing of data within the system.

Referring now to FIG. 28A, a graphical illustration of a distributed ledger technology for process modeling and simulations, generally 2800*a*, is shown to include an oil/gas facility 2810*a* in bilateral communication with the blockchain data services software (BcDSS) information/data collection/acquisition assembly/subsystem 1960 of FIGS. 19A&B. The oil/gas facility 2810*a* include, without limitation, deewater deepwater oil/gas facilities 2812*a*, onshore oil/gas facilities 2814*a*, pipeline oil/gas facilities 2816*a*, oil/gas refinery facilities 2818*a*, petrochemical facilities 2820*a*, or any combination thereof. The BcDSS assembly/subsystem 1960 includes a modeling/simulation assembly/subsystem 2840*a*. The modeling/simulation assembly/subsystem 2840*a* includes, without limitation, steady-state modeling/simulation applications 2842*a*, dynamic modeling/simulation applications 2844*a*, transient modeling/simulation applications 2846*a*, control logic modeling/simulation applications 2848*a*, multiphysics modeling/simulation applications 2850*a*, computation fluid dynamic (CFD) modeling/simulation applications 2852*a*, ML and AI modeling/simulation applications 2854*a*, or any combination thereof. The modeling/simulation assembly/subsystem 2840 may also include hydraulic simulation applications, drilling simulation applications, tank model applications, reservoir simulation applications, petroleum production simulation applications, well simulation applications, gas lifting simulation applications, reduced base finite element analysis model applications, or other simulation applications that may be used in modeling oil and gas facilities.

Figure 28B:
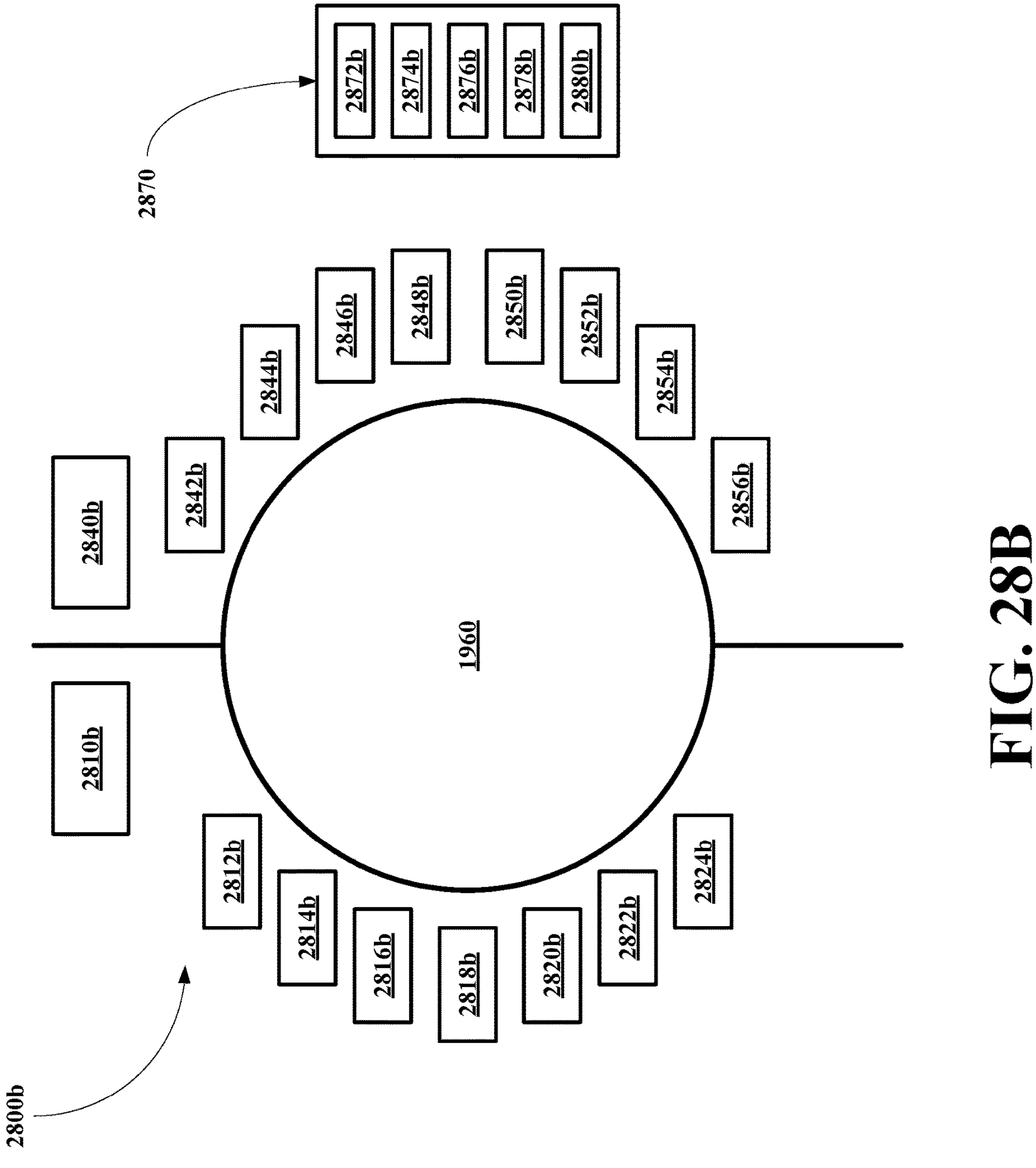

Referring now to FIG. 28B, a graphical illustration of a distributed ledger technology for process modeling and simulations, generally 2800*b*, is shown to include an oil/gas facility functions 2810*b* in bilateral communication with the blockchain data services software (BcDSS) information/data collection/acquisition assembly/subsystem 1960 of FIGS. 19A&B. The oil/gas facility functions 2810*b* include, without limitation, oil/gas operation functions 2812*b*, oil/gas control functions 2814*b*, oil/gas optimization functions 2816*b*, oil/gas advanced control functions 2818*b*, oil/gas maintenance functions 2820*b*, oil/gas supply chain functions 2822*b*, oil/gas planning functions 2824*b*, or any combination thereof. The BcDSS assembly/subsystem 1960 includes a modeling/simulation assembly/subsystem 2840*b*. The modeling/simulation assembly/subsystem 2840*b* includes, without limitation, steady-state modeling/simulation applications 2842*b*, dynamic modeling/simulation applications 2844*b*, transient modeling/simulation applications 2846*b*, control logic modeling/simulation applications 2848*b*, multiphysics modeling/simulation applications 2850*b*, computation fluid dynamic (CFD) modeling/simulation applications 2852*b*, ML and AI modeling/simulation applications 2854*b*, SOR modeling/simulation applications 2856*b*, or any combination thereof. The modeling/simulation assembly/subsystem 2840 may also include hydraulic simulation applications, drilling simulation applications, tank model applications, reservoir simulation applications, petroleum production simulation applications, well simulation applications, gas lifting simulation applications, reduced base finite element analysis model applications, or other simulation applications that may be used in modeling oil and gas facilities. The oil/gas facility functions 2810*b* may be associated with oil/gas facilities including, without limitation, deewater deepwater oil/gas facilities 2872*b*, onshore oil/gas facilities 2874*b*, pipeline oil/gas facilities 2876*b*, oil/gas refinery facilities 2878*b*, petrochemical facilities 2880*b*, or any combination thereof.

Data Solutions Integrated with Blockchain Platform

Embodiments of the apparatuses and systems of this disclosure permit the integration of facility data production and a blockchain platform for facilitating facility data acquisition services, data processing services, and project simulation and modeling services. Referring now to FIG. 29, a graphical illustration of the integration of facility data production and a blockchain platform for facilitating facility data acquisition services, data processing services, and project simulation and modeling services, generally 2900, is shown. The blockchain platform 1900 of FIGS. 19A&B provides blockchain data storing and the security intrinsic with blockchain data structures as shown in block 2910. The blockchain platform 1900 also provides a virtual actor architecture as shown in block 2930, wherein virtual actors are assigned to each data generating device or component associated with an oil/gas facility and to each authorized user. The blockchain platform 1900 also provides oil/gas rigorous models for modeling and simulations as shown in block 2950. The blockchain platform 1900 also provides an oil/gas virtual twinned facility for modeling and simulations within the virtual twinned facility as shown in block 2970. The blockchain platform 1900 results in an overall integrated structure as shown in block 2990, which allows for application integration based on information garnered from data simulations and or modeling within a virtual twinned facility, a virtual twinned facility component, a virtual twinned facility sub-component, a virtual twinned facility process, and/or a virtual twinned facility sub-process.

Embodiments of the apparatuses and systems of this disclosure are capable of interfacing with production facilities (e.g., deepwater, onshore, etc.) permitting the creation of a virtual twinned facility, a virtual twinned facility component, a virtual twinned facility sub-component, a virtual twinned facility process, and/or a virtual twinned facility sub-process. These virtual twinned constructs allow real person or AI virtual actors to request virtual modeling and simulations of performance analyses, relief load analyses, erosion analyses, flow-induced vibration (FIV) or formation isolation valve (FIV) analyses, finite element analyses, reduced basis finite element (RBFEA) analyses, and/or mooring chain analyses.

Embodiments of the apparatuses and systems of this disclosure are capable of interfacing with pipeline networks permitting the creation of a virtual twinned pipeline network, a virtual twinned pipeline network component, a virtual twinned pipeline network sub-component, a virtual twinned pipeline network process, and/or a virtual twinned pipeline network sub-process. These virtual twinned constructs allow real person or AI virtual actors to request virtual modeling and simulations of performance analyses, relief load analyses, erosion analyses, flow-induced vibration (FIV) or formation isolation valve (FIV) analyses, finite element analyses, reduced basis finite element (RBFEA) analyses, leak detection analyses, line packing analyses, and/or pressure unbalance analyses. These embodiments utilize virtual actor models for scalability.

Embodiments of the apparatuses and systems of this disclosure are capable of interfacing with process operations permitting the creation of a virtual twinned process operation, a virtual twinned process operation component, a virtual twinned process operation sub-component, a virtual twinned process operation process, and/or a virtual twinned process operation sub-process. These virtual twinned constructs allow real person or AI virtual actors to request virtual modeling and simulations of performance analyses, relief load analyses, erosion analyses, flow-induced vibration (FIV) or formation isolation valve (FIV) analyses, finite element analyses, reduced basis finite element (RBFEA) analyses, and/or gasket monitoring analyses.

Embodiments of the apparatuses and systems of this disclosure are capable of interfacing with drilling operations permitting the creation of a virtual twinned process operation, a virtual twinned process operation component, a virtual twinned process operation sub-component, a virtual twinned process operation process, and/or a virtual twinned process operation sub-process. These virtual twinned constructs allow real person or AI virtual actors to request virtual modeling and simulations of non-newtonian non-Newtonian fluid ml model analyses and/or managed pressure drilling (mpd) pressure profile prediction analyses.

Simulator and Blockchain Platform Interface

Referring now to FIG. 30, a graphical illustration of an embodiment of a simulator and BcDSS assembly/subsystem interface, generally 3000, is shown to include the BcDSS assembly/subsystem 1960 of FIGS. 19A&B, which sends instructions to start a simulation or invoke a model and sends parameters needed for the simulation or model to a start simulation or model API 3010 via communication pathway 3002 associated with a simulation/model component 3020. The simulation/model component 2920 forwards result of the simulations or modeling to a store results API 3030 associated with the the BcDSS assembly/subsystem 1960 via a communication pathway 3022.

EXPERIMENTS OF THE DISCLOSURE

Example 1

Connection Client

The BcPaaS™ architecture's performance and scalability was tested via benchmark testing using the RESTful WebAPI Connection client using the third-party performance testing service BlazeMeter (subsidiary of CA Technologies, New York). BlazeMeter was used to conduct sustained performance tests of 1,000 virtual users requesting blockchain has keys of transaction requests via the BcPaaS™ Swagger WebAPI. The objective of the performance tests was to demonstrate the parity in scalability between the average response time (in milliseconds) and the average response time from various geo-locations while conducting highly process intensive tasks such as block chain mining and generating proofs.

Figure 5:
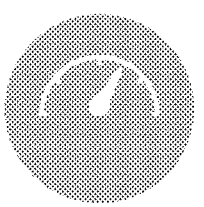
FIG. 5 is a screen shot of BlazeMeter performance summary for 1,000 virtual users hitting Mobius BP AAS™.
Figure 5:
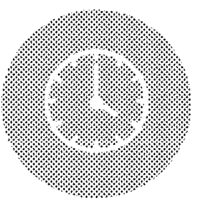
Figure 5:
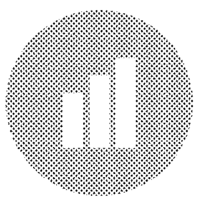
Figure 5:
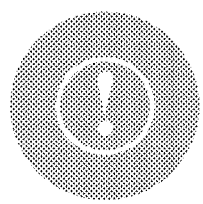
Figure 6:
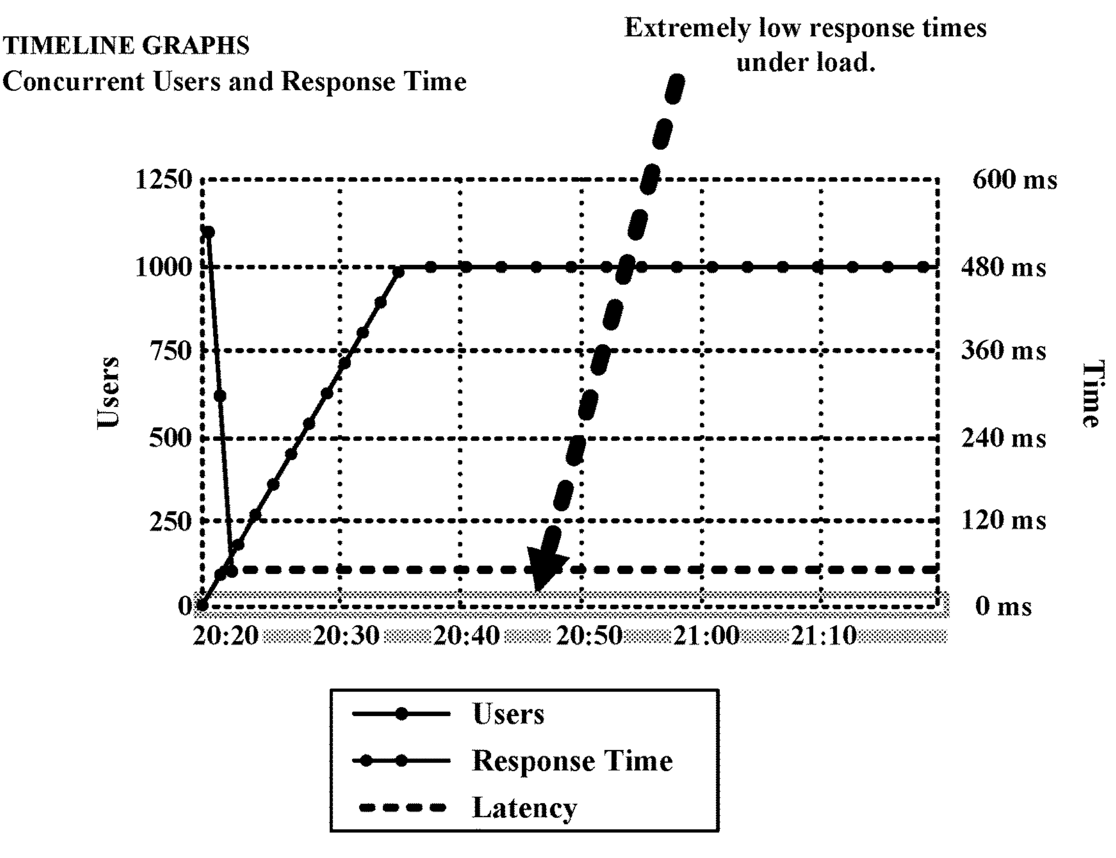
FIG. 6 shows a screenshot of response time metrics as virtual users add load at 100 hits/second. Average response time of 55 milliseconds, <1% CPU utilization.

It was observed that even with traffic spikes as users are added, the average response time of the BcPaaS™ architecture remained extremely low over the 56 geo locations. (See FIG. 5 and FIG. 6). Documented Pivotal.IO Virtual Private Cloud (VPC) load balancer latency of 2 milliseconds.

These performance tasks took into consideration inherent latency arriving from several factors that included the following: network loops originating from various cloud providers spanning 56 geo-locations; documented Pivotol.10 Virtual Private Cloud (VPC) load balancer latency of 2 milliseconds.

At 1,000 virtual users the BcPaaS™ architecture maintains low response times (seen in bottom, FIG. 6) as the number of users and hits increases to 100 hits per second while performing both blockchain mining and anchoring functions.

Figure 7:
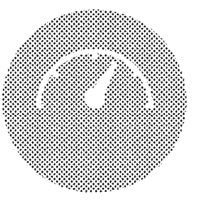
FIG. 7 shows timeline graphs for concurrent users and response time.
Figure 7:
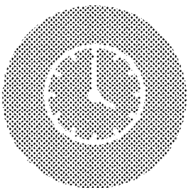
Figure 7:
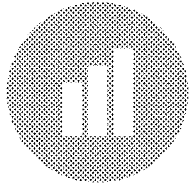
Figure 7:
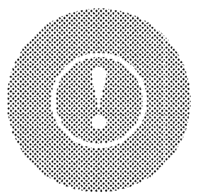
Figure 8:
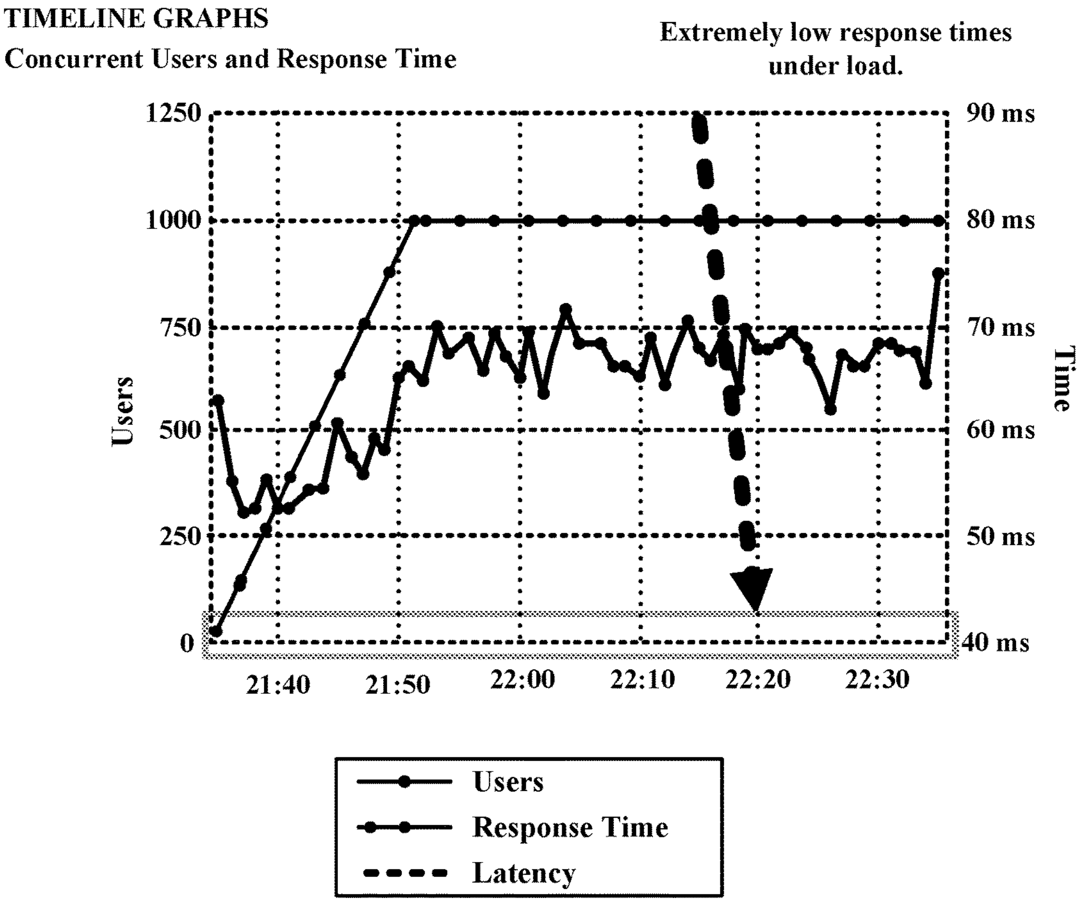
FIG. 8 shows a screen shot of response time metrics as virtual users add load at 1,000 hits/second. Average response time of 66 milliseconds. <2% CPU utilization.

At 1,000 virtual users, the BcPaaS™ architecture maintains low response times (see bottom, FIG. 7 and FIG. 8) as the number f users and hits increases to 1,000 hits per second while performing both blockchain mining and anchoring functions.

Example 2

Persisted Connection Client

The BcPaaS™ architecture's performance and scalability was tested via benchmark testing using Persisted Connection Client. These tests were conducted using an in-house application. The objective of the performance tests was to demonstrate superior response times of the Persisted Connection Client over the RESTful WebAPI Connection Client while conducting highly process intensive tasks such as blockchain mining and generating proofs.

It was observed that the BcPaaS™ architecture remains extremely fast even when supporting persisted TCP/IP connections.

The inherent latency is negligible when compared to the response time of the RESTful WebAPI Connection Client. At 1,000 virtual users the BcPaaS™ architecture maintains low response time (see FIG. 9 and FIG. 10) as the number of users and hits increase to 1,000 hits per second while performing both blockchain mining and anchoring functions. The fastest response times (appearing as 0.00 milliseconds) were filtered out to demonstrate the significant performance improvement over the RESTful WebAPI Connection Client.

Example 3

Facility Component Configuration

Referring now to FIG. 31A, a graphical illustration of a two stage two-stage compressor, distillation and scrubber facility, generally 3100, is shown to include a feed stream F1 forwarded to a top port of a distillation unit D1, wherein the feed stream F1 is separated into an overhead stream S2 and a bottom stream S3, which is forwarded to another unit not of interest here. The overhead stream S2 is forwarded to a first compressor unit CP1, wherein the overhead stream S2 is compressed using energy provided by a first input energy stream Q1 to form a compressed stream S4. The stream S4 is forwarded to a first aftercooler C1 producing a cooled compressed stream S5 and providing a first output energy stream Q2. The cooled compressed stream S5 is forwarded to a top port of a second distillation unit or scrubber unit D2, wherein the stream S5 is separated into an overhead stream S6 and a first bottom recycle stream S7. The overhead stream S6 is forwarded to a second compressor unit CP2, wherein the overhead stream S6 is compressed using energy provided by a second input energy stream Q3 to form a compressed stream S8. The stream S8 is forwarded to a second aftercooler C2 producing a cooled compressed stream S9 and providing a second output energy stream Q4. The first bottom recycle stream S7 is recycled back to an upper port of the first distillation unit D1. The overheat stream S9 is forwarded to a third distillation unit D3, wherein the stream S9 is separated into a product overhead stream P1 and a second bottom recycle S11 is recycled back to an upper port of the scrubber unit D2.

Referring now to FIG. 31B, a graphical illustration of the two stage two-stage compressor, distillation and scrubber facility 3100 shown here divided into three components 3110, 3140, and 3160. The third components are designed to simplify and speed up modeling and simulation of the entire facility 3100. The first component 3110 includes the first distillation unit D1, the first compressor CP1, and the first aftercooler C1, and its associated streams. The second component 3140 include the scrubber unit D2 and its associated streams. The third component includes the second compressor CP2, second aftercooler C2, and the D3, and its associated streams. The blockchain data services software (BcDSS) assembly/subsystem utilized information concerning stream and unit data to model the three components separately and then to utilize output from each of the separate models to construct a model for the overall facility simplifying and speeding simulation of the overall facility. The models are used to generate a virtual twin of the components and the overall facility so that virtual simulations may be run to determine if changes in the stream compositions and unit operational parameters may improve component or facility operations or to determine potential problem with component or facility operations before they occur so they may be corrected prior to the problem causing component or facility shutdowns.

Facility Component Dissection

Referring now to FIG. 31B, a graphical illustration of the two stage compressor, distillation and scrubber facility 3100 shown here divided into three components 3110, 3140, and 3160. The third components are designed to simplify and speed up modeling and simulation of the entire facility 3100. The first component 3110 includes the first distillation unit D1, the first compressor CP1, and the first aftercooler C1, and its associated streams. The second component 3140 include the scrubber unit D2 and its associated streams. The third component includes the second compressor CP2, second aftercooler C2, and the D3, and its associated streams. The blockchain data services software (BcDSS) assembly/subsystem utilized information concerning stream and unit data to model the three components separately and then to utilize output from each of the separate models to construct a model for the overall facility simplifying and speeding simulation of the overall facility. The models are used to generate a virtual twin of the components and the overall facility so that virtual simulations may be run to determine if changes in the stream compositions and unit operational parameters may improve component or facility operations or to determine potential problem with component or facility operations before they occur so they may be corrected prior to the problem causing component or facility shutdowns.

It should be recognized that the facility data virtual actors are associated with blocks of the one or more blockchains that hold the data associated with each component of a facility. Each block represents a component. The blocks are easy to update, because we create new version each block as data is received from the facility components via the data acquisition assembly/subsystem. For example, if a block contains data for a component, and that component updates, the data acquisition assembly/subsystem create a new version of that block, e.g., block version 2 and so forth. As a result, the data acquisition assembly/subsystem may be configured to push older blocks to cold storage like the off-chain storage described above. The data acquisition assembly/subsystem may be also configured to archive older blocks from time to time.

Testing Solution Architecture

Referring now to FIG. 32, a graphical illustration of a testing architecture utilizing the blockchain data services software (BcDSS) assembly/subsystem, generally 3200, is shown to include a facility data output assembly/subsystem 3202. The facility data output assembly/subsystem 3202 sends data from all data generating devices or servers associated with a given facility component of the facility along with the given facility component configuration information and data to the data acquisition assembly/subsystem 3204 of the BcDSS assembly/subsystem 1900 via unilateral external communication pathways 3206. The BcDSS assembly/subsystem 1900 is configured to assign one or more facility data virtual actors to the data sources and to store the facility component data in blocks of the one or more blockchains. The BcDSS assembly/subsystem 1900 is then configured to use the facility component data stored in the blocks of the one or more blockchains to dissect the given facility component into one or more sub-components in a dissection assembly/subsystem 3208 for efficient facility component modeling and simulation. Of course, as computer technology advances, the number of sub-components may increase or decrease all in an attempt to further enhance processing efficiency and reduce modeling/simulation run times. Here, the facility component of FIG. 31A is dissected into the dissection assembly/subsystem 3208 into the three sub-components 3110, 3140, and 3160 of FIG. 31B. Of course, depending on the complexity of the facility component, the dissection assembly/subsystem 3108 is configured to break the facility component into as many sub-components as need to optimize modeling and simulation run times. The BcDSS assembly/subsystem 1900 then generates three models 3210, 3212, and 3214 corresponding to the three sub-components 3110, 3140, and 3160, wherein the models are used to run direct simulations or to run simulations in the virtual twin of the given facility component, which is generated by the BcDSS assembly/subsystem 1900 from the information and data received from the facility data output assembly/subsystem 3102 and processed by the BcDSS assembly/subsystem 1900.

The results from all three models 3210, 3212, and 3214 are utilized by the BcDSS assembly/subsystem 1900 to run simulations. Because each of the models 3210, 3212, and 3214 requires data from the other models, the BcDSS assembly/subsystem 1900 is configured to run the models in iterative either sequentially or in parallel. The BcDSS assembly/subsystem 1900 is also configured to store the results from each iteration in blocks of the one or more blockchains in a results storage assembly/subsystem 3216. The BcDSS assembly/subsystem 1900 is also configured to provide the data from each iteration stored in the blocks of the one or more blockchains to the other models. The BcDSS assembly/subsystem 1900 is also configured to run the simulations until the results of successive iterations achieve self-consistency. Once the results are self-consistent, the BcDSS assembly/subsystem 1900 stores the final results in blocks of the one or more blockchains via the results storage assembly/subsystem 3216. The results storage assembly/subsystem 3216 is configured to provide access to the results data to user virtual actors associated with authorized facility personnel. The BcDSS assembly/subsystem 1900 is also configured to run simulations in the virtual twinned facility component using the models 3210, 3212, and 3214. The simulation in the virtual twinned facility component may be used to: (a) determine if the facility may be optimized further. (b) determine and prevent potential problems prior to their occurrence, (c) add new components, (d) remove components, (e) replace components with new versions, and/or (f) test new facility component configurations. The facility data output component 3102 and the data acquisition subsystem 3104 may be designed to acquire data from the facility component data or any other facility data on a continuous real time basis, a continuous near real time basis, a periodic basis, a semi-periodic basis, an intermediate basis, any other data collection basis depending on the type of data to be collected, or any combination thereof.

The blockchain data services software (BcDSS) assembly/subsystem 3200 is designed to: (a) separate and independent process models with RUN execution setting using Steady-state model for POC, but distillation column model will be needed for future demo; (b) perform direct dynamic simulations for future projects, facilities, processes, and/or operations; and (c) to perform pipeline simulations for field testing later including the mixed simulation solvers.

Data Exchange and Run Time Format

Referring now to FIG. 33, a graphical illustration of an embodiment of a data exchange and run time assembly/subsystem, generally 3300, for running simulations using the three facility sub-component models 3210, 3212, and 3214 of FIG. 32 is shown to include a first model run time flow chart 3310, a second model run time flow chart 3340, and a third model run time flow chart 3370.

The first model run time flow chart 3310 includes a first run time setting module 3312, which issues a first run simulation command via a first communication pathway 3314 to a first run simulation module 3316. The first run simulation module 3316 generates first simulation data and sends the first simulation data via a communication pathway 3318 to a first simulation data storage module 3320. The first simulation data storage module 3320 stores the first simulation data and send the first simulation data via a communication pathway 3322 to a first results export module 3324. The first results export model 3324 updates the first simulation data and sends the updated first simulation data via a communication pathway 3326 to a first database server module 3328. The first database server module 3328 sends the updated first simulation data via a communication pathway 3330 to a first results trend data output module 3332. The first results trend data output module 3332 sends the updated first simulation data from the first model run time flow chart 3310 to a second database server model 3358 of the second model run time flow chart 3340 and receives data from the database server model 3358 concerning the first recycle stream via a communication pathway 3334, and sends the updated first simulation data via a communication pathway 3336 back to the first run time setting module 3312 as initial values for the next iteration of the first model run time flow chart 3310.

The second model run time flow chart 3340 includes a second run time setting module 3342, which issues a second run simulation command via a communication pathway 3344 to a second run simulation module 3346. The second run simulation module 3346 generates second simulation data and sends the second simulation data via a communication pathway 3348 to a second simulation data storage module 3350. The second simulation data storage module 3350 stores the second simulation data and send the second simulation data via a communication pathway 3352 to a second results export module 3354. The second results export model 3354 updates the second simulation data and sends the updated second simulation data via a communication pathway 3356 to the second database server module 3358. The second database server module 3358 sends the updated second simulation data via a communication pathway 3360 to a second results trend data output module 3362, sends updated second simulation data from the second model run time flow chart 3340 to a third database server model 3388 of the second model run time flow chart 3340 via the pathway 3334 and receives data from the third database server model 3388 concerning the second recycle stream via a communication pathway 3364, and sends the updated second simulation data via a communication pathway 3366 back to the second run time setting module 3342 as initial values for the next iteration of the second model run time flow chart 3340.

The third model run time flow chart 3370 includes a third run time setting module 3372, which issues a third run simulation command via a communication pathway 3374 to a third run simulation module 3376. The third run simulation module 3356 generates third simulation data and sends the third simulation data via a communication pathway 3378 to a third simulation data storage module 3380. The third simulation data storage module 3380 stores the second simulation data and send the third simulation data via a communication pathway 3382 to a third results export module 3384. The third results export model 3384 updates the third simulation data and sends the updated third simulation data via a communication pathway 3386 to the third database server module 3388. The third database server module 3388 sends the updated third simulation data via a communication pathway 3390 to a third results trend data output module 3392 and sends updated third simulation data from the third model run time flow chart 3370 to the second database server model 3358 of the second model run time flow chart 3340 via the pathway 3364, and sends the updated third simulation data via a communication pathway 3394 back to the third run time setting module 3372 as initial values for the next iteration of the third model run time flow chart 3370.

Again, the first model run time flow chart 3310, the second model run time flow chart 3340, and the third model run time flow chart 3370 are performed until the results become self-consistent.

Process Data Flow Chart

Referring now to FIG. 34, a graphical illustration of an embodiment of a process data flow chart, generally 3400, of the BcDSS assembly/subsystem 1900, is shown to include a facility data output assembly/subsystem 3402, which forwards information/data from all data generating sources associated with the facility component to a BcDSS data acquisition assembly/subsystem 3404 of the BcDSS assembly/subsystem 1900 via a facility data communication pathways 3406, wherein the BcDSS data acquisition assembly/subsystem 3404 is configured to assign the information/data to one or more facility data virtual actors and to store the facility information/data in blocks of the one or more blockchains.

The BcDSS data acquisition assembly/subsystem 3404 is configured to provide the information/data concerning the first sub-component 3110 including the configuration and operating data concerning the units D1, CP1, and C1 and initial stream data concerning the streams F1, S2, S3, S4, S5, Q1, and Q2 to the first model 3210 via an internal communication pathway 3408, which actually comprises accessing data stored in the blocks of the one or more blockchains.

The BcDSS data acquisition assembly/subsystem 3404 is also configured to provide the information/data concerning the second sub-component 3140 including the configuration and operating data concerning the unit D2 and initial stream data concerning streams S5, S6, S7, and S11 to the second model 3212 via the internal communication pathway 3408, which actually comprises comprise accessing data stored in the blocks of the one or more blockchains.

The BcDSS data acquisition assembly/subsystem 3404 is also configured to provide the information/data concerning the second sub-component 3160 including the configuration and operating data concerning the units CP2, C2, and D3 and initial stream data concerning streams S6, S8, S9, S11, and P1 to the third model 3214 via the internal communication pathway 3408, which actually comprises accessing data stored in the blocks of the one or more blockchains.

The first model 3210 is configured to utilize the configuration and operating data and the initial stream data to run an initial simulation of the first sub-component 3110 and to output first model results data to a first model results module 3410 via an internal communication pathway 3412 and to store the first model results data in blocks of the one or more blockchains and to provide access to the first model results data to other models and/or to qualified users virtual actors.

The second model 3212 is configured to utilize the configuration and operating data and the initial stream data to run an initial simulation of the second sub-component 3140 and to output second model results data to a second model results module 3414 via an internal communication pathway 3416 and to store the first model results data in blocks of the one or more blockchains and to provide access to the first model results data to other models and/or to qualified users virtual actors.

The third model 3214 is configured to utilize the configuration and operating data and the initial stream data to run an initial simulation of the second sub-component 3160 and to output third model results data to a third model results module 3418 via an internal communication pathway 3420 and to store the first model results data in blocks of the one or more blockchains and to provide access to the first model results data to other models and/or to qualified users virtual actors.

After the initial simulations from each of the models 3210, 3212, and 3214 have been run and the results data stored in blocks of the one or more blockchains: (a) the first model 3210 is configured to access data from the second model results module 3414 concerning the stream S7 via an internal communication pathway 3422, wherein the accessing comprises reading data from blocks of the one or more blockchains; (b) the second model 3212 is configured to access: (i) data from the first model results module 3410 concerning the stream S5 via an internal communication pathway 3424, wherein the accessing comprises reading data from blocks of the one or more blockchains and (ii) data from the third model results module 3418 concerning the streams S11 an internal communication pathway 3426, wherein the accessing comprises reading data from blocks of the one or more blockchains; and (c) the third model 3214 is configured to access data from the second model results module 3414 concerning the stream S6 via an internal communication pathway 3428, wherein the accessing comprises reading data from blocks of the one or more blockchains.

Once the initial simulation data is acquired by each model from the respective results modules, the BcDSS assembly/subsystem 1900 is configured to run iterative simulations on each of the models 3210, 3212, and 3214 sequentially or in parallel until the results from each iterations become self-consistent.

The BcDSS assembly/subsystem 1900 is also configured to run simulations on the virtual twinned facility components for testing modifications, additions, and/or deletions of facility units or for running optimization simulations. Of course, the simulations may not just be operational but may also be financial to optimize revenues and to test different configurations and to optimized operational and financial aspects of the facility component or the entire facility.

The BcDSS data acquisition assembly/subsystem 3304 is configured to produce a pseudo facility database designed to store facility feed and unit operation data including temperature (T) data, temperature change (ΔT) data, pressure (P) data, pressure change (ΔP) data, stream composition data, C1 unit flow rate data, C1 unit flow rate change data, fix unit operation data, and sets the first, second, and third model run times. The BcDSS data acquisition assembly/subsystem 3304 also receives T and P input values for the first recycle stream S7 derived from the scrubber D2 from the second model results module 3414 which is supplied to the first model 3410.

The first model 3210 receives feed compositional data from the BcDSS data acquisition assembly/subsystem 3304, receives an initial temperature of 120° F. for the first aftercooler, receives T and P input values for the first recycle stream S7 from the data acquisition assembly/subsystem 3304, and runs the first model 3210 based on time setting.

The first model results module 3410 receives first simulation data from the first model 3210, sends the first simulation data to the second model 3212, and receives T and P input values for the second recycle stream S11 derived from the third distillation unit D3 for use in the second model 3212.

The second model 3212 receives the first simulation data from the first model results module 3410, and sends second simulation data including scrubber liquid recycle stream data to the second model 3212 which runs simulations based on time setting.

The second model results module 3414 receives second simulation data from the second model 3212, sends second simulation data to the third model 3214, and sends second simulation data including T and P input values for the first recycle stream S7 for use in the first model 3210.

The third model 3214 receives an initial temperature of 120° F. for the second aftercooler, sends second simulation data to the third model 3214 which runs simulations based on time setting.

The third model results module 3418 receives third simulation data from the third model 3214 and sends the third simulation data including T and P input values for the second recycle stream S11 for use in the second model 3212.

The BcDSS data acquisition assembly/subsystem 3404 is configured to receive information from the facility data communication assembly/subsystem 3202 and to store facility component data in blocks of one or more blockchains associated with the facility component. In the component of FIGS. 31A and 31B, the data acquisition assembly/subsystem 3404 receives data from the facility data communication assembly/subsystem 3402 associate with facility subcomponents 3110, 3140, and 3160, which are stored in different blocks of the one or more blockchains as set forth in Table 4:

TABLE 4

Creation of Blocks for Data Associated with Component Stages 3110, 3140 and 3160

| Name | Version | Mime Tpye | Size (kB) | Created | Created By | Updated | Updated By | Proof Hash |
|---|---|---|---|---|---|---|---|---|
| 3110 | 95 | | 234 | Jan. 5, 2023 5:52am | User | Jan. 5, 2023 5:52am | User | ff184de1ef6a8fd32ea68a4d7dc82fefed507e31202513f086e501839762C088 |
| 3140 | 90 | | 12.5 | Jan. 5, 2023 5:52am | User | Jan. 5, 2023 5:52am | User | 9e31abd481447ecd2b54836256053175c:07c7916c05f003099292e32aaoe1cb1 |
| 3460 | 89 | | 20.3 | Jan. 5, 2023 5:52am | User | Jan. 5, 2023 5:52am | User | 98e8eb2c65491eba8224e2258b5c:2af425c:6298207d0db7969!3f48f2Becb103 |

The data acquisition assembly/subsystem 3404 is also configured to receive information from the facility data communication assembly/subsystem 3402 and to store updated facility component data for the sub-component 3110 on a given time table as set forth in Table 5:

TABLE 5

Creation of Blocks for Updated Data Associated with Component Stage 3110

| Name | Version | Mime Tpye | Size (kB) | Created | Created By | Updated | Updated By | Proof Hash |
|---|---|---|---|---|---|---|---|---|
| Mode 1A | 1 | | 21 | Jan. 5, 2023 4:57am | User | Jan. 5, 2023 4:57am | User | 4023d2b7e1d654931185cbbffc0ccf970aa8bdba95c6f3b69277d11ee0d9c4a3 |
| Mode 1A | 12 | | 21 | Jan. 5, 2023 4:57am | User | Jan. 5, 2023 4:57am | User | a717c930b49720ba0137f79e2c4aeeb6b4e1b84bc57c3b55d94aacc8ff4de05b |
| Mode 1A | 3 | | 21 | Jan. 5, 2023 4:57am | User | Jan. 5, 2023 4:57am | User | 1d65969680d8ce3e44b573d9364b16d921a9203ac98295328be214093069b02e |

TABLE 5-continued

| Creation of Blocks for Updated Data Associated with Component Stage 3110 | | | | | | | | |
|---|---|---|---|---|---|---|---|---|
| Name | Version | Mime Tpye | Size (kB) | Created | Created By | Updated | Updated By | Proof Hash |
| Mode 1A | 14 | | 21 | Jan. 5, 2023 4:57am | User | Jan. 5, 2023 4:57am | User | 9df92a2a0812395b34897d b779b6524db053aefdfeb5a edfe26e86fd4dbac393 |
| Mode 1A | 5 | | 21 | Jan. 5, 2023 4:58am | User | Jan. 5, 2023 4.58am | User | 120f612Qec3ab50d7afd74 d3Bbb7a8a74bc9a557bd4c e64c9a3ab023b8396c9d |
| Mode 1A | 6 | | 21.2 | Jan. 5, 2023 5:00am | User | Jan. 5, 2023 5:00am | User | 2947f64496d8d199d6b17fc 39d51611b3d9935a0d5328 43124a6e1edfOe20a0e |
| Mode 1A | 7 | | 21.8 | Jan. 5, 2023 5:0lam | Roger | Jan. 5, 2023 5:01am | User | fcf5d859dfcc7381ddd93c4 177bb47d233043b368fc36 171d6091a6cdd0ff2ef |
| Mode 1A | 8 | | 21.8 | Jan. 5, 2023 5:01am | User | Jan. 5, 2023 5:01am | User | 0779d9dBb4914d0b06456 705814bb79b17c9dff6a6ad 2467a68e4etc369c683f |
| Mode 1A | 9 | | 21.8 | Jan. 5, 2023 5:01am | User | Jan. 5, 2023 5:01am | User | 2c4fea21749fa53ba0605b0 156fb319603bfba1d742dc2 d6830193b97f64e6f8 |
| Mode 1A | 10 | | 21.8 | Jan. 5, 2023 5:01am | User | Jan. 5, 2023 5:01am | User | 4b2f6f6d6dd30866ac4bd9e a0c7731d548bfa167dl0931 9279586000378c6e03 |
| Mode 1A | 11 | | 21.8 | Jan. 5, 2023 5:01am | User | Jan. 5, 2023 5:01am | User | 4f16bf65c:3b87307693064 594d3edc2d108827535108 db9bfdff6536a5d8e7b3 |
| Mode 1A | 12 | | 21.8 | Jan. 5, 2023 5:01am | User | Jan. 5, 2023 501am | User | dfcf275b5997ad651d8e87a c4b85f036c6d267a56b589 382ebeca23ca84e0058 |

The data tabulated in Tables 4 and 5 are used by the modeling and simulation assembly/subsystem 2820 for modeling and simulations direct from the received data or for modeling and simulations in the virtual twinned environment using the received data stored in the blocks of the one or more blockchains.

Once the data from the facility data communication assembly/subsystem 3402 has been acquired by the modeling and simulation assembly/subsystem 2820, the simulator and Xenese™ interface 3000 of the data communication assembly/subsystem is configured to receive data associated with the two stage compressor of FIG. 31A concerning feed stream data, recycle stream data, and controller, energy, and equipment related information.

In particular, the testing architecture 3200 operates as described below. At time t=0, facility data is forwarded from the facility data communication assembly/subsystem 3402 to the BcDSS data acquisition assembly/subsystem 3404, which associates the data with one or more facility data virtual actors and stores the facility component data in blocks of the one or more blockchains. The data in the blockchains are used by the three models 3210, 3212, and 3214. The facility data includes initial data concerning the properties of the first recycle stream S7. The testing architecture 3100 then issues an execution command to run the first model 3210 to simulate the operation of the first component 3110 in a virtual twinned format and to confirm that the simulation converges and completes producing data concerning properties of the stream S5 and simulated operations parameters of the first distillation unit D1, the first compressor CP1, and the first after cooler C1.

The simulated properties of the stream S5 from the first model 3108 are forwarded to the second model 3212 as initial values and the initial values of the second recycle stream S11 are received from the facility data at t=0. The testing architecture 3200 then issues an execution command to run the second model 3212 to simulate the operation of the second component 3140 in a virtual twinned format and to confirm that the simulation converges and completes producing data concerning properties of streams S5, S7, and S6 and operational parameters of the scrubber unit D2 and updating the properties of the streams S7, which are sent back to the first model 3210 as initial values for continued simulations of the first sub-component 3110.

The simulated properties of the stream S6 from the second model 3212 are forwarded to the third model 3214 as initial values for the stream S6. The testing architecture 3200 then issues an execution command to run the second model 3212 to simulate the operation of the third component 3160 in a virtual twinned format and to confirm that the simulation converges and completes producing data concerning properties of streams S6, the second recycle stream S11, and the product stream P1 and operational parameters of the second compressor unit CP2, the second after cooler unit C2, and the third distillation unit D3 and updating the properties of the stream S11, which are sent back to the second model 3110 as initial values for continued simulations of the second sub-component 3140. The simulations are continued unit the models are self-consistent.

In particular, the testing architecture 3200 is configured to separate and independent process the models 3210, 3212, and 3214 of the given facility component, or for any number of models associated with another facility component, with RUN execution setting using steady-state model for POC, but distillation column model will be needed for future demonstrations, for running dynamic simulations for future project directly, for running pipeline simulation for later testing including the mixed simulation solvers.

Run Details for the First Sub-Component Model

In detail, the data exchanging and RUN commander calling layout of the BcDSS assembly/subsystem 1900 using the virtual actor blockchain platform configured to run a sequence of step to simulate the first sub-component 3110 comprises the step of: (a) at time=0, forwarding facility data from the facility data communication assembly/subsystem 3402 to the BcDSS data acquisition assembly/subsystem 3404, which assigns facility data virtual actors to the facility data and stores the facility data in blocks of the one or more blockchains; (b) acquiring initial data concerning to the units D1, CP1, and C1 and the streams F1, S2, S3, S4, S5, S7, Q1, and Q2 to the first model 3210 stored in blocks of the one or more blockchains; (c) executing the first model 3210 to simulate operation of the first sub-component 3110; (d) confirming simulation convergence and completion based on the simulation of the first model 3210 satisfying one or more convergence and completion criteria; and (e) outputting first model simulation results data and storing the first model simulation results data in blocks of the one or more blockchains concerning the units D1, CP1, and C1 and the streams S2, S3, S4, S5, S7, Q1, and Q2 for use by the other models and for review by authorized user virtual actors.

After the first simulation at time t=0, all subsequent simulation runs of the first model 3210 comprise the step of: (a) acquiring: (i) data concerning to the units D1, CP1, and C1 and the streams F1, S2, S3, S4, S5, Q1, and Q2 from the first model results data of the previous run of the first model 3210 stored in blocks of the one or more blockchains and (ii) data concerning the stream S7 from the second model results data of previous run of the second model 3212 stored in blocks of the one or more blockchains; (b) executing the first model 3210 to simulate operation of the first sub-component 3110; (c) confirming simulation convergence and completion based on the simulation of the first model 3210 satisfying one or more convergence and completion criteria; and (d) outputting first model simulation results data and storing the first model simulation results data in blocks of the one or more blockchains concerning the units D1, CP1, and C1 and the streams F1, S2, S3, S4, S5, S7, Q1, and Q2 for use by the other models and for review by authorized user virtual actors.

Run Details for the Second Sub-Component Model

In detail, the data exchanging and RUN commander calling layout of the BcDSS assembly/subsystem 1900 using the virtual actor blockchain platform configured to run a sequence of step to simulate the second sub-component 3140 comprises the step of: (a) at time=0, forwarding facility data from the BcDSS data communication assembly/subsystem 3402 to the BcDSS data acquisition assembly/subsystem 3404, which assigns facility data virtual actors to the facility data and stores the facility data in blocks of the one or more blockchains; (b) acquiring initial data concerning to the unit D2 and the streams S5, S6, S7, and S11 to the second model 3212 stored in blocks of the one or more blockchains; (c) executing the second model 3212 to simulate operation of the second sub-component 3140; (d) confirming simulation convergence and completion based on the simulation of the second model 3212 satisfying one or more convergence and completion criteria; and (e) outputting second model simulation results data and storing the second model simulation results data in blocks of the one or more blockchains concerning the unit D2 and the streams S5, S6, S7, and S11 for use by the other models and for review by authorized user virtual actors.

After the first simulation at time t=0, all subsequent simulation runs of the second model 3212 comprise the step of: (a) acquiring: (i) data concerning to the unit D2 and the streams S6 and S7 from the second model results data of the previous run of the second model 3212 stored in blocks of the one or more blockchains, (ii) data concerning the stream S5 from the first model results data of the previous run of the first model 3210 stored in blocks of the one or more blockchains, and (ii) data concerning the stream S11 from the third model results data of the previous run of the third model 3214 stored in blocks of the one or more blockchains; (b) executing the second model 3212 to simulate operation of the second sub-component 3140; (c) confirming simulation convergence and completion based on the simulation of the second model 3212 satisfying one or more convergence and completion criteria; and (d) outputting second model simulation results data and storing the second model simulation results data in blocks of the one or more blockchains concerning the unit D2 and the streams S5, S6, S7, and S11 for use by the other models and for review by authorized user virtual actors.

Run Details for the Third Sub-Component Model

In detail, the data exchanging and RUN commander calling layout of the BcDSS assembly/subsystem 1900 using the virtual actor blockchain platform configured to run a sequence of step to simulate the third sub-component 3160 comprises the step of: (a) at time=0, forwarding facility data from the facility data communication assembly/subsystem 3402 to the BcDSS data acquisition assembly/subsystem 3404, which assigns facility data virtual actors to the facility data and stores the facility data in blocks of the one or more blockchains; (b) acquiring initial data concerning to the units CP2, C2, and D3 and the streams S6, S8, S9, S11, Q3, Q4, and P1 to the second model 3212 stored in blocks of the one or more blockchains; (c) executing the second model 3212 to simulate operation of the second sub-component 3140; (d) confirming simulation convergence and completion based on the simulation satisfying one or more convergence and completion criteria; and (e) outputting third model simulation results data and storing the third model simulation results data in blocks of the one or more blockchains concerning the units CP2, C2, and D3 and the streams S6, S8, S9, S11, Q3, Q4, and P1 for use by the other models and for review by authorized user virtual actors.

After the first simulation at time t=0, all subsequent simulation runs of the second model 3214 comprise the step of: (a) acquiring: (i) data concerning to the units CP2, C2, and D3 and the streams S8, S9, Q3, Q4, and P1 from the third model results data of the previous run of the third model 3214 stored in blocks of the one or more blockchains and (ii) data concerning the stream S6 from the second model 3212 stored in blocks of the one or more blockchains; (b) executing the third model 3214 to simulate the operation of the third sub-component 3160; (c) confirming simulation convergence and completion based on the simulation of the third model 3214 satisfying one or more convergence and completion criteria; and (d) outputting third model simulation results data and storing the third model simulation results data in blocks of the one or more blockchains concerning the units CP2, C2, and D3 and the streams S6, S8, S9, S11, Q3, Q4, and P1 for use by the other models and for review by authorized user virtual actors.

Simulation Runs Using Specific Input Data Form a Pseudo Facility

A test of simulating the facility component described above for Example 3 data from a pseudo facility data communication assembly/subsystem as input for the BcDSS data acquisition assembly/subsystem 3404 comprising the virtual actor blockchain platform. The pseudo facility data communication assembly/subsystem is configured to provide data to the virtual actor blockchain platform with initial feed stream F1 temperature value in ° F. with a setup temperature change of ±5° F. monitored every 5 seconds and an initial feed stream F1 pressure value in psia with a setup pressure change of 5 psia monitored second.

Table 6 tabulations properties of the feed stream F1 as supplied to the virtual actor blockchain platform via the pseudo facility data communication assembly/subsystem for use in running model simulations set forth above:

TABLE 6

| Feed Stream F1 Properties for Use in the First Model | | | |
|---|---|---|---|
| Stream Name | Fee Stream F1 | Vapor Fraction | Liquid Fraction |
| Molar Vapor/Phase Fraction | 0.84952 | 0.84952 | 0.15048 |
| Mass Vapor/Phase Fraction | 0.65956 | 0.65956 | 0.34044 |
| Temperature [° F.] | 100 | 100 | 100 |
| Pressure [psia] | 70 | 70 | 70 |
| Molar Flow [lb-mol/h] | 96630 | 82090 | 14540 |
| Mass Flow [lb/h] | $4.0789e^{+6}$ | $2.6903e^{+6}$ | $1.3886e^{+6}$ |
| Std. Liq. Vol. Flow [$ft^3$/h] | $1.3095e^{+5}$ | 97942 | 33007 |
| Std. Vap. Vol. Flow [$ft^3$/h] | $3.4694e^{+7}$ | $2.9473e^{+7}$ | $5.2206e^{+6}$ |
| Molar Enthalpy [BTU/lb-mol] | 5262.6 | 5547.9 | 3651.9 |
| Molar Entropy [BTU/lb-mol-° F.] | 85.30 | 70.86 | 166.8 |
| Heat Flow [hp] | $1.9986e^{+5}$ | $1.7899e^{+5}$ | 20869 |

Table 7 tabulates a list of parameters for the operation of the unit D1 for the simulator to run simulations for the first model 3210 and the second model 3212 utilizing the feed stream properties tabulated in Table 6:

TABLE 7

| D1 Parameters for Use by the Second Model | |
|---|---|
| First Specification | |
| ΔP (psi) | 0 |
| Product Pressure [psia] | 70 |
| Second Specification | |
| Duty [hp] | 8464.5 |
| Product Stream P1 Temperature [° F.] | 100 |

Table 8 tabulates a list of composition components of the feed stream F1 as supplied to the virtual actor blockchain platform via the pseudo facility data communication assembly/subsystem for use in running the model simulations set forth above, wherein the value of C1 HC (methane) in the feed stream F1 has a setup value of ±1000 lb-mol/h monitored for changes every second and normalized prior to being provided to the virtual actor blockchain platform:

TABLE 8

| Feed Stream F1 Component Composition for Use in the First Model | | | |
|---|---|---|---|
| | Molar Flow [lbmol/h] | Vapor [lbmol/h] | Liquid [lbmol/h] |
| Feed Stream F1 | 3830.59496 | | |
| F1 Component | | | |
| $N_2$ | 400.00 | 399.50 | 0.52 |
| $CO_2$ | 4230.00 | 4188.00 | 42.47 |
| C1 HC | 32000.00 | 31869.00 | 131.20 |
| C2 HC | 20000.00 | 19552.00 | 448.20 |
| C3 HC | 16000.00 | 14921.00 | 1079.00 |
| iC4 HC | 1700.00 | 1452.00 | 248.50 |
| nC4 HC | 6200.00 | 5022.00 | 1178.00 |
| iC5 HC | 2100.00 | 1351.00 | 748.70 |
| nC5 HC | 3600.00 | 2111.00 | 1489.00 |
| nC6 HC | 3400.00 | 1083.00 | 2317.00 |
| C7 + HC | 7000.00 | 142.30 | 6858.00 |

HC stands for hydrocarbon and the number after the C is the carbon count.

Table 9 tabulates a list of parameters for the operation of the unit C1 as supplied to the virtual actor blockchain platform via the pseudo facility data communication assembly/subsystem for use for the simulator to run simulations for the first model 3210 and the second model 3212:

TABLE 9

| C1 Parameters for Use by the First Model | | |
|---|---|---|
| Operational Parameters | Value | |
| ΔP [psi] | 5 | |
| Outlet Temperature [° F.] | 120 | |
| ΔT [° F.] | 76.76 | |
| Duty [hp] | 42767 | |
| HTRI Parameters | | |
| intervals | step type | pressure profile |
| 10 | equal temp | constant DPDH |

HTRI parameters relates to shell-and-tube heat exchanger parameters parameter

Table 10 tabulates a list of composition components of the recycle stream S7 as supplied to the virtual actor blockchain platform via the pseudo facility data communication assembly/subsystem for use in running the model simulations set forth above:

TABLE 10

| Feed Stream F1 Properties for Use in the First Model | | |
|---|---|---|
| Stream name | S7 | liquid |
| Molar Vapor/Phase Fraction | 0 | 1.00 |
| Mass Vapor/Phase Fraction | 0 | 1.00 |
| Temperature [° F.] | 106.7 | 106.7 |
| Pressure [psi] | 165 | 165 |
| Molar Flow [lbmol/h] | 5286.1 | 5286.1 |
| Mass Flow [lb/h] | $3.4194e^{+5}$ | $3.4194e^{+5}$ |
| Std. Liq. Vol. Flow [$ft^3$/h] | 9146.8 | 9146.8 |
| Std. Vap. Vol. Flow [$ft^3$/h] | $1.8979e^{+6}$ | $1.8979e^{+6}$ |
| Molar Enthalpy [BTU/lbmol] | 2781.0 | 2781.0 |
| Heat Flow [hp] | 5777.6 | 5777.6 |

The data and parameters of Tables 6-10 are used by the virtual actor blockchain platform to run simulations of the first model 3210 and 3212. The results of the simulations are shown below:

Blockchain Digital Twinning Platform Oil and Gas Use Cases

Embodiments of the apparatuses and systems and interfaces and methods implementing them are configured to create a digital twin data fabric or environment on blockchain platform such as the Xenese™ blockchain platform for modeling and analyzing oil and gas use cases on a real-time, near real-time, and/or periodic basis. The environments or fabrics comprise a virtual intelligence solution platform for modeling and analyzing oil and gas use cases on a real-time, near real-time, and/or periodic basis.

Use Case 1

The present use case describes the optimization of production rate of FPSO through an intelligent virtual asset platform. Through the integration of digital topsides packages within our data management fabric, blockchain platforms such as the Xenese™ blockchain platform can continuously deliver a range of analytical insights to operators online or offline. The FPSO structural digital twinned environment monitors topside infrastructure based on a combination of analytical and simulation models including Reduced Basis Finite Element Analysis (RB-FEA) with inspection data, virtual sensor measurements, real-time, near real-time, and/or periodic analysis models, and other production and process operations data empowering operators to unlock hidden value in current FPSO data and to optimize production in real-time, near real-time, and/or periodically as the operator desires. The blockchain platforms such as the Xenese™ blockchain platform FPSO solution enables remote operation with integrated intelligent automation and safety analysis tools that help to lower operating costs by more than twelve percent (12%) annually, reduce capital expenditures by more than twenty percent (20%) annually, and lowers overall operating costs by more than fifteen percent (15%) annually.

Table 11 lists the results of an optimization of production rate of FPSO through an intelligent virtual asset platform.

TABLE 11

| Distributed Digital Twin Data Fabric on Blockchain \| FPSO Automation ROI Study | | | |
|---|---|---|---|
| Increase Oil Production | Reduction of Operations Costs | Increase Operator Efficiencies | Increase Asset Performance |
| 2%~5%<br>The Xenese ™ integrated online modeling capabilities can increase the production up 2%~5% in daily rate. | 20%+<br>Ability to reduce offshore and onshore resources through automation, which decreases OPEX | 30%+<br>We bring together data assets from anywhere and anytime, providing operators with greater insights and real-time, near real-time, and/or periodic tools to make faster, safer decisions | 10%+<br>The Xenese ™ data fabric on blockchain continuously monitors equipment assets and provides operators with real-time, near real-time, and/or periodic insights |
| Assumption Model:<br>Oil price as $100 bpd @ 5% increase = 12,500 barrel of extra production increase = $1,250,000 per day or 456,250,000 annually | Life extension of equipment and facilities, to extend the service time and repairing cycle, etc., bringing immense value during day-to-day operations | Our platform brings invisible data to life and removes system silos block productivity and operations efficiency | Our predictive system helps to detect equipment bottlenecks, erosion, corrosion and other materials that can cause failures |

Use Case 2

The present use case describes the optimization of subsea pipeline assets through a smart integrated digital twin data fabric on blockchain or through an intelligent virtual asset platform. Through the integrated subsea pipeline distributed digital twin and data management capabilities turns data assets into actionable insights for operators from throughout the end-to-end production value chain integration of digital topsides packages within our data management fabric or environment created by blockchain platforms such as the Xenese™ blockchain platform. The blockchain platform provides continuous insights served through the digital twin data fabric, operators can make more informed decisions in real time about the production and integrity of their systems. The digital twin distributed data fabric or environment works as an integrated ecosystem generating 3D digital assets embedded with pipeline design calculations and analysis models in a unified platform that ingests data from many siloed systems across the oil and gas enterprise to deliver interoperable pipeline twin automation that drastically improves safety and reduces operations costs.

Use Case 3

The present use case describes the increase production and safety through an intelligent integrated operating window to proactively monitor erosion and FIV. The fabric or environment created by the blockchain platform such as the Xenese™ blockchain platform, integrated operation window displays solutions within the data management platform includes that insights into key performance indicators to help prioritize maintenance, make informed asset integrity decisions and improve worker safety. The fabric or environment provides real-time, near real-time, and/or periodic erosion monitoring to improve fpso FPSO asset health and intelligent remote monitoring of FIV (fluid induced vibrations). The fabric or environment allows for the discovers and collects data, models, analysis, and simulations from multiple offline and online sources and services to operators across distributed environments to empower them with deep actionable insights of an FPSO asset related to corrosion and erosion. The fabric or environment provides risk detection and analysis in real-time, near real-time, and/or periodic, continuously and/or periodically serving on-demand recommendations through AutoML (pattern detection analysis) to help the operators make decisions rapid decisions that drive improved asset performance, safety, and profitability of these assets. The fabric or environment can also provide risk detection and analysis in a periodic basis, periodically serving on-demand recommendations through AutoML (pattern detection analysis) to help the operators make decisions rapid decisions that drive improved asset performance, safety, and profitability of these assets.

Use Case 4

The present use case describes the optimization of production rates of FPSO through an intelligent virtual asset platform. The intelligent virtual asset platform includes embedded predictive analytics layer within the smart data fabric or environment. The intelligent virtual asset platform includes the range of models, simulations, and analysis brought together within a digital twin fabric that gathers and processes data from any online and offline system empowers operators with real-time, near real-time, and/or periodic information to proactively respond to FPSO situations on-demand. The intelligent virtual asset platform has the capabilities that bring together "data assets from everywhere", operators can save costs, maintenance the right problems at the right time, and avoid lost production. The intelligent virtual asset platform includes real-time, near real-time, and/or periodic safety monitoring and surveillance. The intelligent virtual asset platform includes continuous analytics and modeling, via the blockchain platform such as the Xenese™ blockchain platform that proactively reveals risks and threats before incidents occur. This capability reduces the number of unplanned shutdowns and proactively notifies operators of potential equipment failures that will cause an HSE incident. The intelligent virtual asset platform includes dynamic twin simulations via the blockchain platform such as the Xenese™ blockchain platform which provides operators with deep-water visibility to unlock new resources safely and efficiently.

Use Case 5

The present use case describes the deliver real-time, near real-time, and/or periodic RBFEA simulation models through a digital twin data fabric, via the blockchain platform such as the Xenese™ blockchain platform, to accelerate rapid decision-making. Operators can use the Xenese™ digital twin data fabric to model simulation data, diagnostic data, structure and design data, and any additional online and offline data assets that become integrated to provide them with failure risk insights in real time, along with on demand mitigation strategies and recommendations. The intelligent virtual asset platform includes digital twin data fabric to proactively detect and monitor deformations observed in oil and gas subsea assets and provides greater understanding of the complex factors and conditions causing the occurrences. The continuous analytics layer generates real-time, near real-time, and/or periodic insights that provide decision support for operational decision-making such as risk-based inspection analysis, asset fatigue & stress, critical asset service analysis, and other analysis simulations and models that enable operators to make the right decisions at the right time.

Use Case 6

The present use case enables distributed continuous monitoring and real-time, near real-time, and/or periodic simulation with mooring chain digital twin on blockchain, via the blockchain platform such as the Xenese™ blockchain platform. Mooring systems play a critical role in keeping offshore facilities in a reliably stable position in harsh deep-water conditions at offshore oil and gas fields. The blockchain platform such as the Xenese™ blockchain platform, supports digital twin data fabric that provide operators with real-time, near real-time, and/or periodic simulator-based modeling of vessels with embedded intelligence and digital calculations & computations that provides operators with actionable data of mooring's mooring such as proactive fatigue analysis, predictive maintenance cycles, and proactive event risk analysis. The model which resides on blockchain (distributed ledger technology) combines data from multiple online, offline, and edge data sources to provide operators with end-to-end insight and behaviors of floating production systems. The outcomes for organizations result in reduced asset downtime, proactive future asset and event planning, opportunities to optimize production, and perform predictive risk-based analysis to uncover safety incidents before they happen.

Improving Roce and Productivity

Use Case 7

The present use case describes asset optimization with a digital twin data fabric to increase operational efficiency, via the blockchain platform such as the Xenese™ blockchain platform. The blockchain platform such as the Xenese™ blockchain platform, supports digital twin data fabric on blockchain is a layer of architecture that provides a 3D model of assets, virtual simulation models, a host of calculations and computations, virtual analysis models, historical data, and intelligent algorithms that connect these digital twin models to business and enterprise processes. This integrated, interconnected, and interoperable digital twin architecture provides operators with a bi-directional connection to multiple offline and online data assets, real-time, near real-time, and/or periodic interaction of virtual assets, and on-demand analysis models that provides operators with real-time, near real-time, and/or periodic status of equipment assets, supporting the deep analysis and rapid decision-making of oil and gas production. The blockchain platform, such as the Xenese™ blockchain platform, digital twin fabric plays an important role for operators to have real-time, near real-time, and/or periodic understanding of their production systems, and ways that they can optimize the design and control of assets on-demand through end-to-end visibility can help organizations save costs, reduce asset complexity, and increase the economic life of these assets.

Use Case 8

The present use case empowers operators with end-to-end production operations visibility, via the blockchain platform such as the Xenese™ blockchain platform. As oil and gas industry leaders continue investing in digitization and automation, connecting thousands of devices and assets such as machines, controllers, sensors, and products, operators must have the ability to view this data and unlock value continuously. The blockchain platform, such as the Xenese™ blockchain platform, digital twin data fabric brings together data, models, and simulations that reside in siloed data sources to deliver end-to-end visibility of production and asset performance with detailed views of their resources actionable insights derived from them. Through blockchain technology, oil and gas systems globally can seamlessly share data, models, simulations, analysis, and insights through distributed architecture with the goal of improving efficiency, security and safety. The blockchain platform, such as the Xenese™ blockchain platform, also empowers a more collaborative and integrated operations with remote monitoring to drive business continuity with reduced costs and higher return on capital.

Use Case 9

The present use case describes the increase the power of data sharing through distributed big data management and blockchain, via the blockchain platform such as the Xenese™ blockchain platform. As oil and gas organizations continue to increase investments in digital technologies such as big data, machine learning and Internet of Things (IOT), the scale and value of data continues to rise, creating the need for oil and gas big data sharing. In today's complex production environments, oil and gas operators must access and be able to rapidly analyze large-scale data from various sources in real-time, near real-time, and/or periodically to maximize the value their data in order to more informed decisions that maximize the economic life of their data assets. Traditional data management approaches are too slow to support these new digital requirements, which is why a digital twin data fabric is needed to help overcome challenges to unlock traditional and nontraditional data trapped in silos. The blockchain platform, such as the Xenese™ blockchain platform, empowers operators on land or at sea with comprehensive data management platform that discovers and collects multi-source information in real-time, near real-time, and/or periodically and leverages digital twin architecture on blockchain, AutoML, and advanced analytics to help operators improve operational efficiencies, safety, and security through a unified data management platform.

Use Case 10

The present use case describes the accelerate multiparty decision-making through data knowledge graphs, via the blockchain platform such as the Xenese™ blockchain platform. As onshore and offshore platforms continue generating data at massive volumes, operators must have the ability to quickly discover, collect, and easily interpret information to make on-demand decisions that maximize production. For operators to gain a comprehensive view of all of the information across onshore and offshore environments, they will need to move beyond the limitations of relational data systems into graph models that unlock links to data vertically and horizontally across various domains, functions, and regions. A 2021 McKinsey study revealed that that the typical offshore platform generates 1-2 TB of data daily and runs at approximately 77% of its maximum production potential. Industry-wide, representing approximately 10 million barrels per day, or $200 billion US in annual revenue. The blockchain platform, such as the Xenese™ blockchain platform, brings together data from across multiple disparate systems and leverages an intelligent knowledge graph model to graphically visualize relationships between datasets from any onshore and offshore system, making the interpretation and analysis of the data easier to understand for operators, providing them with the ability to gain faster insights to improve productivity, minimize risks, and increase uptime.

Use Case 12

The present use case describes the leverage the scale of the distributed data fabric gpu's to lower carbon emissions, via the blockchain platform such as the Xenese™ blockchain platform. As oil and gas companies seek innovative ways to reduce their direct and indirect emissions, business leaders understand that the fastest and most cost-effective pathway to decarbonization is by drastically improving their operational and energy efficiencies. Operators must have end-to-end visibility into direct and indirect emissions through integrated analytics and insights to understand the sources and drivers of their emissions, their partners, and customers. They also need automated intelligence that provides proactive recommendations to reduce energy consumption while optimizing energy efficiencies across their entire operations value chain. The blockchain platform, such as the Xenese™ blockchain platform, distributed data fabric brings together multi-source real-time, near real-time, and/or periodic operational data, transaction level data, and market data and combines with supplier and customer data, and performs automated static relief analysis and dynamic relief analysis through algorithmic computations that provides smart recommendations to operators on how they reduce.

Use Case 13

The present use case describes the accelerate the path to intelligent data-driven autonomous operations, via the blockchain platform such as the Xenese™ blockchain platform. The vision for the future in the oil and gas industry is to implement platforms that are fully digitized, unmanned, automated, remotely monitored, and, fully automated, and cognitively and remotely monitored by humans. As advances in topside and subsea infrastructure continue to accelerate, producers and operators will have the supporting technologies to build a fully autonomous operations leading with intelligent digital twin technology, big data, and blockchain. The blockchain platform, such as the Xenese™ blockchain platform, is empowering sea and deepwater interfaces with supporting data and analytics technologies that are paving the way to autonomous oil and gas production operations, enabling producers to increase the value they are getting from their data, greater performance transparency, and more rapid decision loops.

Xenese™ Industry Case Studies

Case Study 1

The present use case describes the Xenese™ blockchain platform digital twin data fabric in healthcare has been used to solve business problem. The Xenese™ blockchain platform represents a significant challenge in the healthcare industry is the lack of efficient ways to simulate and test new medical procedures and protocols. This challenge led to issues such as prolonged development times, increased costs, and suboptimal outcomes when new procedures are implemented in real-world settings. Additionally, without a digital twin, it was challenging for medical professionals to monitor and analyze data from medical devices and equipment, which can lead to inefficiencies in maintenance and repair processes.

The Xenese™ blockchain platform solutions using the digital twin data fabric on blockchain for healthcare empowered healthcare users with an interoperable platform to create digital twins of patients through our smart data fabric, providing them with new dimensions of insights and understanding of a patient's health so that they could personalize treatment with proactive and predictive recommendations. Additionally, the platform enabled the sharing of patient data between healthcare providers, researchers, insurance companies, pharmaceutical companies, and medical device manufacturers, which led to improved collaboration and knowledge sharing across the entire healthcare partner and stakeholder ecosystem.

Case Study 2

The Present Use Case Describes the CDC Contact Tracing Automation Across Numerous sovereign datasets, via the Xenese™ blockchain platform has been used to solve business problem. Contact tracing has widely been adopted to control the spread of Coronavirus-2019 (COVID-19). It enables to identify, assess, and manage people who have been exposed to COVID-19, thereby preventing from its further transmission. Most of the contact tracing approaches, tools, and solutions lacked an integrated solution stack that could easily bring together data from multiple siloed data sources while providing decentralized, transparent, traceable, and immutable capabilities with the integration of digital twin models and big data.

The Xenese™ blockchain platform solutions use smart data fabric on blockchain for contact tracing. Our team worked collaboratively with partners and the Center for Disease Control (CDC) to implement a smart data fabric platform with a tamper-proof data store and a set of off or online mobile forms to the CDC's outbreak proven, high-resolution contact tracing and sequence analysis tool MicrobeTrace. This tool MicrobeTrace, next Next provided multiple health departments with a tool that automatically discovered, collected, transformed and served data, analytics and insights across multiple siloed jurisdictional and state and local partner networks. The Xenese™ blockchain platform solution allowed providers to replace significant labor-intensive components with cohesive easy-to-comprehend data solutions, while retaining proven methodologies in a secure federated single point of entry system.

Real World Application Expansion with Low Cost

Embodiments of the apparatuses and systems and the interfaces and methods for implementing them are configured to utilize real-time, near real-time, and/or periodic data and information from oil and/or gas facilities (off shore and on shore) to assist the oil and gas industry in design, maintenance, testing, upgrading, updating, etc., wherein these operations are performed in a virtual or digitally twinned environment that allows all such operations to be performed in the virtual or digitally twinned environment utilizing the real-time, near real-time, and/or periodic data and information from oil and/or gas facilities are configured to utilize AI routines and methods to model the oil and/or gas facilities or components. The apparatuses and systems and the interfaces and methods for implementing them allow for growing directions based on use cases modeled in the virtual or digitally twinned environment, based on best practice cases modeled in the virtual or digitally twinned environment, based on useful data and decision making KPI information modeled in the virtual or digitally twinned environment. The apparatuses and systems and the interfaces and methods for implementing them are configured to achieve many objectives including allow AI and legacy processes, application working together, and acting as bridge between AI world and real world based virtual or digitally twinned environment.

Referring now to FIG. 35, a 3D plot shows that as information and data collections increases, the ability to utilize the information and data for creating virtual and digital twinning environments to design, maintenance, testing, upgrading, updating, etc. increases also. The plot is to illustrate that information and data collected in real-time, near real-time, or periodically from on going or future oil and/or facilities can be used not only for producing virtual or digital twinned environments, but also to improve the creating and usefulness of such virtual or digital twinned environments. Improved current and historic information and data storage, utilization, storage, retrieval, and modeling concerning current and future oil and/or facilities, will significantly and continuously permit improvements in the creation and utilization of virtual or digital twinned environments, virtual sensors, virtual equipment equipments, and/or other virtual aspects of current and future oil and/or facilities.

Flowcharts of Methods of Implementing the Apparatuses, Systems, and Interfaces

Referring now to FIG. 36, a schematic flowchart of an embodiment apparatus and method of this disclosure, generally 3600, is shown to include a start step 3602. After the start step, the apparatus and method 3600 proceeds proceed to a transmission step 3604 designed to transmit information and data from each information and data generating sources in an oil and/or gas facility to a virtual actor blockchain platform. The transmitted information and data are received is receive the information and data from each of the information and data generating sources via the virtual actor blockchain platform in a receive information and data step 3606. The received information and data is are then stored in blocks of one or more blockchains of the virtual actor blockchain platform in a store the received information and data step 3608. The stored information and data is are then used to determine the information and data type of each of the information and data generating sources in a determine data type step 3610. The apparatus and method 3600 then proceeds proceed to determine the equipment, sensor, facility component, and facility associated with each of the information and data generating sources in a determine source type step 3612. The determine data type and equip and source type is are then used to create virtual sensor, virtual equipment, virtual facility components, and virtual facility in a create virtual equivalents step 3614. The apparatus and method 3600 then proceeds proceed to dissect the facility component and/or the facility into one or more modeling segments in a dissect step 3616. The apparatus and method 3600 then proceeds proceed to create digital twinned models of each of the one or more modeling segments in a create digital twinned models step 3618. Once the digital twinned models are created, modeling routines are run on each of the digital twinned models of each of the one or more modeling segments in a run models step 3620. Once the models are run, the apparatus and method 3600 outputs output the modeling results or data from each of modeling routines to each of other modeling segments in an output step 3622. The apparatus and method 3600 then proceeds proceed to a self-consistent results test step 3624. If the data from the last run differs from the present run by a sufficiently small amount, the simulation will be complete and control is transferred along a YES path to a continuation (C) step 3626; otherwise, control is transferred along a NO path back to the run models step 3620. The apparatus and method 3600 then proceeds proceed to a store the final results of the modeling routines in blocks of one or more blockchains of the virtual actor blockchain platform in a store final results step 3628. Of course, the result of each run may be stored for historical and confirmation purposes. Once the final results are stored, the apparatus and method 3600 then proceeds proceed to output the final results of the modeling routines to an operator of the oil/gas facility in an output final results results step 3630. The operator may choose to modify and/or update oil/gas facility and/or components thereof based on the final results in a modify and/or update step 3632. The apparatus and method 3600 then proceeds proceed to stop test to determine if the operator desires the application to end in a stop step 3634. If the operator terminates the application, then control proceeds along a YES path to a stop step 3636; otherwise, control is transferred along a NO path C1 back to transmit information and data step 3604 and the entire application continues. Of course, it should be recognized that the application 3600 may be run continuously in real-time, near real-time, and/or periodically so that operators will be provided results of simulations in real-time, near real-time, and/or periodically for the purpose of trouble shooting, maintenance, or other preventative operations.

Referring now to FIG. 37, a schematic flowchart of another embodiment apparatus and method of this disclosure, generally 3700, is shown is shown to include a start step 3702. After the start step, the apparatus and method 3700 proceeds proceed to a transmission step 3704 designed to transmit information and data from each information and data generating sources in an oil and/or gas facility to a virtual actor blockchain platform. The transmitted information and data is receive are received the information and data from each of the information and data generating sources via the virtual actor blockchain platform in a receive information and data step 3706. The received information and data is are then stored in blocks of one or more blockchains of the virtual actor blockchain platform in a store the received information and data step 3708. The stored information and data is are then used to determine the information and data type of each of the information and data generating sources in a determine data type step 3710. The apparatus and method 3700 then proceeds proceed to determine the equipment, sensor, facility component, and facility associated with each of the information and data generating sources in a determine source type step 3712. The determine data type and equip and source type is are then used to create virtual sensor, virtual equipment, virtual facility components, and virtual facility in a create virtual equivalents step 3714. The apparatus and method 3700 then proceeds proceed to receive a request to run a simulation on the facility component and/or the facility in a request step 3716. The apparatus and method 3700 then proceeds proceed to dissect the facility component and/or the facility into one or more modeling segments in a dissect step 3718. The apparatus and method 3700 then proceeds proceed to create digital twinned models of each of the one or more modeling segments in a create digital twinned models step 3720. Once the digital twinned models are created, the apparatus and method 3700 then proceeds a continuation (C) step 3722 and then to the modeling routines are run on each of the digital twinned models of each of the one or more modeling segments in a run models step 3724. Once the models are run, the apparatus and method 3700 outputs output the modeling results or data from each of modeling routines to each of other modeling segments in an output step 3726. The apparatus and method 3700 then proceeds proceed to a self-consistent results test step 3728. If the data from the last run differs from the present run by a sufficiently small amount, the simulation will be complete and control is transferred along a YES path to store the final results of the modeling routines in blocks of one or more blockchains of the virtual actor blockchain platform in a store final results step 3730; otherwise, control is transferred along a NO path back to the run models step 3724. Of course, the result of each run may be stored for historical and confirmation purposes. Once the final results are stored, the apparatus and method 3700 then proceeds proceed to output the final results of the modeling routines to an operator of the oil/gas facility in an output final results results step 3732. The operator may choose to modify and/or update oil/gas facility and/or components thereof based on the final results in a modify and/or update step 3734. The apparatus and method 3700 then proceeds proceed to stop test to determine if the operator desires the application to end in a stop step 3736. If the operator terminates the application, then control proceeds along a YES path to a stop step 3738; otherwise, control is transferred along a NO path C1 back to transmit information and data step 3704 and the entire application continues. Of course, it should be recognized that the application 3700 may be run continuously in real-time, near real-time, and/or periodically so that operators will be provided results of simulations in real-time, near real-time, and/or periodically for the purpose of trouble shooting, maintenance, or other preventative operations.

EMBODIMENTS OF THE DISCLOSURE

Embodiment 1

An apparatus or system configured to digitally or virtually twin one or more oil and/or gas facilities and/or any component thereof.

Embodiment 2

An apparatus or system configured to digitally or virtually twin one or more oil and/or gas facilities and/or any component thereof, the apparatus or system including real-time, near real-time, and/or periodic facility and/or component data acquisition assembly or subsystem, real-time, near real-time, and/or periodic facility and/or component data processing assembly or subsystem, real-time, near real-time, and/or periodic facility and/or component data storage assembly or subsystem, real-time, near real-time, and/or periodic facility and/or component data analysis assembly or subsystem, real-time, near real-time, and/or periodic data communication assembly or subsystem, a virtual actor blockchain assembly or subsystem, and a real-time, near real-time, and/or periodic data twining assembly or subsystem configured to model facility or component functions, real-time, near real-time, and/or periodic facility and/or component data modeling assembly or subsystem, real-time, near real-time, and/or periodic facility and/or component management assembly or subsystem, historical data processing, predictive processing for oil and/or gas facility and/or component maintenance, upgrading, replacement, or periodic shutdowns assembly or subsystem, and other features or processes that may be twinning in a virtual twinned environment.

Embodiment 3

An apparatus or system including an oil and/or gas facility data communication assembly/subsystem and a virtual actor blockchain assembly or subsystem configured for data acquisition, data storage, data analysis, data mining, data tracking, facility, facility component modeling, virtual facility and virtual facility component or digital twinned facility or digital twinned facility component generation, and virtual facility and virtual facility component or digital twinned facility or digital twinned facility component modeling, wherein the data communication and analyses may be performed in real-time, near-real time, or periodically as permitted.

Embodiment 4

An apparatus or system including: (a) a facility information and data communication assembly/subsystem; (b) a virtual actor blockchain assembly/subsystem; and (c) interfaces and methods implementing the apparatuses and/or systems may be constructed, wherein the apparatus/system is designed to provide: (a) the oil and gas community optimal solutions that embrace proven traditional platforms as well as the integration of state-of-the-art digital technologies for the readiness of autonomous operations, (b) multi-functional technical expertise for offshore and onshore major capital projects and optimization of production operations; valuable experience and expertise for the design and development of digital twin systems, virtual sensor networks, robotic application potentials, green house emission control network, and online real-time, near real-time, and/or periodic performance solutions for digital led virtual asset platform; and a forward-looking plan and new thinking for future data-driven autonomous operations based on an integrated operation window and virtual facility platform that includes an integrated data center.

Embodiment 5

The Embodiments of 1-4, wherein the facility data communication assembly/subsystem includes communication pathways from all data output sources within an oil and/or gas facility including sensors, databases, analytic software, operational and management protocols and/or reports, operational protocols and/or reports, and facility configurations and/or component configurations, research and development operational and management reports, engineering operational and management reports, and any other information or data output source.

Embodiment 6

The Embodiment of 5, wherein the virtual actor blockchain assembly/subsystem includes a data acquisition assembly/subsystem software for receiving the data from the facility data output sources and assigning one or more facility data virtual actors to the facility data output sources based on the type of facility data source.

Embodiment 7

The Embodiment of 6, wherein the one or more virtual actors are assigned to each of the facility data output source pathways and the virtual actor blockchain assembly/subsystem may be configured to specific facility components, sub-components, processes, and/or sub-processes.

Embodiment 8

The Embodiment of 7, wherein the virtual actor blockchain assembly/subsystem also includes computer models for each facility sensor, each facility component, each facility sub-component, each facility process, and each facility sub-process associated with one, some, or all virtual facility data actors to produce a virtual facility for modeling facility operation and management. The virtual facility modeling may be used to predict future facility behavior, to optimized facility performance, to identify facility problems before they occur, to minimize facility downtime, and/or to improve facility operation and management.

Embodiment 9

The Embodiment of 8, wherein the virtual actor blockchain assembly/subsystem also includes virtual actor network comprising supervisor, manager, facility personnel, data analysis personnel, data modeling personnel, and/or other personnel needing access to the virtual actor network computers and/or servers.

Embodiment 10

The Embodiment of 9, wherein the personnel virtual actors will have different access and/or different ability to invoke processes with the virtual modeling facility.

Embodiment 11

The Embodiments of 1-4, wherein the real-time, near real-time and or periodic facility data acquisition, data analysis, and management apparatuses or systems, the apparatuses or systems including a facility assembly or subsystem and a virtual actor blockchain data acquisition, storage, analysis, and tracking assembly or subsystem and interfaces and methods implementing them.

Embodiment 12

The Embodiment of 1-4, wherein the apparatus or system is configured to:

(1) utilize data from oil and/or gas upstream and downstream oil and gas production, refining, and storage to create or generate digital twin (DT) environments within a virtual actor model based blockchain platform running on or in either an edge environment or a cloud environment. This provides a real-time, near real-time, or periodic digital representations of physical systems, associated processes, and/or process workflow. The digital twinning is then combined with machine learning (ML) and artificial intelligence (AI) capabilities to enable predictive analytics and prescriptive insights into improving and modeling downstream and upstream oil and gas processes, facilities, and/or installations.

(2) allow predicting automation control behaviors, early warnings of potential problems, and creating notifications for critical aspects of operations, such as upcoming maintenance deadlines or fluctuations in oil and gas operations.

(3) use legacy digital twin solutions within a virtual actor blockchain platform to model most production and process operations, such as offshore assets, FPSOs, FLNGs, onshore facilities, LNG facilities, gas plant facilities, pipeline networks, and drilling operations. Digital twinning can be used to simulate and/or optimize operations through a highly integrated digital backbone. Using virtual sensor data based on physical sensor data alongside direct physical sensor data, the embodiments of this disclosure build an exact or near exact digital representation of the facility objectives and simulating facility behavior accurately for predicting future behavior.

(4) combine oil/gas modeling technologies, actor model advantages, and blockchain distributed data management, enabling digital twins to have a rigorous digital representation for a very large facility, including a lot of detailed edge systems on a real-time, near real-time, or periodic basis, without losing any rigorous behavioral information.

Embodiment 13

The Embodiment of 1-4, wherein the facility information and data communication assembly/subsystem is configured to: (a) provide all information concerning each facility including, without limitation, overall facility design, component configuration, facility components, and facility operational information and data via unidirectional or bidirectional communication pathways; and (b) provide information and data from all facility data output devices including, without limitation, sensors, databases, analytic routines, protocols, configurations, and any other information and/or data generating devices that produces acquirable and/or available information and data from the facility concerning facility operations and/or management.

Embodiment 14

The Embodiment of 1-4, wherein the virtual actor blockchain assembly/subsystem includes: (a) a plurality of facility virtual actors associated with each facility; (b) a plurality of facility component virtual actors associated with one or more facility components; (c) a plurality of facility data virtual actors associated with one or more devices or elements within the facility that generate acquirable and/or available data; and (d) a plurality of user virtual actors associated with authorized users of the apparatuses, systems, interfaces, and/or methods.

Embodiment 15

The Embodiment of 1-4, wherein the virtual actor blockchain assembly/subsystem also includes: (a) a facility and facility component information and data acquisition assembly/subsystem; (b) a facility and facility component information and data storage, archival, and retrieval assembly/subsystem; (c) a virtual or computer generated facility and facility component assembly/subsystem; (d) a facility and facility component modeling or simulation assembly/subsystem; and (e) a modeling or simulation storage, archival, and retrieval assembly/subsystem.

Embodiment 16

The Embodiment of 1-4, wherein the facility and facility component information and data acquisition assembly/subsystem is configured to: (a) receive facility and facility component information and data via the facility data communication assembly/subsystem; (b) receive data from all facility data output devices via the facility data communication assembly/subsystem; (c) assign each facility to a facility virtual actor; (d) assign one or more facility components to a facility component virtual actor; and (e) assign data from one or more facility data output devices to a facility data virtual actor.

Embodiment 17

The Embodiment of 1-4, wherein the facility and facility component information and data storage, archival, and retrieval assembly/subsystem is configured to: (a) store facility information and data in one or more blocks of a facility blockchain, (b) store facility component information and data in one or more blocks of a facility component blockchain; (c) store data from all facility data output devices in one or more blocks of the facility data blockchain; (d) update block data of a block in one of the blockchains after consensus polling; (e) archive one or more blocks from one or more of the blockchains after consensus polling; and (f) retrieval archived blocks and restore them to their appropriate blockchain after consensus polling.

Embodiment 18

The Embodiment of 1-4, wherein the virtual or computer generated (CG) facility and facility component assembly/subsystem is configured to: (a) generate a virtual facility; (b) generate virtual facility components, one for each facility component; and (c) generate virtual devices, one for each facility device that collects data concerning the operations of the facility and/or facility components.

Embodiment 19

The Embodiment of 1-4, wherein the facility and facility component modeling or simulation assembly/subsystem is configured to: (a) model or simulate operations of the entire facility or one or more facility components based on data acquired via the facility and facility component information and data acquisition assembly/subsystem; or (b) model or simulate operations of the entire facility or one or more facility components using the virtual facility, virtual facility components, and virtual devices based on data acquired via the facility and facility component information and data acquisition assembly/subsystem, stored facility data, or retrieved archival facility data; and (c) send the modeling or simulation results to the user who requested the model or simulation and to other authorized modeling/simulation users.

Embodiment 20

The Embodiment of 1-4, wherein the modeling or simulation storage, archival, and retrieval assembly/subsystem is configured to: (a) store current modeling or simulation results for access by authorized modeling/simulation users; (b) archive modeling or simulation results for historical analysis; and (c) retrieve archived modeling or simulation results based on authorized modeling/simulation user requests.

Embodiment 21

The Embodiment of 1-4, wherein the virtual actor blockchain assembly/subsystem also includes a user request acquisition and processing assembly/subsystem configured to: (a) receive requests from authorized user virtual actors; (b) schedule the requests based on a set of priority rules; (c) perform each of the requests based of the priority rules; (d) send the results of each of the requests to the requestor and to one or more authorized users; (e) store each request in a block of a user request blockchain; (f) modify a request after consensus polling; (g) archive one or more request blocks after consensus polling; and (g) retrieve one or more archived blocks after consensus polling, wherein the order is not events is not critical.

Embodiment 22

The Embodiment of 1-4, wherein each of the facility data virtual actors may be assigned to a given facility data output pathway, a specific group of facility data output pathways, data pathways associated with specific facility components, data pathways associated with a specific facility sub-component, data pathways associated with a specific facility process, and/or data pathways associated with a specific facility sub-process.

Embodiment 23

The Embodiment of 1-4, wherein the virtual facility modeling subsystem may be used to predict future facility behavior, to optimize facility performance, to identify facility problems before they occur, to minimize facility downtime, and/or to improve facility operation and management.

Embodiment 24

The Embodiment of 1-4, wherein the virtual actor blockchain assembly/subsystem also includes a virtual actor network comprising supervisor computers and/or servers, manager computers and/or servers, facility personnel computers and/or servers, data analysis personnel computers and/or servers, data modeling personnel computers and/or servers, and/or other personnel needing access to the virtual actor network computers and/or servers. The personnel virtual actors will have different access and/or different ability to invoke processes using the virtual component modeling subsystem and/or the virtual facility modeling subsystem. The inventors have also found that interfaces and methods may be configured to implement the apparatuses and/or systems of this disclosure.

Embodiment 25

The Embodiment of 1-4, wherein the facility data communication assembly/subsystem includes communication pathways from all data output devices within the facility including sensors, databases, analytics, protocols, configurations, and other information generated and acquired for facility management.

Embodiment 26

The Embodiment of 1-4, wherein the virtual actor blockchain assembly/subsystem includes data acquisition software for receiving the data from the facility, assignment of facility data to virtual actors based on the type of data received from the facility, wherein the virtual actors are assigned for each facility data output pathways and for specific facility components, sub-components, processes, and/or sub-processes.

Embodiment 27

The Embodiment of 1-4, wherein the virtual actor blockchain assembly/subsystem also includes computer models for each facility sensor, each facility component, each facility sub-component, each facility process, and each facility sub-process associated with one, some, or all virtual facility data actors to produce a virtual facility for modeling facility operation and management.

Embodiment 28

The Embodiment of 1-4, wherein the virtual facility modeling may be used to predict future facility behavior, to optimized facility performance, to identify facility problems before they occur, to minimize facility downtime, and/or to improve facility operation and management.

Embodiment 29

The Embodiment of 1-4, wherein the virtual actor blockchain assembly/subsystem also includes virtual actor network comprising supervisor, manager, facility personnel, data analysis personnel, data modeling personnel, and/or other personnel needing access to the virtual actor network computers and/or servers.

Embodiment 30

The Embodiment of 1-4, wherein the personnel virtual actors will have different access and/or different ability to invoke processes with the virtual modeling facility.

Embodiment 31

The Embodiment of 1-4, wherein the apparatus or system are designed to provide real-time, near real-time, and/or periodic facility data acquisition, data analysis, and modeling or simulation based on the acquired real time or near real time data or modeling or simulation based on the acquired real-time, near real-time, and/or periodic data as input to a virtual facility or facility components, wherein the data acquisition is stored in blocks of one or more blockchains of the virtual actor blockchain assembly or subsystem and to interfaces and methods implementing same.

Embodiment 32

The Embodiment of 1-4, wherein the apparatus or system further comprises a unique digital twin data fabric platform equips oil and gas operators with intelligent data management architecture to effectively and efficiently plan and operationally execute production using big data blockchain.

Embodiment 33

The Embodiment of 32, wherein the blockchain cohesively brings the various onshore and offshore time-scale applications together.

Embodiment 34

The Embodiment of 33, wherein the digital twin data fabric platform also provides: (a) annual data cycles, e.g., data such as reservoir information can be modeled within the twin fabric for yearly insights; (b) daily/monthly data cycles, e.g., non-real time data such as petroleum engineering information and monthly well planning data can be modeled within the blockchain platform or digital twin fabric for deeper non-real time insights; and (c) real-time data cycles, near real-time data cycles, and/or periodic data cycles to support real-time, near real-time, and/or periodic data collections for oil/gas facility, flow line, wellhead monitoring and analytics.

Embodiment 35

The Embodiment of 34, wherein the blockchain platform oil and gas applications include (a) engineering design; (b) deepwater and onshore production; (c) asset integrity management; (d) modeling and simulation; (e) performance monitoring, and (f) big data and analytics.

Embodiment 36

The Embodiment of 1-4, wherein the virtual actor blockchain assembly/subsystem includes a facility data acquisition assembly/subsystem configured to receive data from the facility data output source pathways and to assign one or more facility data virtual actors to the facility data output sources based on the type of facility data source. The one or more facility data virtual actors assigned to the facility data output sources receive data from the pathways on time frames depending on the type of facility data source.

Embodiment 37

The Embodiment of 1-4, wherein the facility data sources that generate data on a continuous basis, the data acquisition assembly/subsystem is configured to receive that data on a time frame based on the type of continuous data being output.

Embodiment 38

The Embodiment of 37, wherein the if the continuous data is produced on a microsecond basis and critical for real time or near real time facility operations, then the data acquisition assembly/subsystem is configured to receive the continuous data in data packets on a microsecond time frame, to convert the data in the data packets into a standardized data format, and to store the data in each of the data packets in a block of one or more blockchains.

Embodiment 39

The Embodiment of 38, wherein the if the continuous data is not critical for real time or near real time facility operations, then the data acquisition assembly/subsystem is configured to receive the continuous data in data packets on a time frame suitable for the type of continuation data, to convert the data in the data packets into a standardized data format, and to store the data in each of the data packets in a block of one or more blockchains.

Embodiment 40

The Embodiment of 1-4, wherein the facility data sources that generate data on a periodic or semi-periodic basis, the data acquisition assembly/subsystem is configured to receive that data on a periodic or semi-periodic time frame.

Embodiment 41

The Embodiment of 40, wherein the if the periodic or semi-periodic data is produced on a daily, then the data acquisition assembly/subsystem is configured to receive the periodic or semi-periodic data in daily data packets, to convert the data in the daily data packets into a standardized data format, and to store the data in each of the daily data packets in a block of one or more blockchains.

Embodiment 42

The Embodiment of 41, wherein the if the periodic or semi-periodic data is produced on any other time frame, such as hourly, weekly, biweekly, monthly, etc., then the data acquisition assembly/subsystem is configured to receive the periodic or semi-periodic data in such data packets, to convert the data in such data packets into a standardized data format, and to store the data in each of such data packets in a block of one or more blockchains.

Embodiment 43

The Embodiment of 42, wherein the facility data sources that generate data on a sporadic basis, the data acquisition assembly/subsystem is configured to receive the sporadic data upon production, to convert the data into a standardized data format, and to store the data in a block of one or more blockchains.

Embodiment 44

The Embodiment of 43, wherein the facility data sources that generate data on an emergency basis, the data acquisition assembly/subsystem is configured to receive the emergency data upon production, to convert the data into a standardized data format, and to store the data in a block of one or more blockchains.

Embodiment 45

The Embodiment of 44, wherein the virtual actor blockchain assembly/subsystem may utilize any application that receives data and converts the data into a standardized data format such as Airbyte® software softwar, a registered trademark of Daxtarity Inc., JSON (JavaScript Object Notation) software, or any other data standardization software.

Embodiment 46

A virtual actor blockchain assembly/subsystem also includes a facility configuration, operation, and management information and data acquisition assembly/subsystem configured to acquire and receive information and data concerning overall facility configuration, facility components, facility processes, facility routine and emergency operation procedures and protocols, facility routine and emergency management procedures and protocols, facility routine and emergency analytic procedures and protocols, facility routine and emergency monitoring procedures and protocols, facility routine and emergency maintenance procedures and protocols, facility routine and emergency shutdown and restart procedures and protocols, facility routine and emergency component shutdown and restart procedures and protocols, facility routine and emergency modeling procedures and protocols, and any other facility configuration, operation, and management information and data need for facility operation and management.

Embodiment 47

The Embodiment of 46, wherein the virtual actor blockchain assembly/subsystem also includes a facility modeling and simulation assembly/subsystem including software for modeling facility operations, facility component operations, facility modifications, facility component modifications, and/or facility component additions or deletions. The modeling and simulation assembly/subsystem is configured to dissect each facility component into modeling units, which are run in parallel until the results of the modeling units become internally self-consistent to reduce computer resource demands. Of course, as computer technology advances, the degree of dissection may be reduced or increased to optimize modeling and simulation run times. The modeling and simulation assembly/subsystem is configured to pull all necessary data from the blocks of the one or more blockchains into which the necessary data has been stored and to write or output the results in a standardized data format to one or more blocks of the one or more blockchains of the virtual actor blockchain assembly/subsystem.

Embodiment 48

The Embodiment of 47, wherein the virtual actor blockchain assembly/subsystem also includes a facility and/or facility component virtual twinning assembly/subsystem configured to generate a virtual facility and/or virtual facility components based on the facility configuration, operation, and management information and data and the facility output source data. The virtual facility is designed to reproduce the overall facility in a computer generated (CG) twin so that modeling and simulations may be performed on the virtual facility without affecting actual facility operations and the results made available to authorized user virtual actors.

Embodiment 49

The Embodiment of 48, wherein the virtual facility components are designed to reproduce each facility component in a CG twin so that modeling and simulations may be performed on the virtual facility component without affecting actual facility operations and the results made available to authorized user virtual actors.

Embodiment 50

The Embodiment of 49, wherein the facility CG twin will include virtual or CG analogs of each sensor, device, component, or the like associated with the overall facility.

Embodiment 51

The Embodiment of 50, wherein the facility component CG twin will include virtual or CG analogs of each sensor, device, or the like associated with the facility component.

Embodiment 52

The Embodiment of 51, wherein the facility and/or facility component virtual twinning assembly/subsystem is configured to pull all necessary data from the blocks of the one or more blockchains into which the necessary data has been stored for each virtual modeling or simulation and to write or output the results in a standardized data format to one or more blocks of the one or more blockchains of the virtual actor blockchain assembly/subsystem.

Embodiment 53

The Embodiment of 52, wherein the facility and/or facility component virtual twinning assembly/subsystem may be used to predict future facility behavior, to optimized facility performance, to identify facility problems before they occur, to minimize facility downtime, and/or to improve facility operation and management.

CLOSING PARAGRAPH OF THE DISCLOSURE

Although the invention has been described with reference to the above examples, it will be understood that modifications and variations are encompassed within the spirit and scope of the invention. Accordingly, the invention is limited only by the following claims.

The invention claimed is:

1. An apparatus comprising:

an oil and/or gas facility including:

a plurality of facility components, a plurality of facility data generating sources (the facility generating sources), and a facility data communication assembly including:

one or more facility data output devices (the facility output devices), and communication pathways from the facility output devices; and a virtual actor blockchain platform including:

one or more blockchains (the blockchains);

a data acquisition assembly;

a plurality of user virtual actors (the user virtual actors) resident on one or more virtual machines (the virtual machines), each of the user virtual actors comprises a primitive, isolated, non-memory sharing or stateful unit of computation and includes a mailbox;

a plurality of facility data virtual actors (the facility data virtual actors); and a messaging service resident on the virtual machines and on the facility data virtual actors, wherein messages include user requests from one or more of the user virtual actors, internal scheduled requests, or any combination thereof, the apparatus configured to:

create, via the virtual actor blockchain platform, one or more blockchain ledgers (the blockchain ledgers) for each of the blockchains, each of the blockchain ledgers includes an unique cryptographic signature, each of the unique cryptographic signatures correspond to a block of in one of the blockchains;

store, via the virtual actor blockchain platform, the blockchain ledgers on one of a plurality of decentralized servers (the decentralized servers), one or more computing devices (the computing devices), and the virtual machines so that the blockchain ledgers are available to all of the user virtual actors;

receive, via the communication pathways, data from facility data communication assembly (the facility data), wherein the facility data comprises facility information and data and facility component information and data the facility data from the facility output devices on a continuous basis, a periodic basis, an intermediate basis, or any combination thereof;

convert, via the virtual actor blockchain platform, the facility data into a standardized data format (the standardized data);

store, via the virtual actor blockchain platform, the standardized data in blocks of the blockchains;

create, via the virtual actor blockchain platform, a virtual digital twin of the facility and the facility components based on the standardized data (the virtual digital twinned facility);

receive, via the messaging service, a simulation request from one or more of the user virtual actors, wherein the simulation request comprises one or more simulations of the facility or one or more of the plurality of facility components (the simulations);

run, via the virtual actor blockchain platform, each of the simulations on the virtual digital twinned facility to produce a simulation data set for each of the simulations (the simulation data sets);

add, via the virtual actor blockchain platform, each of the simulation data sets to one or more blocks of the one or more of the blockchains on a continuous basis, a periodic basis, an intermediate basis, or any combination thereof; and broadcast, via the messaging service, to the plurality of the user virtual actors and the virtual machines that one or more blocks have been added to the one or more of the blockchains and to the blockchain ledgers, wherein virtual actor blockchain platform comprise a virtual actor architecture configured to facilitate a scalable echo system or an abstraction of the blockchains via the blockchain ledgers in order to alleviate blockchain mining latency.

2. The apparatus of claim 1, wherein:

each of the decentralized servers includes at least one server processor, a server machine-readable medium, at least one server database, communication hardware and software, and server processor executable instructions encoded in hardware, firmware, software, or combinations thereof, and each of the computing devices includes at least one computing device processor, a computing device machine-readable medium, computing device communication hardware and software, and computing device processor executable instructions encoded in hardware, firmware, software, or combinations thereof.

3. The apparatus of claim 2, wherein the apparatus is further configured to:

receive, via the messaging service, a web request in a first format, from any of the user virtual actors concerning a block (the concerned block) in one of the blockchains (the concerned blockchain);

convert, via the messaging service, the web request from the first format to a message format usable by the messaging service (the formatted query);

enter, via the virtual actor blockchain platform, the formatted query into the one or more queryable blockchain ledgers;

read, via the virtual actor blockchain platform, a content of the concerned block of the concerned blockchain;

analyze, research, or verify, via the virtual actor blockchain platform, the content of the concerned block of the concerned blockchain;

write, via the messaging service, the formatted query and the results of the analysis, research, or verification of the content of the concerned block of the concerned blockchain to the one or more queryable blockchain ledgers;

add, via the virtual actor blockchain platform, a block to the concerned blockchain containing the formatted query and the results of the analysis, research, or verification of the content of the concerned block of the concerned blockchain; and broadcast, via the messaging service, a block addition message to all other of the user virtual actors and all of the virtual machines that a block has been added to the concerned blockchain of the concerned blockchain and to the one or more queryable blockchain ledgers.

4. The apparatus of claim 3, wherein the apparatus is further configured to:

form, via the virtual actor blockchain platform, a persistent storage retaining virtual actor states of the user virtual actors in real-time, near real-time, periodically, or any combination thereof, maintain, via the virtual actor blockchain platform, the one or more queryable blockchain ledgers, and run, via the virtual actor blockchain platform, cluster operations on a horizontal pod scaling of stateful RESTful services through operations running inside one or more Kubernetes clusters including a plurality of Kubernetes pods on containerized application images of the one or more virtual machines.

5. The apparatus of claim 4, wherein:

the message format is selected from the group consisting of JavaScript Object Notation (JSON), Extensible Markup Language (XML), Comma Separated Variable (CSV), ProtoBuf, Simple Object Access Protocol (SOAP or XML), MessageWire, HyperText Markup Language (HTML), Text, Byte Array, and Streams; and the one or more queryable blockchain ledgers comprises Merkle Trees.

6. The apparatus of claim 5, wherein the apparatus is further configured to:

when a parent Merkle Tree receives the block addition message, via the messaging service, update a Merkle Tree root hash key of the parent Merkle Tree corresponding to the concerned block to form an updated Merkle Tree, and broadcast, via the messaging service, to all other virtual user actors of the addition of the concerned block to the concerned blockchain.

7. The apparatus of claim 1, wherein the virtual actor blockchain platform further includes:

a plurality of virtual actor clusters (the UVA clusters), each of the virtual actor clusters includes a plurality of virtual actor nodes (the UVA cluster nodes), each of the UVA cluster nodes corresponds a specific user virtual actor (the cluster user virtual actors), and each of the cluster user virtual actors communicate, via the messaging service, over persistent connections of the messaging service.

8. The apparatus of claim 7, wherein the apparatus is further configured to:

restrict, via the virtual actor blockchain platform, use of consensus algorithms to discoverability of the UVA cluster nodes based on:

an existence and a location of each of UVA cluster nodes within a specific UVA cluster, and the consensus algorithms not in agreement of any action or transaction involving the UVA cluster nodes of the specific UVA cluster.

9. The apparatus of claim 8, wherein:

the apparatus supports both Restful API and Server Sent Event (SSE);

the topology of the architecture of the is configured to be hosted on a private cloud environment or a public cloud environment and incorporate a series of decentralized servers via load balancers to distribute Restful API traffic across a cluster of containerized virtual actor node masters;

a specific virtual actor node communication, via messaging service, over a series of Restful API connections; and the apparatus further comprising:

a connection configured to persist a single bi-directional connection between a client, and a virtual node master within a UVA cluster.

10. The apparatus of claim 8, wherein:

each of the cluster user virtual actors communicate, via the messaging service, over a persistent connection of the messaging service.

11. A method, implemented on an apparatus:

the apparatus comprises:

an oil and/or gas facility including:

a plurality of facility components, a plurality of facility data generating sources (the facility generating sources), and a facility data communication assembly including:

one or more facility data output devices (the facility output devices), and communication pathways from the facility output devices; and a virtual actor blockchain platform including:

one or more blockchains (the blockchains);

a data acquisition assembly;

a plurality of user virtual actors (the user virtual actors) resident on one or more virtual machines (the virtual machines), each of the user virtual actors comprises a primitive, isolated, non-memory sharing or stateful unit of computation and includes a mailbox;

a plurality of facility data virtual actors (the facility data virtual actors); and a messaging service resident on the virtual machines and on the facility data virtual actors, wherein messages include user requests from one or more of the user virtual actors, internal scheduled requests, or any combination thereof, the method comprising:

creating, via the virtual actor blockchain platform, one or more blockchain ledgers (the blockchain ledgers) for each of the blockchains, each of the blockchain ledgers includes an unique cryptographic signature, each of the unique cryptographic signatures correspond to a block of in one of the blockchains;

storing, via the virtual actor blockchain platform, the blockchain ledgers on one of a plurality of decentralized servers (the decentralized servers), one or more computing devices (the computing devices), and the virtual machines so that the blockchain ledgers are available to all of the user virtual actors;

receiving, via the communication pathways, data from facility data communication assembly (the facility data), wherein the facility data comprises facility information and data and facility component information and data the facility data from the facility output devices on a continuous basis, a periodic basis, an intermediate basis, or any combination thereof;

converting, via the virtual actor blockchain platform, the facility data into a standardized data format (the standardized data);

storing, via the virtual actor blockchain platform, the standardized data in blocks of the blockchains;

creating, via the virtual actor blockchain platform, a virtual digital twin of the facility and the facility components based on the standardized data (the virtual digital twinned facility);

receiving, via the messaging service, a simulation request from one or more of the user virtual actors, wherein the simulation request comprises one or more simulations of the facility or one or more of the plurality of facility components (the simulations);

running, via the virtual actor blockchain platform, each of the simulations on the virtual digital twinned facility to produce a simulation data set for each of the simulations (the simulation data sets);

adding, via the virtual actor blockchain platform, each of the simulation data sets to one or more blocks of the one or more of the blockchains on a continuous basis, a periodic basis, an intermediate basis, or any combination thereof; and broadcasting, via the messaging service, to the plurality of the user virtual actors and the virtual machines that one or more blocks have been added to the one or more of the blockchains and to the blockchain ledgers, wherein virtual actor blockchain platform comprise a virtual actor architecture configured to facilitate a scalable echo system or an abstraction of the blockchains via the blockchain ledgers in order to alleviate blockchain mining latency.

12. The method of claim 11, wherein, in the storing step:

each of the decentralized servers include at least one server processor, a server machine-readable medium, at least one server database, communication hardware and software, and server processor executable instructions encoded in hardware, firmware, software, or combinations thereof, and each of the computing devices includes at least one computing device processor, a computing device machine-readable medium, computing device communication hardware and software, and computing device processor executable instructions encoded in hardware, firmware, software, or combinations thereof.

13. The method of claim 12, further comprising:

receiving, via the messaging service, a web request in a first format, from any of the plurality of user virtual actors concerning a block (the concerned block) in one of the one or more blockchains (the concerned blockchain);

converting, via the messaging service, the web request from the first format to a message format usable by the messaging service (the formatted query);

entering, via the virtual actor blockchain platform, the formatted query into the one or more queryable blockchain ledgers;

reading, via the virtual actor blockchain platform, a content of the concerned block of the concerned blockchain;

analyzing, research, or verify, via the virtual actor blockchain platform, the content of the concerned block of the concerned blockchain;

writing, via the messaging service, the formatted query and the results of the analysis, research, or verification of the content of the concerned block of the concerned blockchain to the one or more queryable blockchain ledgers;

adding, via the virtual actor blockchain platform, a block to the concerned blockchain containing the formatted query and the results of the analysis, research, or verification of the content of the concerned block of the concerned blockchain; and broadcasting, via the messaging service, a block addition message to all other of the user virtual actors and all of the one or more virtual machines that a block has been added to the concerned blockchain and to the one or more queryable blockchain ledgers.

14. The method of claim 13, further comprising:

forming, via the virtual actor blockchain platform, a persistent storage retaining virtual actor states in real-time, near real-time, periodically, or any combination thereof;

maintaining, via the virtual actor blockchain platform, the one or more queryable blockchain ledgers; and running, via the virtual actor blockchain platform, cluster operations on a horizontal scaling of stateful RESTful services through operations running inside one or more Kubernetes clusters including a plurality of Kubernetes pods on containerized application images of the one or more virtual machines.

15. The method of claim 14, wherein, in the simulation request receiving step:

the message format is selected from the group consisting of JavaScript Object Notation (JSON), Extensible Markup Language (XML), Comma Separated Variable (CSV), ProtoBuf, Simple Object Access Protocol (SOAP or XML), Message Wire, HyperText Markup Language (HTML), Text, Byte Array, and Streams, and the one or more queryable blockchain ledgers comprises Merkle Trees.

16. The method of claim 15, further comprising:

when a parent Merkle Tree receives a message of the block addition message, via the messaging service, updating a Merkle Tree root hash key of the parent Merkle Tree corresponding to the concerned block of the concerned blockchain to form an updated Merkle Tree, and broadcasting, via the messaging service, to all other virtual user actors of the addition of the concerned block to the concerned blockchain.

17. The method of claim 11, wherein the virtual actor blockchain platform further includes:

a plurality of virtual actor clusters (the UVA clusters), each of the virtual actor clusters includes a plurality of virtual actor nodes (the UVA cluster nodes), each of the UVA cluster nodes corresponds a specific user virtual actor (the cluster user virtual actors), and each of the cluster user virtual actors communicate, via the messaging service, over persistent connections of the messaging service.

18. The method of claim 11, further comprising:

restricting, via the virtual actor blockchain platform, use of consensus algorithms to discoverability of the UVA cluster nodes based on:

an existence and a location of each of UVA cluster nodes within a specific UVA cluster, and the consensus algorithms not in agreement of any action or transaction involving the UVA cluster nodes of the specific UVA cluster.

19. The method of claim 18, wherein, in the restricting step:

the apparatus supports both Restful API and Server Sent Event (SSE);

the topology of the architecture of the is configured to be hosted on a private cloud environment or a public cloud environment and incorporate a series of decentralized servers via load balancers to distribute Restful API traffic across a cluster of containerized virtual actor node masters;

a specific virtual actor node communication, via messaging service, over a series of Restful API connections; and the apparatus further comprising:

a connection configured to persist a single bi-directional connection between a client, and a virtual node master within a UVA cluster.

20. The method of claim 18, wherein in the restricting step:

each of the cluster user virtual actors communicating, via the messaging service, over a persistent connection of the messaging service.

* * * * *